Figure 1:
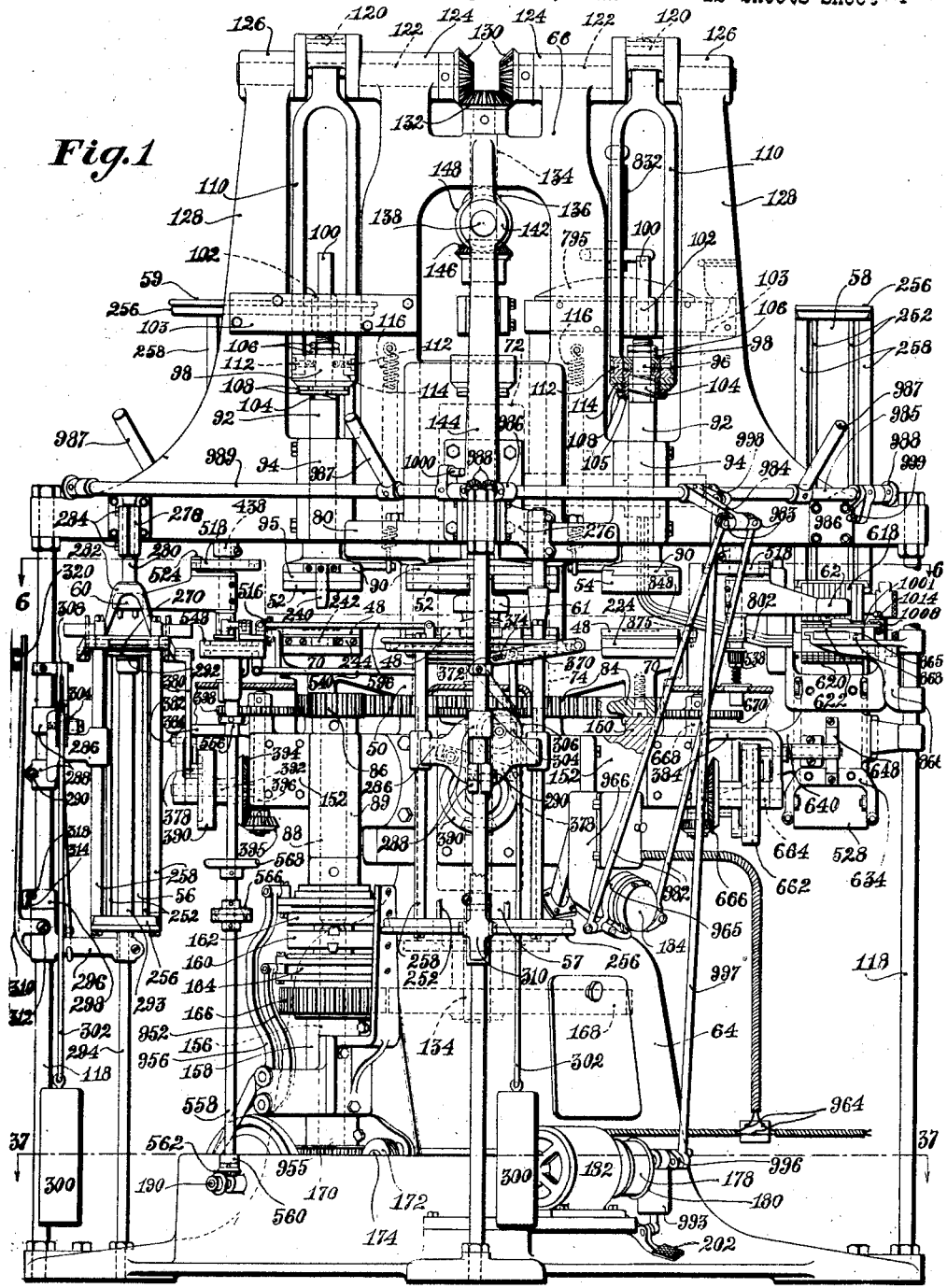

May 1, 1928. 1,667,948
F. H. PERRY
MACHINE FOR MAKING SHOE SOLES
Filed April 20, 1922 12 Sheets-Sheet 2
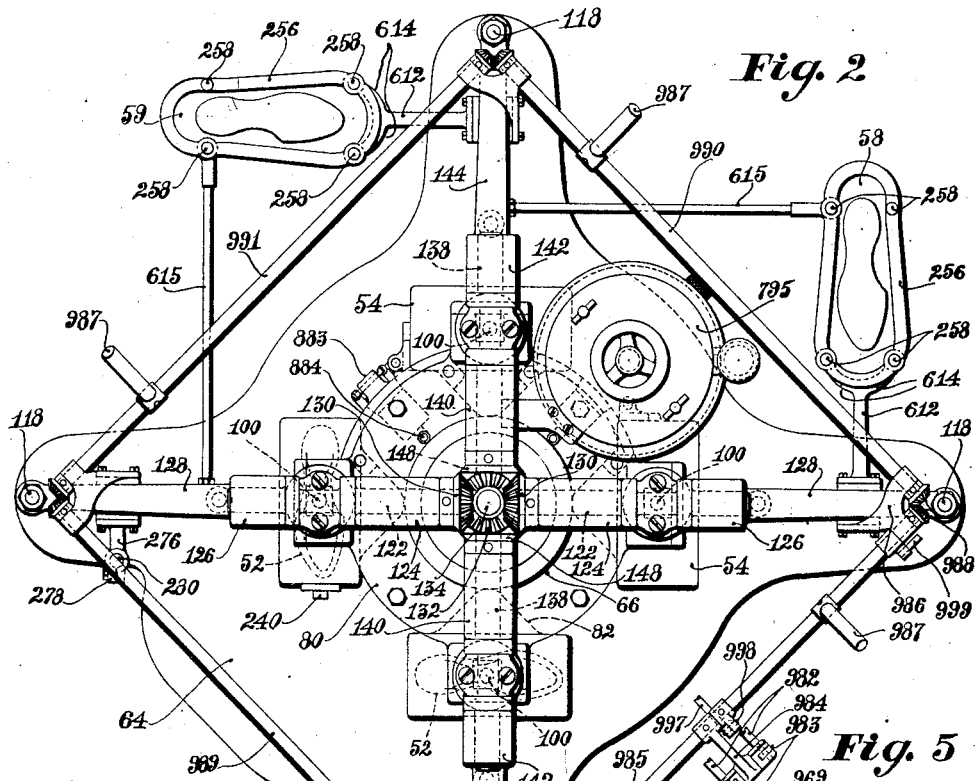
Fig. 2
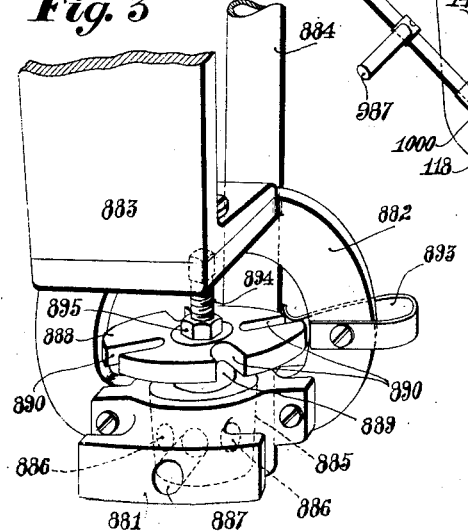
Fig. 3
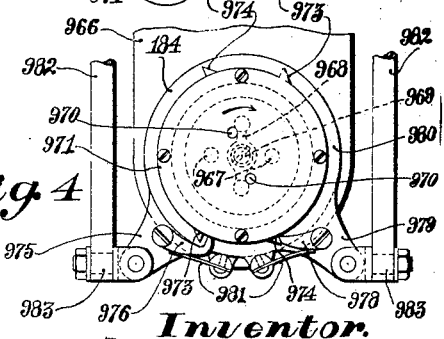
Fig. 5
Fig. 4
Inventor.
FREDERICK H. PERRY, DECEASED
EDNA A. PERRY, EXECUTRIX
By her Attorney May 1, 1928.  
F. H. PERRY  
1,667,948  
MACHINE FOR MAKING SHOE SOLES  
Filed April 20, 1922  12 Sheets-Sheet 3

Witness  
B. L. Baker.

Inventor  
FREDERICK H. PERRY, DECEASED  
EDNA A. PERRY, EXECUTRIX  
By her Attorney  
Nelson W. Howard

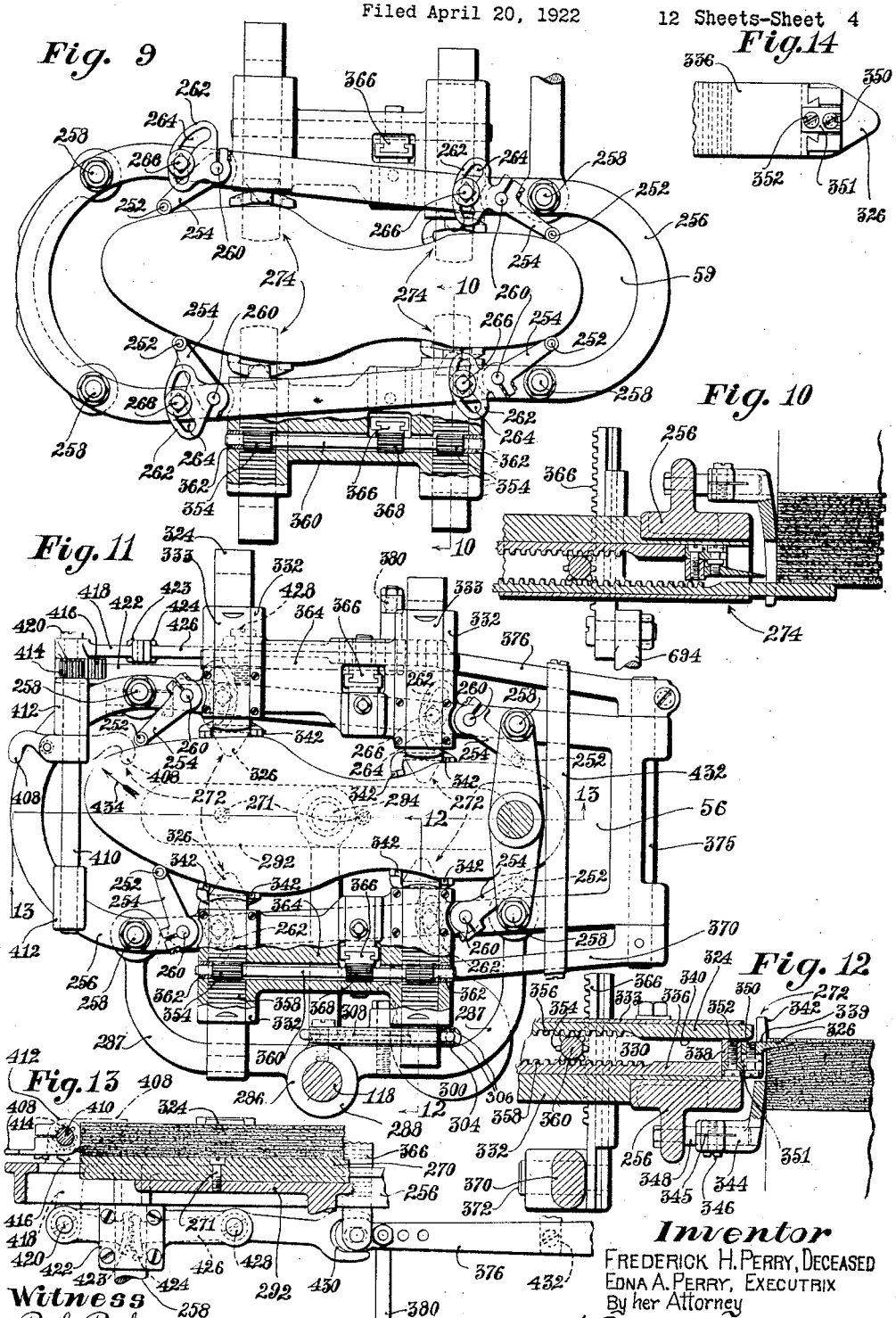

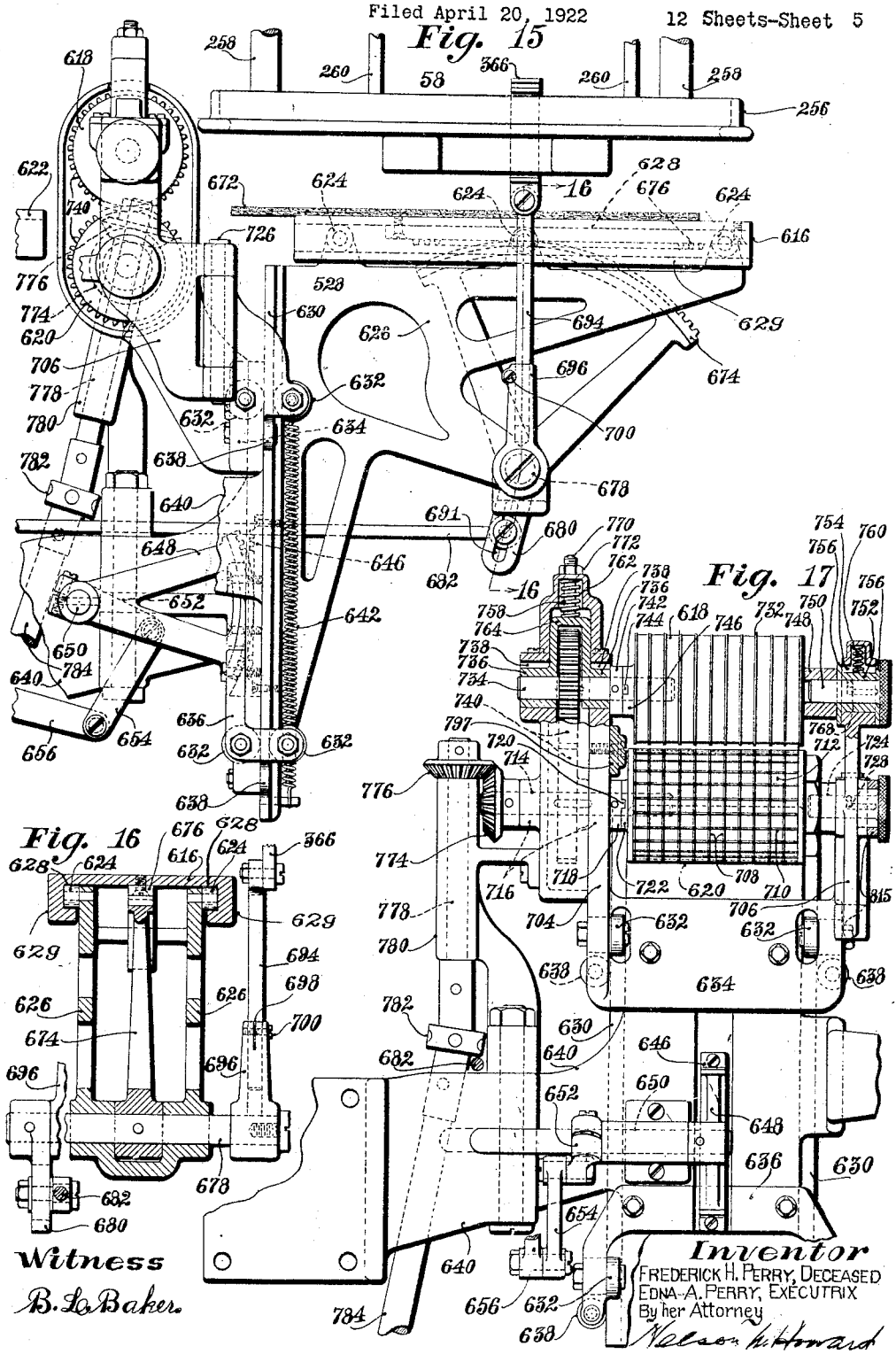

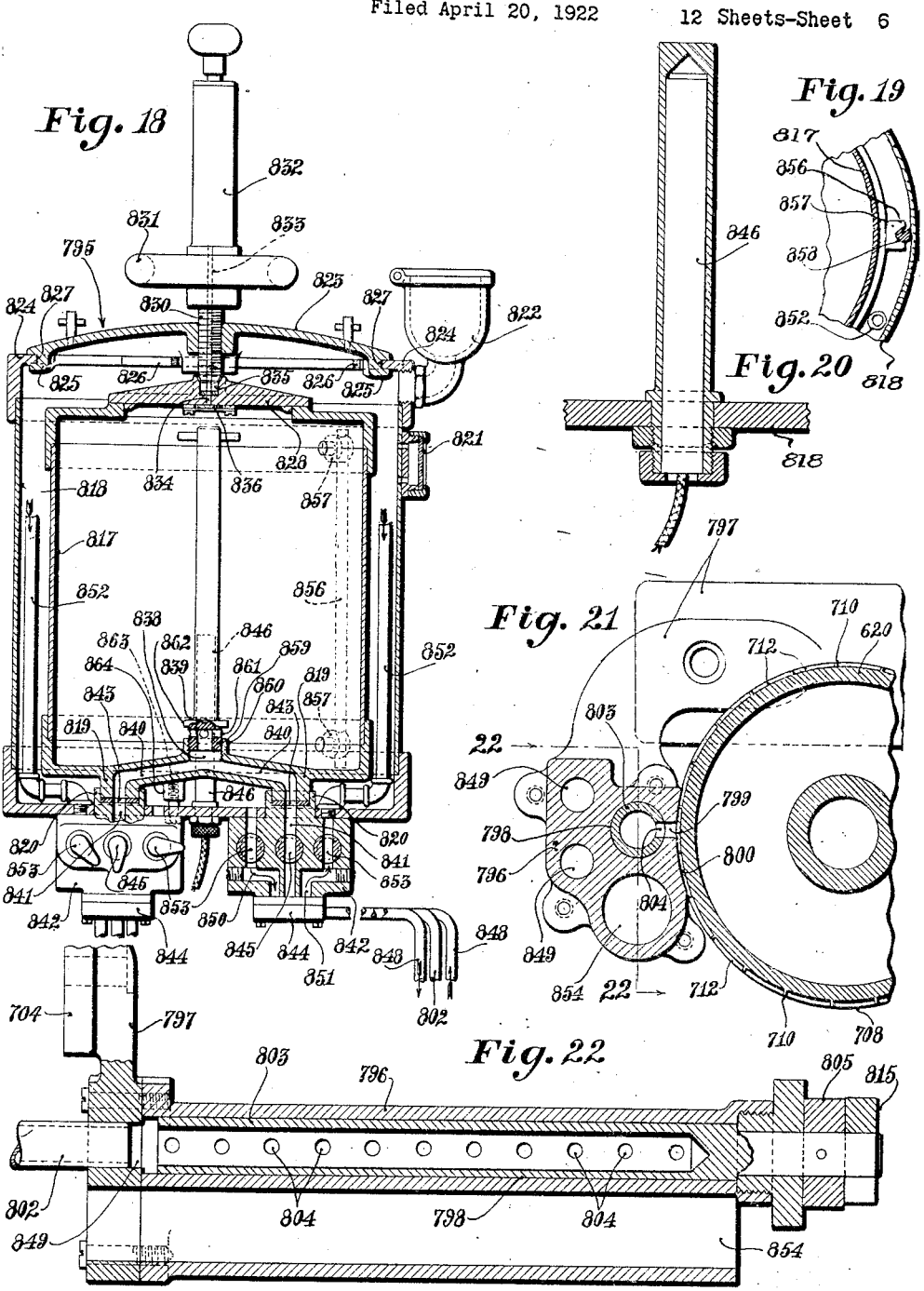
May 1, 1928.
F. H. PERRY
1,667,948
MACHINE FOR MAKING SHOE SOLES
Filed April 20, 1922  12 Sheets-Sheet 6
Witness
B. L. Baker.
Inventor
FREDERICK H. PERRY, DECEASED
EDNA A. PERRY, EXECUTRIX
By her Attorney May 1, 1928. 1,667,948
F. H. PERRY
MACHINE FOR MAKING SHOE SOLES
Filed April 20, 1922   12 Sheets-Sheet 7
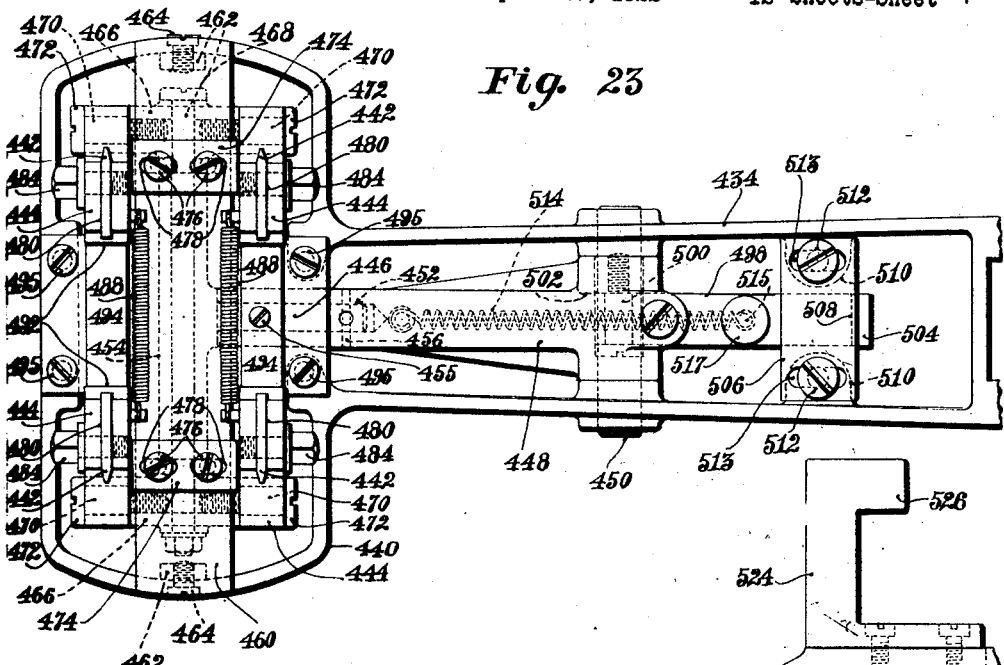
Fig. 23
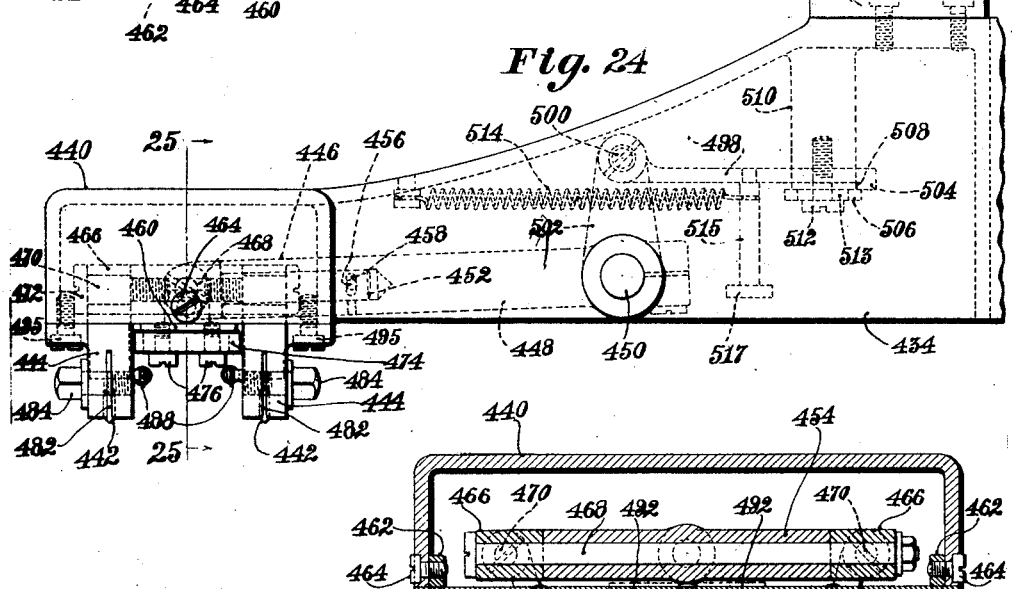
Fig. 24
Fig. 25
Witness
B. L. Baker.
Inventor
FREDERICK H. PERRY, DECEASED
EDNA A. PERRY, EXECUTRIX
By her Attorney
Nelson H. Howard

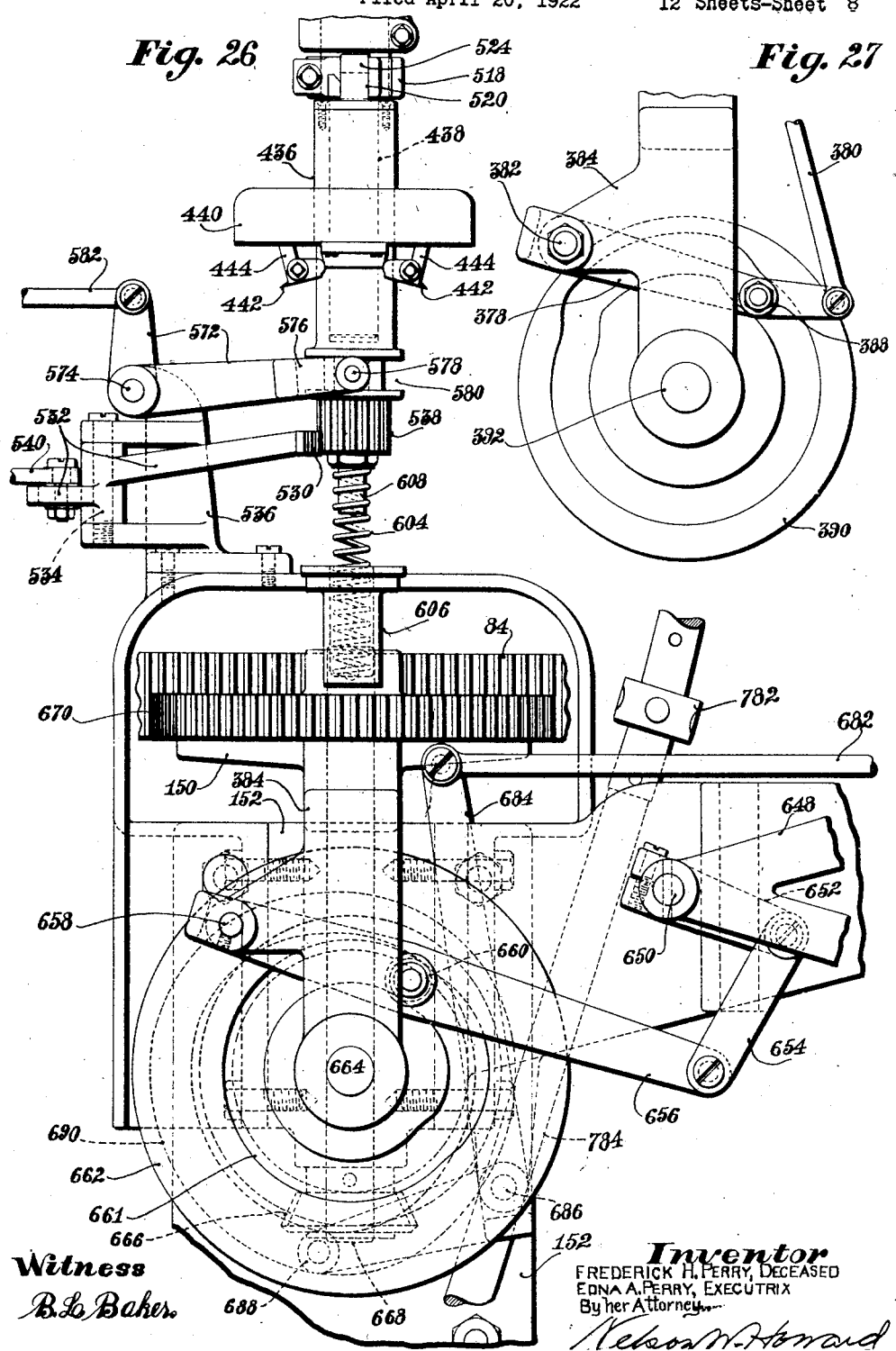

May 1, 1928.

F. H. PERRY 1,667,948

MACHINE FOR MAKING SHOE SOLES

Filed April 20, 1922   12 Sheets-Sheet 9

Witness
B. L. Baker.

Inventor
FREDERICK H. PERRY, DECEASED
EDNA A. PERRY, EXECUTRIX
By her Attorney
Nelson W. Howard May 1, 1928.  1,667,948
F. H. PERRY
MACHINE FOR MAKING SHOE SOLES
Filed April 20, 1922    12 Sheets-Sheet 10
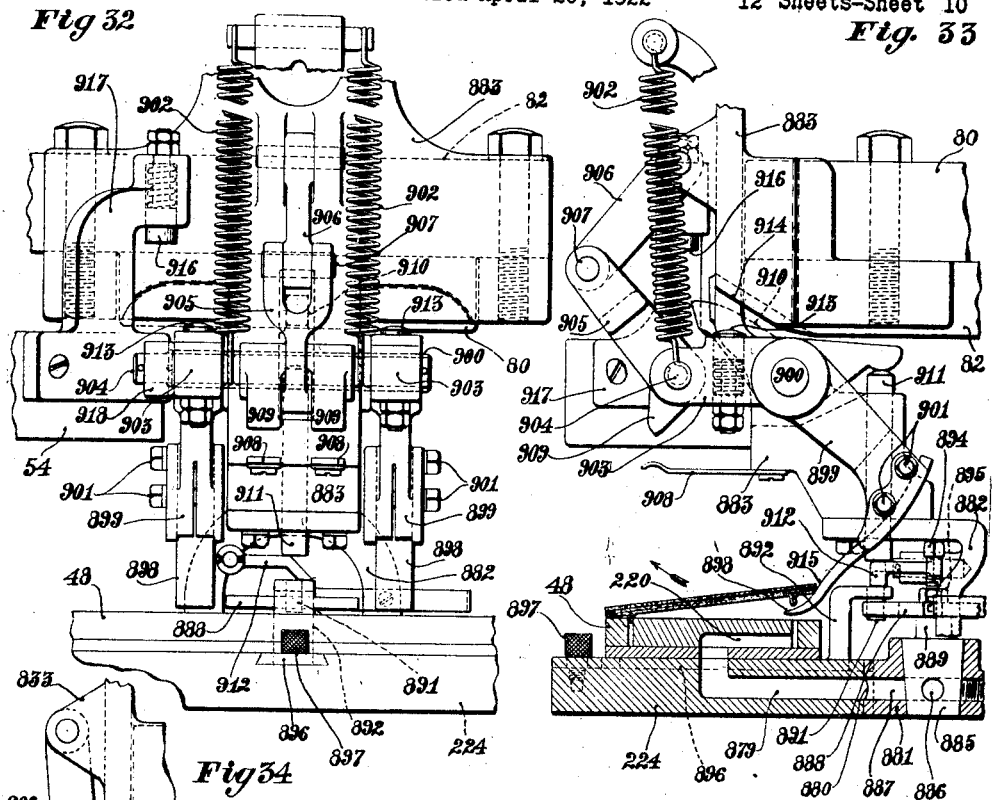
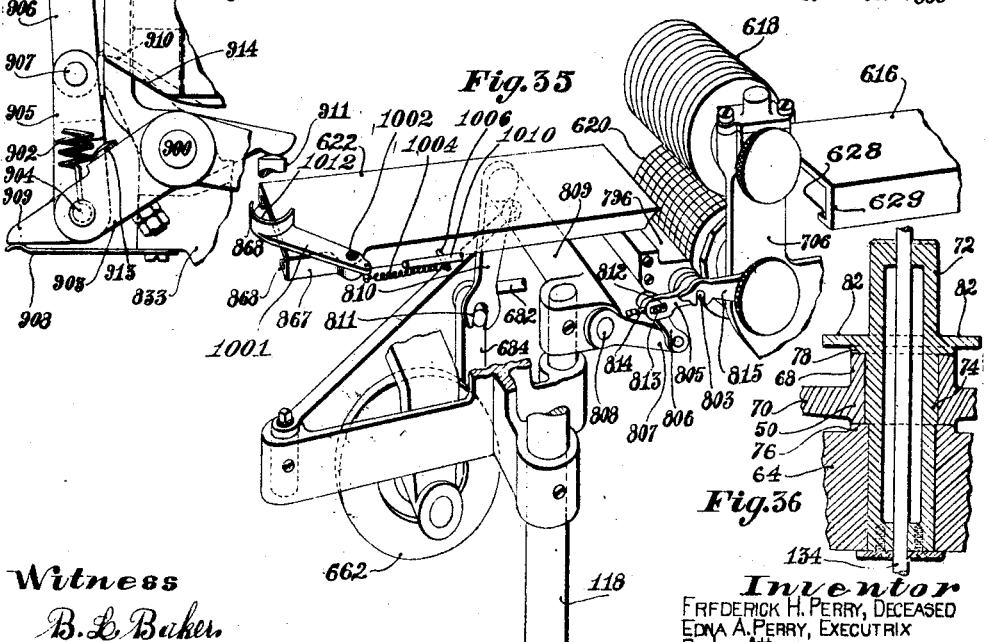
Witness
B. L. Baker.
Inventor
FREDERICK H. PERRY, DECEASED
EDNA A. PERRY, EXECUTRIX
By her Attorney May 1, 1928.

F. H. PERRY 1,667,948

MACHINE FOR MAKING SHOE SOLES

Filed April 20, 1922    12 Sheets-Sheet 11

Fig. 37

Fig. 38

Witness
B. L. Baker.

Inventor
FREDERICK H. PERRY, DECEASED
EDNA A. PERRY, EXECUTRIX
By her Attorney
Nelson W. Howard May 1, 1928. 1,667,948
F. H. PERRY
MACHINE FOR MAKING SHOE SOLES
Filed April 20, 1922 12 Sheets-Sheet 12
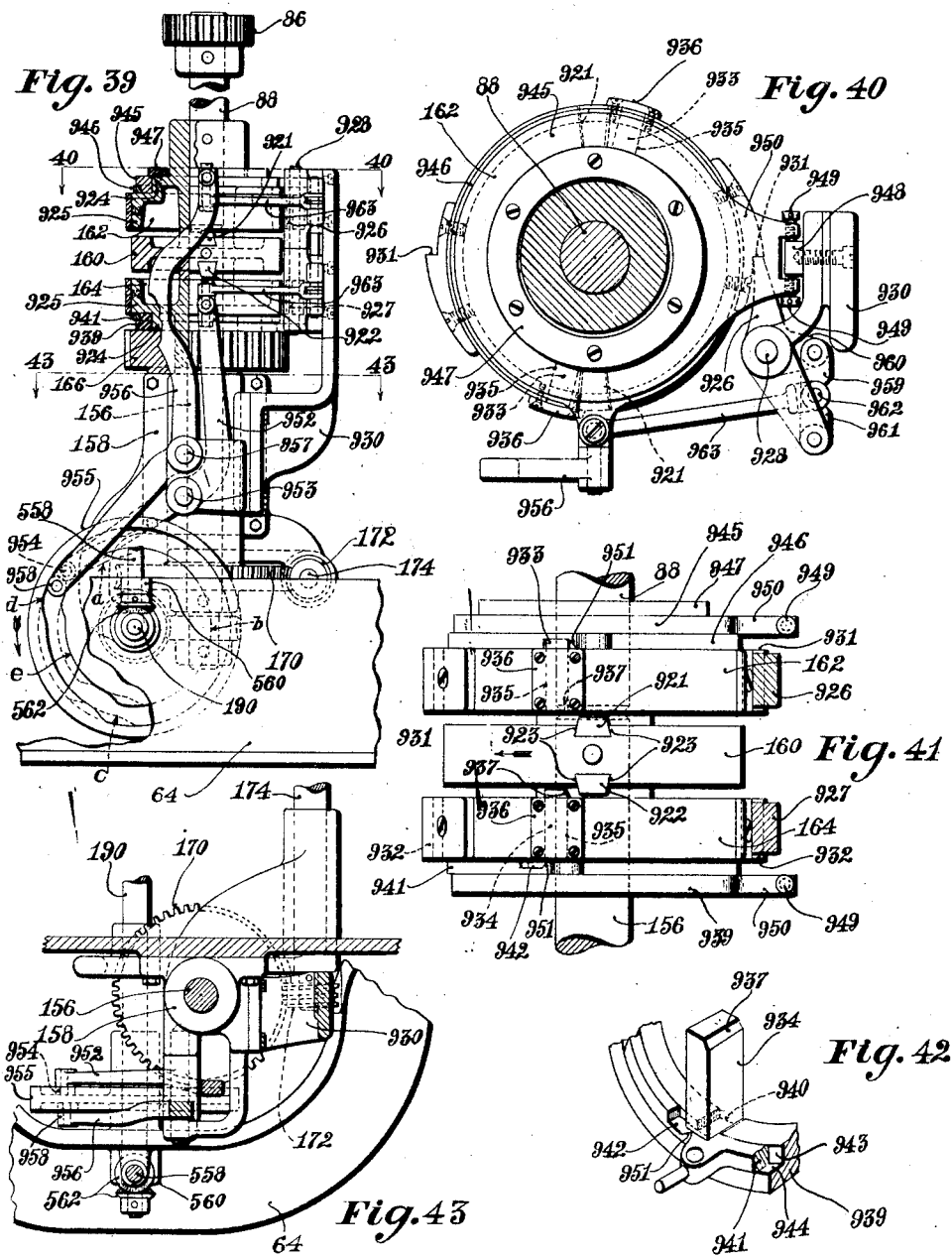

Patented May 1, 1928.

1,667,948

UNITED STATES PATENT OFFICE.

FREDERICK H. PERRY, DECEASED, LATE OF BEVERLY, MASSACHUSETTS, BY EDNA A. PERRY, EXECUTRIX, OF BEVERLY, MASSACHUSETTS, ASSIGNOR TO UNITED SHOE MACHINERY CORPORATION, OF PATERSON, NEW JERSEY, A CORPORATION OF NEW JERSEY.

MACHINE FOR MAKING SHOE SOLES.

Application filed April 20, 1922. Serial No. 555,774.

The present invention relates to machines for making shoe soles, and more particularly to a machine for making what are known commercially as manufactured insoles from stock supplied to the machine in the form of sole-shaped blanks.

Manufactured insoles for welt shoes are built up of two or more layers of sheet material which are secured together in face-to-face relation, at least one of the layers having a projection formed thereon and furnishing a rib to which the upper materials and the welt of the shoe are sewed.

An object of the invention is to reorganize and improve the construction and mode of operation of the machines of the character named for the purpose of rendering them more efficient and accurate in operation.

To the accomplishment of this object and such others as may hereinafter appear, the invention comprises the features and combinations of parts hereinafter described and particularly pointed out in the appended claims.

The invention will be readily understood from the accompanying drawings, illustrating one form of the invention, and from the following detailed description of the construction shown therein.

Figure 6:
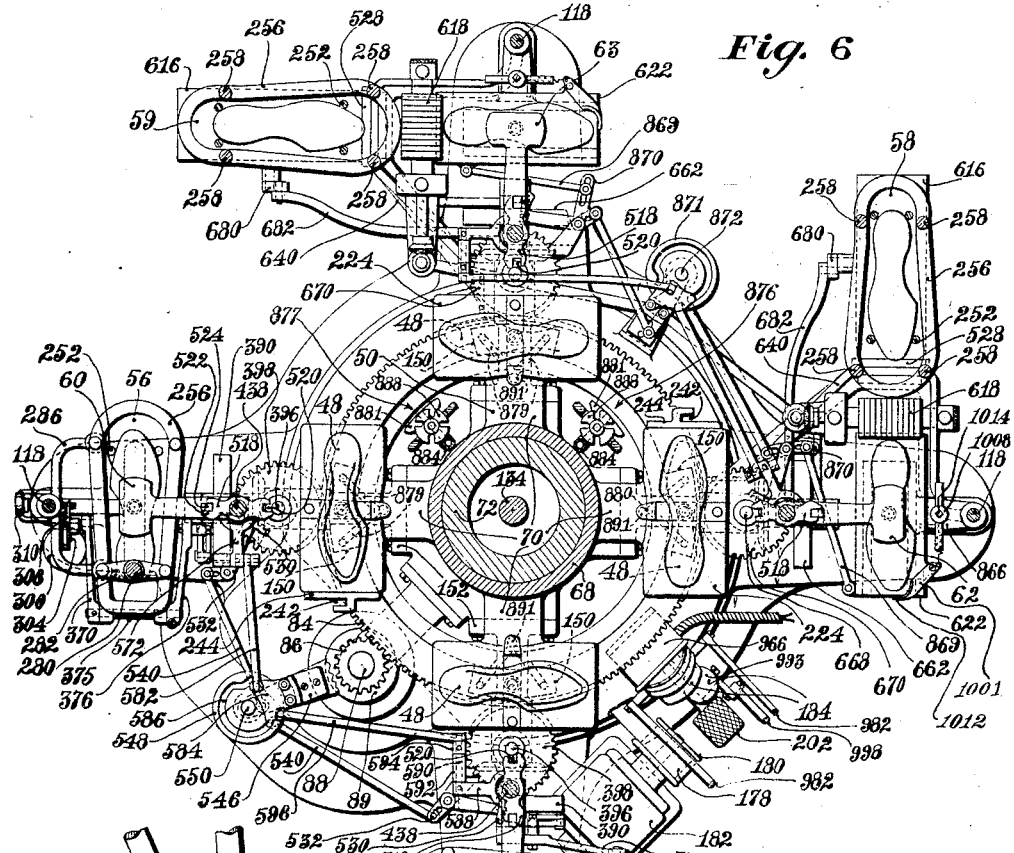
Figures 7, 8:
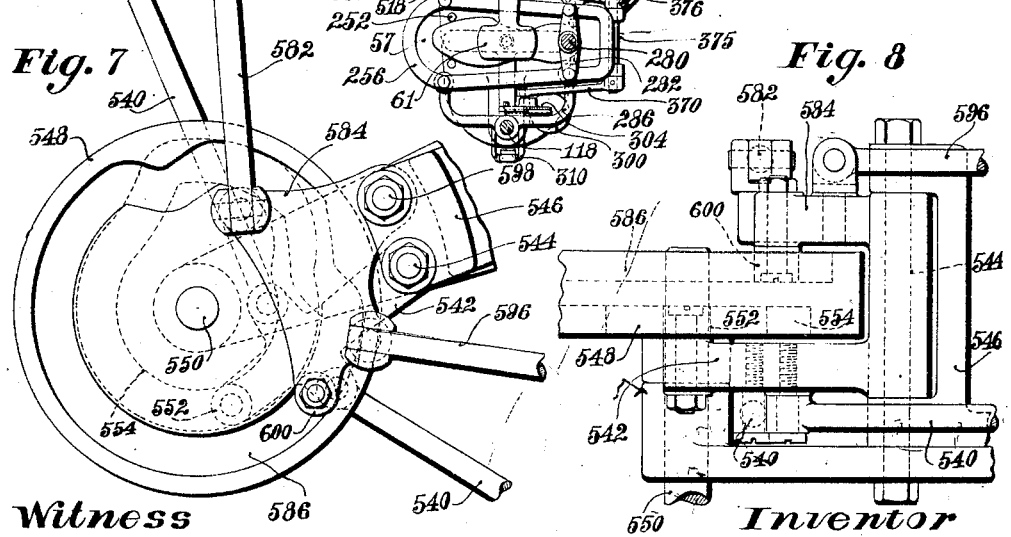
Figure 29:
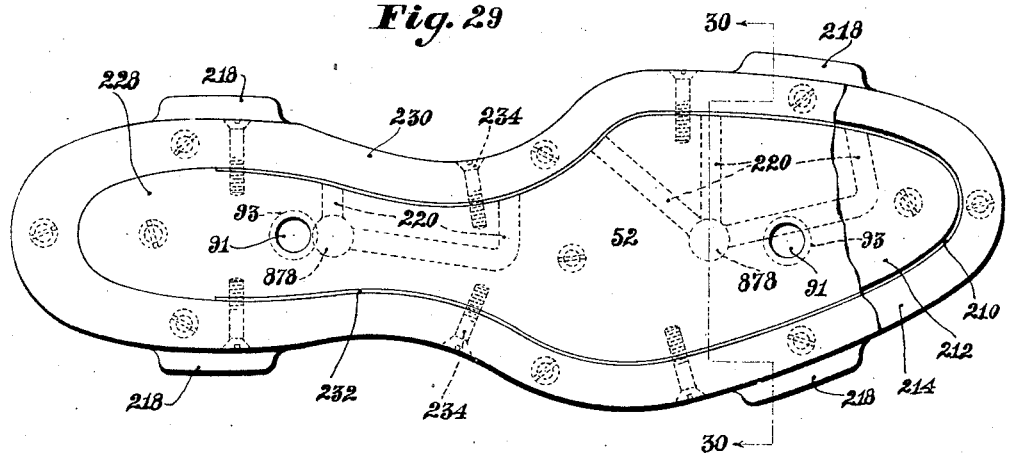
Figure 28:
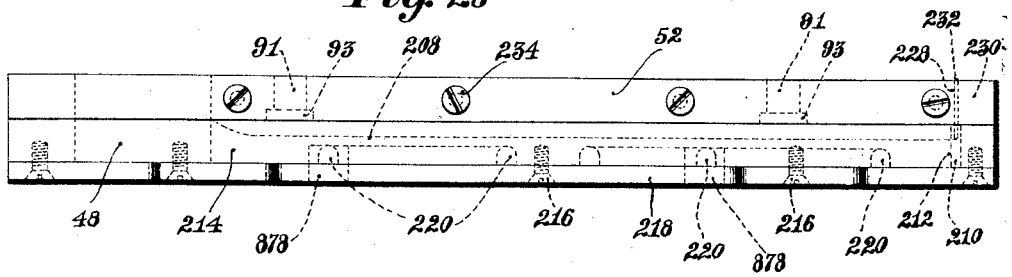
Figure 30:
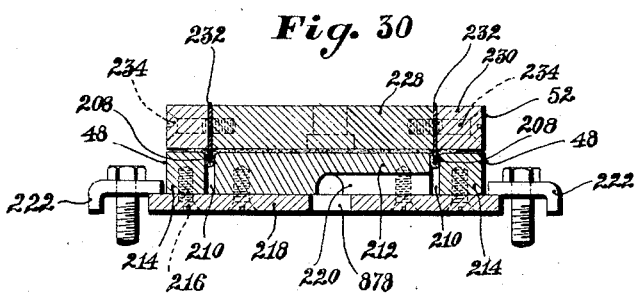
Figure 31:
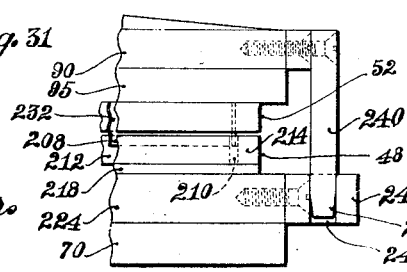

In the drawings, Figure 1 is a view, in front elevation, of a machine constructed in accordance with the present invention, certain portions of the machine being shown in section to illustrate details of construction; Fig. 2 is a plan view of the upper portion of the machine; Fig. 3 is a detailed perspective view of one of the devices for controlling the admission of compressed air to the lower dies for the purpose of ejecting the completed insoles therefrom; Fig. 4 is a detailed view, in front elevation, of the switch for controlling the motor which drives the machine; Fig. 5 is a view, partially in plan and partially in central horizontal section, of the switch shown in Fig. 4; Fig. 6 is a sectional plan view taken substantially on the line 6—6 of Fig. 1 but with parts omitted; Fig. 7 is a detailed plan view, on an enlarged scale, of a portion of the mechanism for actuating the picker devices which transfer the canvas insole blanks from the supply magazines to lower dies; Fig. 8 is a view, in side elevation, of a portion of the mechanism shown in Fig. 7; Fig. 9 is a plan view, on an enlarged scale, of one of the supply magazines for holding the composite leather and fibre blanks which are to be assembled with the canvas blanks to produce the laminated insoles, this view also showing, partially in plan and partially in section, the mechanism for separating the endmost blank from the stack in the magazine; Fig. 10 is a sectional view taken on the line 10—10 of Fig. 9; Fig. 11 is a top plan view, partially in section, of one of the magazines for holding the canvas blanks, showing also the associated blank-separating mechanism; Fig. 12 is a sectional view taken on the line 12—12 of Fig. 11; Fig. 13 is a sectional view taken substantially on the line 13—13 of Fig. 11; Fig. 14 is a fragmentary inverted plan view of the lower finger of the blank separator device shown in Fig. 12; Fig. 15 is a view, in side elevation, of a portion of the actuating means for the blank-separating mechanism associated with one of the magazines which contain the composite blanks, this view showing also the cement rolls associated with said magazine and the mechanism for transferring the insole blanks from the magazine to the rolls; Fig. 16 is a detailed sectional view taken on the line 16—16 of Fig. 15; Fig. 17 is an end view of the mechanism shown in Fig. 15, looking from left to right in said figure; Fig. 18 is a view, in central vertical section, of the cement tank; Fig. 19 is a detailed cross-sectional view of a portion of the cement reservoir; Fig. 20 is a vertical sectional view of one of the heating units used in connection with the cement tank; Fig. 21 is a transverse sectional view of one of the cement-applying rolls and the distributing head for supplying cement thereto; Fig. 22 is a sectional view taken on the line 22—22 of Fig. 21; Fig. 23 is an inverted plan view of one of the picker arms and the picker device carried thereby for handling the insole blanks; Fig. 24 is a view, in side elevation, of the parts shown in Fig. 23; Fig. 25 is a sectional view taken on the line 25—25 of Fig. 24; Fig. 26 is a view, in front elevation, of a portion of the mechanism for actuating one of the picker arms together with the cam and portions of the mechanism actuated thereby for transferring the composite blanks from one of the supply magazines to the adjacent cement rolls; Fig. 27 is a view, in front elevation, of the cam and cam lever for actuating the blank separating mechanism associated with the magazines for the canvas blanks; Fig. 28 is a view, in side elevation, of one pair of upper and lower dies, showing the dies in cooperative relation; Fig. 29 is a top plan view, partly broken away, of the dies shown in Fig. 28; Fig. 30 is a transverse sectional view of said dies, illustrating their action in moulding a sewing-rib in a canvas blank; Fig. 31 is a detail view, in side elevation, of the toe ends of two cooperating sewing-rib forming dies, showing the devices for insuring accurate vertical alinement of the dies; Fig. 32 is a view in front elevation, of one of the mechanical blank-ejector devices; Fig. 33 is a view, partially in end elevation and partially in section of the mechanism shown in Fig. 32; Fig. 34 is a detailed view, in end elevation, of a portion of the ejector mechanism, the operative parts being shown in different positions from those in which they appear in Fig. 33; Fig. 35 is a perspective view of the cement rolls and associated mechanism for feeding the composite blanks; Fig. 36 is a detailed view, in vertical section and on a much reduced scale illustrating the mounting of the turret which carries the lower dies; Fig. 37 is a sectional plan view taken substantially on the line 37—37 of Fig. 1; Fig. 38 is a sectional view taken substantially on the line 38—38 of Fig. 37; Fig. 39 is a view, partially in front elevation and partially in central vertical section, of the clutch mechanism; Fig. 40 is a view, partially in plan and partially in section and on an enlarged scale, of the clutch mechanism, the section being taken on the line 40—40 of Fig. 39; Fig. 41 is a view, in front elevation, of a portion of the mechanism shown in Fig. 40; Fig. 42 is a detailed perspective view of a portion of the clutch mechanism; and Fig. 43 is a sectional view taken on the line 43—43 of Fig. 39.

The machine illustrated in the drawings is designed to manufacture a multiple-layer insole, the sewing-rib surface of which may be furnished by a blank of some such fabric as canvas, while to this may be secured a composite blank, consisting of pieces of fibre and leather skiving, previously cemented together in face-to-face relation, and forming an intermediate layer and the other outer or sock layer, of the insole. The composite character of the second blank, however, forms no essential part of the invention.

The illustrated machine is adapted to make two insoles of the above described type simultaneously. Accordingly, provision is made whereby at each cycle of operations of the machine, two blanks consisting of sheets of canvas are operated upon by instrumentalities which mould a sewing-rib thereon, and two composite blanks made up of sheets of fibre and leather are secured in face-to-face relation with two other canvas blanks upon which sewing-ribs were moulded at the preceding cycle of operations of the machine. To this end, four female sewing-rib forming dies 48 (Figs. 1 and 6) are mounted 90 degrees apart upon an intermittently actuated rotatable turret 50. The dies 48 are arranged with their blank-engaging faces horizontally disposed to receive and support the insole blanks to be operated upon. For the purpose of moulding the sewing-ribs in the canvas blanks, two male dies 52 (Figs. 1 and 2) are adapted to cooperate with the female dies 48 at adjacent stations of the turret 50 separated by quadrants. For the purpose of securing together the canvas blanks and the composite blanks, two smooth faced sole-pressing dies 54 are arranged to cooperate with the female dies 48 at the other two 90-degree stations of the turret. The male sewing-rib forming dies 52 and the sole-pressing dies 54 are arranged to reciprocate vertically above the turret and do not participate in the rotation of the latter.

The turret 50 is rotated 180 degrees while the upper dies 52 and 54 are raised out of cooperative relation with the turret dies 48, bringing two empty turret dies beneath the two male sewing-rib forming dies 52. At the same time the other two turret dies 48 are brought into position beneath the two sole-pressing dies 54, said turret dies supporting the canvas blanks in which sewing-ribs were moulded at the preceding cycle of the machine. While the turret 50 momentarily remains stationary, after each partial rotation thereof, a single canvas blank is placed upon each of the empty dies carried by the turret and a single composite leather and fibre blank, the under face of which has been coated with cement, is superposed upon each of the ribbed canvas blanks supported by the other turret dies. The four upper dies 52 and 54 are then lowered simultaneously into cooperative relation with the four turret dies. This operation causes a sewing-rib to be moulded in the two newly-supplied canvas blanks, while the two composite blanks are pressed against the previously-ribbed canvas blanks, thus forming two complete insoles. The upper dies are then raised and the turret is rotated through another half revolution. During each partial rotation or step movement of the turret, the completed insoles are ejected from the lower dies which supported them, leaving these dies ready to receive fresh canvas blanks at the next cycle of operation.

The canvas blanks are supplied to the machine from two magazines, containers or holders 56 and 57, and the composite blanks are supplied from two magazines 58 and 59. The blanks are removed, one at a time, from the series held in the magazines 56 and 57 by means of picker or conveying devices 60 and 61, and from the magazines 58 and 59 by means of similar picker devices 62 and 63, being transferred by said picker devices to the dies 48 carried by the turret.

The turret 50 is mounted to rotate in a horizontal plane between a hollow base 64 (Fig. 1) and an upper frame member 66. As shown in Figs. 6 and 36, the turret 50 comprises a central hub 68 and four radiating arms 70 equally spaced apart thereon. The turret is journaled on a hollow vertical post 72, the lower portion of which is fixed in the base 64. Above the base 64, a portion 74 of the post 72, which is of slightly greater diameter than the lower portion, provides a bearing for the turret. The hub 68 of the turret 50 rests upon a bearing face 76 at the upper extremity of the base 64, while the upper face of the hub engages a bearing surface on the lower side of an annular flange 78 formed on the post 72. Above the flange 78 on axial extension of the post 72 projects into a cylindrical recess in the upper frame member 66. The lower portion of the upper frame member 66 is flanged, as indicated at 80 in Figs. 1 and 2, and this flange is bolted to four arms 82 radiating from the flange 78 on the post 72, the arms 82 and flange 78 of the post 72 sustaining the weight of the upper frame member 66 and the parts mounted thereon.

The turret 50 is intermittently rotated in proper timed relation to the reciprocation of the upper dies 52 and 54 by means comprising an annular gear 84 (Figs. 1 and 6) which is provided with external gear teeth and is secured by screws to the under sides of the arms 70 of the turret. Meshing with the annular gear 84 is a pinion 86 secured to the upper end of a vertical driving shaft 88 journaled in a bearing 89 on the base 64.

Each of the upper dies 52 and 54 is secured to a die-holder 90 (Fig. 1) carried at the lower end of a plunger 92 mounted to slide in a bearing 94 in the upper frame member 66. The portion of the plunger 92 which extends through the bearing 94 is square in cross-section to prevent the plunger from turning. The portion 96 of the plunger is made cylindrical to pass through a central bore in a block 98. Rising axially from the upper portion 96 of the plunger 92 is a tail-rod 100 which extends through and is guided by a bearing 102 on a bracket 103 secured to the upper frame member 66. A stiff expansion spring 104 is coiled around the portion 96 of the plunger 92 and is housed within a sleeve 105 that is seated in a cylindrical recess in the under side of the block 98. The upper end of the spring 104 bears against a shoulder formed at the upper end of the sleeve 105 while the lower end of the spring bears upon the upper extremity of the squared portion of the plunger. The downward movement of the plunger under the influence of the spring 104 is limited by nuts 106 threaded on the portion 96 of the plunger and engaging the top of the block 98. The lower end of the sleeves 105 projects below the block 98 and is externally screw-threaded to receive a pair of nuts 108, one of which bears against the bottom of the block 98. By turning the nuts 108, the compression of the spring 104 may be varied to vary the pressure exerted by the upper die upon the work.

The die-carrying plungers 92 are reciprocated in their bearings 94 by crank-actuated links 110 having their lower ends pivotally connected with the blocks 98. The lower portion of each link 110 is bifurcated to embrace the block 98 and the ends of the arms of the link are provided with apertures which receive pivot pins 112, the inner ends of which are screw-threaded into the block 98. In order to prevent undue pressure on the pivot pins 112 during the work-engaging movement of the die, the lower extremities of the arms of the bifurcated link 110 engage shoulders 114 formed on the block 98. The weight of the upper dies 52 and 54, the die-carrying plungers 92 and associated movable parts is counterbalanced by coiled springs 116 (Fig. 1) which are severally secured at one end to the upper frame member 66 and at the opposite end to the respective die-carrier 90.

The links 110 associated with the upper dies 52 and 54, which are arranged at diametrically opposite sides of the machine, are pivotally connected at their upper ends with cranks 120 formed on axially alined horizontal shafts 122, the inner ends of which are journaled in bearings 124 supported by the upper frame member 66. The outer ends of the crank-shafts 122 are journaled in bearings 126 formed at the upper ends of diametrically arranged brackets 128, the lower ends of which are bolted to the upper frame member 66 and severally constitute one side of each of the bearings 94 for the die-carrying plungers 92. The brackets 128 are held rigid by long tie-bolts 118 rising from the base 64 and secured to the outer extremities of said brackets. The crank-shafts 122 are driven through beveled gears 130 secured on their inner ends. The gears 130 engage opposite sides of a beveled gear 132 secured to a central vertical driving shaft 134, the upper end of which extends through bearings in the upper frame member 66 while the lower portion thereof, as shown in Fig. 36, extends through bearings in the opposite ends of the hollow post 72 upon which the turret is journaled.

The links 110 associated with the other two upper dies 52 and 54 are pivotally connected at their upper ends with cranks 136 formed on two axially alined horizontal crank-shafts 138. As shown clearly in Fig. 2, the inner ends of the crank-shafts 138 are journaled in bearings 140 supported by the upper frame member 66 while their outer ends are extended through bearings 142 on a pair of diametrically arranged brackets 144 which are disposed at right angles to the brackets 128 and are likewise bolted to the frame member 66. As in the case of the brackets 128, the brackets 144 constitute one side of the bearings for the corresponding die-carrying plungers 92. The crank-shafts 138 are driven by means of a beveled gear 146 secured to the central driving shaft 134, which gear engages a pair of beveled gears 148, one of which is secured to the inner end of each crank shaft 138.

Inasmuch as heavy pressure is exerted by the upper dies 52 and 54 upon the work supported by the lower or turret dies 48, provision is made for receiving the downward pressure exerted by the upper dies upon the turret and thus relieving the bearing post 72 of the strain resulting from such pressure. To this end, the under side of the annular gear 84 carried by the turret is adapted to be engaged by four supporting lugs 150 (Figs. 1 and 6) rising from four radial brackets 152 (Figs. 1 and 6) that are arranged 90 degrees apart about the base 64 to which they are bolted. The height of the supporting lugs 150 is such that at times when there is no pressure on the dies, i. e., during the partial rotations of the turret 50, the under side of the gear 84 will be maintained just out of actual contact with the upper faces of the lugs 150, but when the work is subjected to the pressure of the upper dies, the slight downward spring of the turret 50 brings the gear 84 into contact with said lugs which then receive the downward thrust of the dies.

The shaft 88 which actuates the turret 50, and the shaft 134 which actuates the upper dies 52 and 54, are both driven from a continuously rotating vertical shaft 156 arranged in axial alinement with the shaft 88 and journaled in a bearing 158 supported by the base 64. The shaft 156 drives the shafts 88 and 134 through a clutch comprising a central driving clutch member 160 (Fig. 1) secured to the shaft 156, a driven clutch member 162, at the upper side of the central member 160, which is secured to the lower end of the shaft 88 and a second driven clutch member 164, at the lower side of the central clutch member 160, which is mounted to turn freely on the driving shaft 156. The driven clutch member 164 has a pinion 166 secured thereto which engages a gear 168 secured to the lower extremity of the central driving shaft 134. The central clutch member 160 is provided with driving projections upon both its upper and lower faces. The driven clutch members 162 and 164 are severally provided with devices whereby they may be independently connected with or disconnected from the driving clutch member 160 and mechanism is provided, as will hereinafter appear, for automatically actuating these devices to connect the two driven clutch members alternately with the driving clutch member.

The clutch shaft 156 has secured thereto a worm wheel 170 (Figs. 1 and 37) which is driven by a worm 172 secured to one end of a horizontal driving shaft 174 journaled at its opposite ends in bearings supported by the base 64. A pulley 176 (Fig. 37) is secured to the driving shaft 174 and is connected by a belt 178 with a pulley 180 carried by the armature shaft of an electric motor 182 which is mounted upon the base 64 and is started and stopped by a manually controlled switch 184 (Fig. 1) that is also mounted upon the base 64.

To stop the machine quickly when the power is thrown off from the motor 182, a suitable brake is provided comprising a brake drum 186, (Figs. 37 and 38) which is secured to the horizontal driving shaft 174, and a pair of segmental brake shoes 188 which are severally pivoted at one end upon a horizontal shaft 190 hereinafter to be referred to. The pivoted ends of the brake shoes 188 are arranged side-by-side upon the shaft 190 and are confined between a pair of collars 192 which are secured to said shaft. At their opposite ends the brake shoes 188 are connected by means of a toggle 194. A spring 196, interposed between the base 64 and the knee of the toggle 194, tends to straighten the toggle and thus release the brake. The toggle is adapted to be actuated to set the brake by means of a bell-crank lever 198 which is fulcrumed at 200 upon the base 64 and one arm of which is pivotally connected with the knee of the toggle 194. The opposite arm of the bell-crank lever 198 constitutes a foot treadle 202 for actuating the toggle when the brake is released. In Fig. 38 the foot treadle 202 is shown in its lowermost position and the brake is set. The foot treadle is maintained in this position while the machine is at rest by means which will be described hereinafter. While the machine is in operation, however, the brake is released and the foot treadle raised. The foot treadle may then be depressed at any time to set the brake and stop the machine. Connections are provided, as will be hereinafter described, whereby the brake may be operated by compressed air, the action of which is automatically controlled by the switch 184, the construction being such that when the switch is closed to start the motor, the brake will be released, and when the switch is opened to stop the motor, the brake will be set.

The construction of the lower dies 48 which are mounted upon the turret 50 and the upper dies 52 which cooperate with the lower dies to mould sewing-ribs in the canvas blanks is clearly illustrated in detail in Figs. 28 to 31, inclusive. As therein shown, each sewing-rib forming die 52 is provided with a depending rib 208 adapted to crimp the canvas and force it to enter a correspondingly shaped groove 210 in the cooperating lower die 48.

The lower or turret dies 48 each comprises a flat plate 212, forming the central portion of the die, and a second plate 214 in the form of a wide endless band which surrounds the edge of the plate 212 and constitutes the marginal portion of the die. The plate 212 has a marginal contour corresponding to the outline of the sewing-rib to be moulded in the canvas blank. The inner side of the surrounding plate 214 is curved to correspond to the curvature of the edge of the inner plate 212. The two plates 212 and 214 are arranged with the curved inner side of the outer plate 214 in close parallel relation to the curved edge of the inner plate 212. The plates 212 and 214, thus arranged, are secured by screws 216 to the upper face of a thin backing plate 218. With this construction, a narrow marginal space is provided between the inner and outer plates 212 and 214, this space constituting the sewing-rib forming groove 210 of the die. Both plates 212 and 214 are of the same thickness so that when secured to the backing plate 218, their upper faces will be disposed in the same plane and thus adapted to properly support the body portion of the canvas blank at both sides of the sewing-rib. The inner die plates 212 are provided with air passages 220 through which compressed air is forced to assist in ejecting the completed insoles, as will be explained hereinafter in detail. The dies 48 are detachably secured to die-carrier plates 224 (Fig. 1) by means of clamping devices 222 (Fig. 30) which are threaded into the die-carrier plates and engage the backing plates 218. The die-carrier plates 224 (Fig. 6) are rectangular in outline and are secured to the outer ends of the turret arms 70.

The upper sewing-rib forming dies 52 each comprises a flat inner plate 228 (Figs. 28, 29 and 30) and a surrounding plate 230. These members correspond to the inner and outer plates 212 and 214, respectively, of the lower dies 48, the marginal contours of both sets of plates being the same. Interposed between the inner and outer plates 228 and 230 of each upper die 52 is a thin band or strip 232 which projects below the under surfaces of said plates and constitutes the rib 208, by which the canvas is crimped into the groove 210. The inner and outer plates 228 and 230 and the interposed band 232 are secured together by screws 234 which extend horizontally through these members from the outer side of the plate 230. The upper dies 52 may be secured to the respective die-holders 90 which are carried by the plungers 92. As shown in Figs. 28 and 29, the dies 52 are provided with two holes 91 through which may extend screws threaded at their upper ends into the die-holders 90 and provided with heads at their lower ends to engage shoulders formed by counterbored recesses 93 about the holes 91. As shown in Fig. 1, filler plates 95 may be employed so that the lower faces of the dies 52 will lie in the same horizontal plane as the lower faces of the dies 54.

To insure that the ribs 208 on the upper dies 52 will properly enter the grooves 210 in the lower dies 48, means is provided for determining with absolute accuracy the circumferential positions of the lower dies relatively to the upper dies before the latter cooperate with the former. To this end, a positioning tongue 240 (Figs. 1, 2 and 31) projects downwardly from the die holder 90 of one of the upper dies 52 at the toe end thereof. The tongue 240 is adapted to enter one or the other of two notches 242 (Figs. 6 and 31) formed in a pair of members 244 severally secured to the die-carrier plates 224 of two diametrically arranged turret dies 48. The positioning tongue 240 and the notched members 244 are so constructed and arranged, that as the tongue projects into the notch in one of said members, the cooperating ribs and grooves of the sewing-rib forming dies will be brought into accurate vertical alinement. The tongue 240 is somewhat tapered at its front and rear sides, as indicated at 246 in Fig. 31, so that if the upper and lower dies are slightly out of proper alinement, as the upper dies descend after each partial rotation of the turret, the tongue 240 will nevertheless enter the notch 242. As the tongue 240 is forced downwardly in the notch 242, one or the other of its inclined sides 246 will cause the turret to turn sufficiently to bring both lower dies 48 into accurate vertical alignment with the cooperating upper dies 52 and 54.

The sole-pressing dies 54 comprise solid blocks having flat lower faces horizontally arranged to cooperate with the flat horizontal upper faces of the turret dies 48 to press the canvas and composite sole blanks together. The sole-pressing dies 54 may be secured in any desired manner to their respective die-holders 90, such as by the tongue and groove construction shown in Fig. 1.

One of the sewing-rib forming dies 52 and one of the sole pressing dies 54, together with the turret dies 48, which cooperate therewith, are shaped to operate upon right sole blanks, while the other dies 52 and 54 and the other cooperating turret dies 48 are shaped to operate upon left sole blanks. The magazines 56 and 57 are loaded, respectively, with right and left canvas sole blanks, while the magazines 58 and 59 are loaded with right and left composite sole blanks, respectively. With this arrangement, a pair of right and left insoles is produced at each cycle of operations of the machine.

The blanks to be operated upon by the dies are supplied to the machine from the magazines 56, 57, 58 and 59 (Figs. 1, 2 and 6). The magazines 56 and 57 which contain right and left canvas blanks, respectively, are so located that when the turret 50 comes to rest between each partial rotation thereof, the dies 48 at two adjacent quadrants of the turret will be opposite the inner sides of said magazines. The magazines 58 and 59 which contain, respectively, right and left composite blanks of leather and fibre are arranged so as to be in proximity to the other dies 48 of the turret 50 while the turret is stationary. All of the magazines are constructed and arranged to support the blanks in vertical stacked formation.

As shown in detail in Figs. 9 to 12, inclusive, each of the supply magazines 56, 57, 58 and 59 comprise four vertical guide-rods 252 which are arranged to bear against the lateral edges of the stacked blanks at four separate points. To adapt the magazines to hold blanks of different sizes, the guide-rods 252 are adjustable inwardly or outwardly. To this end, the guide-rods 252 are supported at their opposite extremities by a pair of arms 254 which are mounted with provision for adjustment upon upper and lower frame members 256 horizontally disposed and adapted to surround the blanks at the top and bottom of the magazine. The frame members 256 of each magazine are rigidly connected together by means of four vertical tie-rods 258. The magazine structures consisting of the upper and lower frame members 256 and the tie-rods 258 are rigidly supported by means of brackets which are secured to fixed portions of the frame of the machine, as will hereinafter appear. The four guide-rods 252, in each of the several magazines, are arranged in oppositely disposed pairs, the members of which engage the opposite lateral edges of the blanks at points adjacent the toe and heel ends thereof, substantially as shown in Figs. 9 and 11. With this arrangement, the guide-rods 252 serve to prevent longitudinal as well as transverse edgewise displacement of the blanks.

To permit inward or outward adjustment of the guide-rods 252 in accordance with the size of the blanks to be stacked in the magazines, the supporting arms 254 for each of the four guide-rods in each magazine are severally rigidly secured to the upper and lower ends of four vertical supporting rods 260. The supporting rods 260 extend through apertures in the upper and lower magazine frame members 256, the opposite ends of these rods projecting respectively above the upper frame members and below the lower frame members to receive the guide-rod supporting arm 254, the latter being arranged adjacent the upper side of the upper frame member and adjacent the under side of the lower frame member. The lower set of guide-rod supporting arms 254 of the magazines 56 and 57, and the upper set of arms 254 of the magazines 58 and 59 are provided with extensions 262 having segmental slots 264 formed thereon. Screws 266 extend through the slots 264 and are threaded into the adjacent magazine frame members 256 to secure the arms 254 and the guide-rods 252 in adjusted positions. By loosening the bolts 266 to permit the arms 254 to be swung inwardly or outwardly, the guide-rods 252 may be adjusted independently as desired.

The stack of canvas blanks in each of the magazines 56 and 57 rests upon a supporting plate or follower 270 (Fig. 13) which engages the lowermost blank of the stack and is constantly urged in an upward direction to raise the stack so that the blanks will be successively brought to the top of the magazine. The stack is prevented from rising above the top of the magazine by a plurality of delivery devices 272 (Fig. 11 and 12) which separate the blanks from the stack as they successively reach the top of the magazine, these devices being actuated to release the topmost blank to permit its removal by the adjacent picker device 60 while preventing the upward escape from the magazine of the following blanks. The stack of composite blanks in each of the magazines 58 and 59 is arranged to feed downwardly by gravity. These blanks are supported by a plurality of delivery devices 274 (Figs 9 and 10) similar to the devices 272 employed in connection with the magazines 56. The devices 274 are actuated to separate the terminal blanks from the stack as they successively reach the bottom of the magazine and to release them so that they will be discharged, one by one, from the magazine.

The magazines 56 and 57 for the canvas blanks are supported by means of brackets 276 (Figs. 1 and 2) one of the brackets 276 being bolted to one side of the adjacent bracket 128 of the upper frame member 66, while the other bracket 276 is bolted to one side of the adjacent bracket 144 of the frame member 66. Formed at the outer end of each magazine-supporting bracket 276, is a split sleeve 278 arranged to receive a post 280 rising from a yoke 282, the arms of which are bolted at their lower extremities to the upper side of the upper frame member 256 of the magazine. The split sleeve 278 is contracted to grip the post 280 by two clamping bolts 284. This construction permits vertical adjustment of the magazine to locate it so that the uppermost blank will be supported at the proper elevation to be most effectively seized by the picker device 60. Each magazine 56 and 57 is further supported by a bracket 286 (Figs. 6 and 11) which is adjustably secured to the adjacent tie-bolt 118. The bracket 286 is formed with a pair of inwardly extending arms 287, (Fig. 11) the inner extremities of which are secured to the tie-rods 258 at the outer side of the magazine. As shown in Fig. 1, each bracket 286 is provided with a pair of axially alined sleeves 288 through which the respective tie-bolt 118 extends. One of the sleeves 288 of each bracket 286 is split and adapted to be pinched upon the tie-bolt 118 by a clamp-screw 290 which may be loosened to permit vertical adjustment of the magazine.

The supporting plates or followers 270 (Fig. 1), which support the stacks in the magazines 56 and 57, severally comprise a flat sole-shaped follower plate which rests upon a vertically movable supporting platform 292 (Figs. 1 and 13), the follower-plate 270 being removably secured to the platform by screws 271. The supporting platform 292 is carried at the upper end of a sleeve 293 mounted to slide on a vertical guide-post 294 rising from the base 64. Secured to the lower extremity of the sleeve 293 is one end of a supporting arm 296, the opposite end of which is mounted to slide upon the adjacent vertical tie-bolt 118. A stop-collar 298 on the tie-bolt 118 limits the upward sliding movement of the supporting arm 296 to prevent the follower-plate 270 from moving above the top of the magazine.

For the purpose of feeding the stack of blanks upwardly in the magazines 56 and 57, each follower plate 270 is acted upon by a heavy weight 300 suspended by a cord 302 which passes over a pulley 304 on the bracket 286 and is connected at its opposite end to the arm 296.

Means is provided for positively preventing downward movement of the stack in the magazine so that the uppermost blank will be unyieldingly supported when seized by the picker device 60 by which it is to be transferred into position to be operated upon. To this end, the flanges of each pulley 304 are provided with fine peripheral ratchet teeth 306 (Figs. 1 and 11) and two holding pawls 308 are pivoted upon the bracket 286 above the pulley and arranged to severally engage the ratchet teeth. The tooth-engaging edge of one of the holding pawls 308 is arranged in advance of the tooth-engaging edge of the other holding pawl, a distance equal to one half the length of a single tooth 306, thus increasing the efficiency of the holding device.

For the purpose of holding each follower plate 270 and its supporting platform 292 in their lowermost positions to permit the magazines 56 and 57 to be readily refilled with blanks, a latch 310 (Fig. 1) is associated with each of said magazines and is hinged at 312 to the respective supporting arm 296. The upper extremity of the latch 310 is adapted to enter a notch 314 on the under side of the stop-collar 298 on the adjacent tie-bolt 118. The stop-collar 298 is adjustably secured by a set-screw 318 to the tie-bolt 118 and may be adjusted thereupon to permit the follower plate to be latched at different elevations in the magazine in case it should be desired to only partially refill the magazine. Each latch 310 may be provided with a suitable handle 320 by which an attendant may readily depress the arm 296 to lower the follower plate 270.

The blank-separator devices 272 which control the release of the canvas blanks from the magazines 56 and 57, operate to separate the blanks from the stacks as they successively reach the top of the magazines, leaving the separated blanks free to be removed from the magazines, while temporarily preventing the rest of the blanks in the stacks from rising under the influence of the weights 300. There are four of these separator devices 272 at each magazine arranged in pairs at opposite sides of the magazine and adapted to engage the marginal portions of the sole blanks adjacent both the toe and heel ends thereof upon opposite sides of a longitudinal medial line.

As best shown in Fig. 12, each separator device 272 comprises a pair of reciprocating members or fingers 324 and 326 which are arranged one above the other at one side of the magazine and severally mounted for horizontal sliding movements. Each of the fingers 324 and 326 is adapted to be advanced so that its inner end projects into the magazine across the path of feed of the blanks and to be subsequently retracted clear of said path. The upper finger 324 is an abutment finger and is arranged to advance in a plane above the topmost blank in the stack, while the lower finger 326 is a separator finger and advances in a plane to project it between said blank and the one immediately beneath it. The upper and lower fingers of each separator device 272 are connected to move concurrently in opposite directions, both normal to the length of the blanks in the magazine.

By this construction and mode of operation of the separator devices, the inward or advancing movements of the lower fingers 326 operate to separate the top blank from the remainder of the stack, while the concurrent retraction of the upper fingers 324 releases said blanks, leaving it free to be removed from the magazine, the rest of the blanks in the stack at this time being retained within the magazine by the inwardly projecting lower fingers 326. When the lower fingers 326 are retracted to permit an upward feed movement of the stack to occur under the influence of the weight 300, the upper fingers 324 move inwardly above the stack to form abutments which engage the upper face of the topmost blank and limit the upward movement of the stack. The under face of the abutment finger 324 is spaced from the upper face of the separator finger 326 a distance equal to the thickness of the blank to be separated, thus insuring that a single blank only will be separated from the stack at each blank separating operation.

The blank separating mechanism for each of the two magazines 56 and 57 which, as before stated, comprises four separator devices 272, and the actuating means for said mechanism are identical in construction and mode of operation and consequently a description of one of said mechanisms, together with its actuating means, will suffice for both. In the construction shown, the upper finger 324 of each separator device 272 consists of a flat plate mounted to slide in a guideway 330 (Fig. 12) formed within a housing 332 secured to the upper side of the upper frame member 256 of the magazine. The upper side of the housing 332 is provided with a slidable cover 333 which permits the removal of the fingers 324 and 326. For the purpose of reducing any tendency of the upper finger 324 to engage the edge of the upper blank as the finger advances, the under face of the finger is curved transversely at its free end to provide a slightly convex surface.

The lower finger 326 of each separator device 272 is of blade-like form and is adjustable upon the inner end of a slide 336 mounted to reciprocate in the guideway 330 beneath the upper finger plate 324. The slide 336 rests upon the bottom wall of the guideway 330 and is provided at its inner end with an upstanding lug 338 having an upwardly directed bearing face upon which the under portion of the upper finger 324 is supported and adapted to slide. The finger 326 is formed with an upper horizontal face 339 (Fig. 12) which is opposed to a similar face 340 formed on the underside of the upper finger 324, the faces 339 and 340 being adapted to engage the under and upper faces respectively of the blanks in the magazine.

As shown in Figs. 11 and 14, the opposite lateral edges of each blade-like lower finger 326 are tapered to a point at its inner extremity and are beveled (Fig. 12) to form a knife-like edge. This construction permits the finger to readily force itself between two adjacent blanks when it is advanced into the magazine without any tendency to distort the edges of the blanks.

For the purpose of preventing possible edgewise displacement of the blanks engaged by the lower separator finger 326 as said finger forces its way into the stack, four pairs of gage fingers 342 are provided, the fingers of each pair rising adjacent the opposite lateral edges of the separator fingers from a sleeve 344 (Fig. 12). At one end, the sleeve 344 is split, as indicated at 345, and secured by a binding screw 346 to a post 348 projecting horizontally from a rib on the upper frame member 256 of the magazine. The gage fingers 342 engage the lateral edges of the blanks, the fingers associated with a separator device at one side taking the edgewise thrust of the blanks caused by the action of the lower finger 326 of the opposed separator device. The gage fingers 342 bear more closely against the blanks than the guide rods 252, the gage fingers being arranged to permit no edgewise play of the blanks between them. Thus the blanks are uniformly located with respect to the picker devices 60 associated with the particular magazine in which the blanks are contained.

Provision is made for adapting the separator devices 272 to operate upon blanks of different thicknesses so as to separate the blanks, one by one, from the stack. To this end, the lower finger 326 is mounted upon the slide 336 so that it may be adjusted vertically with relation to the upper finger 324 to vary the space between the two fingers as the thickness of the blanks may require. As shown in Fig. 14, the finger 326 has a dovetailed connection with the slide 336, whereby the finger is adapted for vertical adjustment. The finger 326 may be adjusted by means of a screw 350 having a portion which turning without longitudinal movement, in a bearing formed in a block 351 secured to the forward end of the slide 336 by a screw 352. The shank of the adjusting screw 350 is threaded into the finger 326. By means of the screw 350, a very fine adjustment of the lower separator finger 326 may be obtained for varying its relation to the upper separator finger.

The upper and lower fingers 324 and 326 of each of the pair of separator devices 272 at the outer side of the magazines 56 and 57 are reciprocated concurrently in opposite directions by means of a pinion 354 (Figs. 11 and 12) which is located in the guideway 330 between said fingers. The pinion 354 engages rack teeth 356 formed on the under side of the upper plate 324 and rack teeth 358 formed on the upper side of the slide 336 which carries the lower finger 326. The pinions 354 which actuate the two pairs of separator fingers at the side of the magazine which is remote from the turret 50 are formed upon a single horizontal shaft 360 journaled in bearings 362 in the housings 332 which enclose said pairs of fingers. The housings 332 are connected by an intermediate portion 364 which encloses the portion of the shaft 360 between the two pinions 354. The shaft 360 is rotated by means of a vertical rack-bar 366, the teeth of which engage the teeth of a pinion 368 (Fig. 11) secured to the shaft 360 between the pinions 354. The rack-bar 366 is mounted to slide in ways formed in the intermediate portion 364. An oscillating arm 370 (Figs. 1, 6 and 11) reciprocates the rack-bar 366, the latter being connected with one end of the arm by means of a pin 372 projecting from the rack-bar and entering a longitudinal slot 374 in the arm. The opposite end of the arm 370 is secured to the outer end of a rock-shaft 375 which extends transversely of the magazine, adjacent the heel end thereof, and is mounted to turn in bearings in the upper frame member 256 of the magazine.

The pair of separator devices 272 at the opposite or inner side of the magazine are similar in construction to those already described and like reference numerals are used to designate corresponding parts in the two pairs of devices. The vertical rack-bar 366 at the inner side of the magazine is reciprocated by an arm 376 (Fig. 11) which is secured to the inner end of the rock-shaft 375. As clearly shown in Fig. 13, the arm 376 has a pin-and-slot connection with the adjacent rack-bar 366 which is similar to the connection between the rack-bar 366 and arm 370 at the opposite side of the magazine.

The arm 376 at each of the magazines 56 and 57 is oscillated by a cam-actuated lever 378 (Figs. 1 and 27) connected by a link 380 with said arm. The cam lever 378 is fulcrumed at 382 upon a bracket 384 (Fig. 1), the latter being one of four such brackets which are spaced 90 degrees apart and constitute the outer ends of the four radial brackets 152 on the base 64. The lever 378 carries a cam-roll 388 which enters a groove in a cam 390 secured to a horizontal shaft 392 journaled in bearings in the bracket 384. The groove in the cam 390 is designed to cause a single reciprocation of both fingers 324 and 326 of each separator device 272 at each cycle of operations of the machine, thereby effecting the separation of a single blank from the stack in the magazine.

The cam 390 associated with each of the magazines 56 and 57 is rotated by a beveled gear 394 (Fig. 1) secured to the shaft 392, and engages a beveled pinion 395 fixed to the lower end of a vertical shaft 396 (see also Fig. 6) which is also journaled in bearings in the bracket 384. Secured to the upper end of the vertical shaft 396 is a spur gear 398, the teeth of which mesh with the annular gear 84. The ratio of the gearing is such that at each cycle of operations of the machine, partial rotation of the turret 50 will cause the cam 390 to be rotated through one complete revolution.

The blanks in each magazine 56, being severally composed of single layers of canvas, are quite thin and flexible and as they approach the top of the stack, the portions adjacent the heel and toe ends of the blanks beyond the points engaged by the separator devices 272 have a tendency to work or curl upwardly. If this be permitted, the blanks are likely to extend into the path of the picker device as it swings into position to seize the topmost blank. As a result, the upwardly curled edge of one or more blanks may be engaged by the picker device and the blank caused to buckle or curl in such a manner that it will fail to be overlapped by the inwardly advancing upper fingers of the separator devices and consequently will not be held down thereby.

It has also been found in practice, that it is possible for the marginal portions of the blanks at the top of the stack to curl upwardly at the points engaged by the lower fingers 326 to such an extent, during the retraction of these fingers, that the edge of the topmost blank may be engaged and crowded inwardly by the concurrently advancing upper finger 324, thus distorting said blank. In such a case, the upper fingers 324 of the separator devices may not overlap the marginal portions of the blanks as these fingers advance.

In the event of the uppermost blank failing to be overlapped and retained by the upper fingers of the separator devices as a result of the buckling of a blank, either by reason of its edge being engaged by the picker device or by the upper fingers of the separator devices, the blank immediately below the topmost blank will then be brought into engagement with the upper fingers as the stack feeds upwardly in the magazine. When the upper fingers 324 are next retracted, two blanks will be released from the magazine instead of the single blank desired.

To avoid the possible release of two or more blanks at a time from the magazines 56 and 57 in the above described manner, means is provided for engaging the upper face of the topmost blank in each magazine at the peripheries of the heel and toe ends of the blanks to prevent the objectionable upward curling thereof at the time the upper fingers of the separator devices advance into the magazines. The means for preventing the upward curling of the toe ends of the blanks also prevents the blanks from being engaged and buckled or distorted by the picker devices as they swing into position above the magazines. This means comprises curved presser fingers 408 (Figs. 11 and 13)

one of which is associated with each of said magazines. Each presser finger 408 is adapted, when occupying the operative position indicated by dot-and-dash lines in Fig. 11, to engage the uppermost blank adjacent the toe end and hold it substantially flat during the inward swing of the picker device and the inward movements of the upper fingers of the separator devices 272.

After a blank has been engaged by the picker device, the latter first rises to lift the blank a slight distance above the top of the stack and then swings laterally to remove the blank substantially in the direction indicated by the arrow 434 in Fig. 11. To permit the removal of the uppermost blank by the picker, the presser finger 408 is swung into the position in which it is shown by full lines in Figs. 11 and 13, being secured to a horizontal rock-shaft 410 extending in a direction normal to the length of the blanks and mounted to turn in bearings 412 upon the upper frame member 256 of the magazine. In order that the shaft 410 may be rocked to swing the finger 408 into and out of operative position, a pinion 414, secured to one end of the rock-shaft, is engaged by a segment 416 carried by the upwardly extending arm of a bell-crank lever 418 fulcrumed upon a stud 420 projecting from a bracket 422 secured to one of the tie-rods 258. Formed at the free end of the other arm of the bell-crank lever 418 is a segment 423 engaged by a segment 424 carried at one end of a lever 426 fulcrumed upon a stud 428 projecting from the bracket 422. The opposite end of the lever 426 is forked, as shown at 430 in Fig. 13, to embrace the outer end of the arm 376 so as to be moved thereby. Thus, when the arm 376 swings downwardly, the presser finger 408 will be moved into operative position to depress the toe end of the blank and when the arm 376 is swung upwardly, the presser finger will be retracted from engagement with the blank.

The means for preventing the heel ends of the blanks in the magazines 56 and 57 from curling upwardly consists of presser members 432, (Fig. 11) one of which is associated with each of said magazines. Each presser member 432 is in the form of a horizontal strip arranged above the heel end of the stack and having its opposite ends secured to the arms 370 and 376 on the rock-shaft 375. The presser member 432 is so located with respect to the stack in the magazine, that when the arms 370 and 376 are swung downwardly to lower the rack bar 366 for the purpose of retracting the lower fingers and advancing the upper fingers of the separator devices, the presser member is depressed to a plane substantially coincident with the plane of the central portion of the uppermost blank. Thus, if the heel portion of said blank has curled upwardly, it will be flattened by the presser member 432 before the edges of the upwardly curled portion can be engaged and distorted by the upper fingers of the separator devices. The arms 370 and 376 thereafter swing upwardly and the rack bars 366 are raised to reverse the direction of movement of the fingers of the separator devices so that the upper fingers are retracted and the uppermost blank released. The associated picker device then operates to remove the uppermost blank. The upward swinging movement of the arms 370 and 376 raises the presser member 432 sufficiently to permit the uppermost blank to be lifted from the magazine.

It will be seen from the foregoing description of the operation of the presser finger 408 and the presser member 432, that the topmost blanks in the magazines 56 and 57 are held substantially flat during the advancing movement of the upper fingers of the separator devices. Thus, there is no possibility of said fingers failing to overlap said blanks and consequently a subsequent release of two or more blanks at a time from each of the magazines is avoided. Furthermore, the construction is such that when the upper fingers of the separator devices have been retracted to release the uppermost topmost blanks in the magazines 56 and 57 both the presser fingers 408 and the presser members 432 are swung upwardly simultaneously to permit the raising and removal of said blanks by the respective picker devices.

After the topmost blank has been separated from the stack of canvas blanks in each of the magazines 56 and 57, the two picker devices 60 and 61, which are to transfer these separated blanks to the dies on the turret, are positioned immediately above the magazines, as shown in Fig. 1. Each picker device is then lowered into engagement with the topmost blank to seize the blank and raise it clear of the guide devices at the sides of the magazine. The two picker devices are then oscillated 180 degrees in horizontal planes, transferring the blanks held thereby to positions between the upper sewing-rib forming dies 52 and the lower or turret dies 48, which are at this time located opposite the magazines 56 and 57 in positions to cooperate with the dies 52. The picker devices are then lowered again to deposit the blanks upon the turret dies 48 and immediately raised to normal elevations, after which they are again oscillated in reverse directions to remove them from beneath the upper dies 52, so that the latter may descend upon the turret dies to form the sewing-ribs in the blanks. The two picker devices 60 and 61 above referred to, as well as the picker devices 62 and 63 which operate concurrently therewith to remove the composite blanks from the magazines 58 and 59, are all identical in construction and mode of operation and consequently only one of the picker devices will be described in detail.

The construction of the picker devices is illustrated in detail in Figs. 23 to 26, inclusive. As shown, the mechanism of each picker device is carried by a horizontal picker arm 434 projecting from a sleeve 436 (Fig. 26) mounted for oscillating and sliding movements upon a vertical pivot rod 438 (see also Figs. 1 and 6). The pivot rod 438 of one of the picker arms of each pair depends from one of the brackets 128 bolted to the upper frame member 66, while the pivot rod 438 of the other picker arm of the pair depends from one of the brackets 144 of the upper frame member 66. An enlarged housing 440 of substantially rectangular shape, as shown in Fig. 23, is formed at the free extremity of each picker arm 434, the housing as well as the adjacent portions of the picker arm being of hollow construction to enclose and protect the picker and its operating mechanism.

The blank-seizing members of each picker device comprise four needles 442 having sharply pointed ends. The four picker needles 442 are located adjacent the four corners of the housing 440 and extend transversely with respect to the picker arm. The two groups of picker needles 442 adjacent the opposite ends of the housing are arranged with their pointed ends inclined downwardly and outwardly in opposite directions from the center. The picker needles, rigidly supported in the above described relative arrangement, are brought into engagement with the upper face of a blank in one of the magazines by a depression of the picker arm after the latter has been swung into position above the magazine. The two groups of oppositely directed needles are then thrust outwardly to spread them apart in opposite directions, thereby causing them to penetrate the material of the blanks in such a way as to firmly seize the blank. The needles are locked in their stock-penetrating positions so that the blanks may be lifted thereby and transferred to the turret dies without danger of becoming accidentally released. After reaching the required position above the dies, the two groups of needles are acuated in reverse directions to withdraw them from the blank so that the latter will be released upon the die.

Normally the picker needles 442 are supported with their pointed ends in the same horizontal plane. Upon the descent of the picker arm, when the downward movement of any one of the picker needles is arrested by engagement with a blank in the magazine, the two groups of oppositely directed picker needles are immediately thrust outwardly to seize the blank. It may happen, however, that the blanks will be supported slightly out of an absolutely level position when they reach the top of the magazine. Furthermore, athough the blanks near the top of the magazines are acted upon by the pressure devices 408 and 432 hereinbefore described, they may not lie entirely flat. In such cases, the picker needles would not be projected simultaneously into the material of the blank and the blank would be moved in an edgewise direction, displacing it somewhat from its position of alinement with the other blanks in the magazine. Consequently, when finally deposited upon its respective turret die, the blank might not be centered thereon with the desired degree of accuracy.

To prevent possible edgewise displacement of the blanks from their positions in the magazines while being seized by the picker devices, provision is made for insuring that all of the needles of each picker device shall be brought into contact with the respective blank before any one of said needles is projected into the material of the blank. To this end, the picker needles are severally mounted upon four needle holders or fingers 444 depending from a jointed frame structure indicated generally at 446 in Figs. 23 and 24. The frame structure 446 is mounted within the hollow picker arm and is constructed and arranged to permit the several picker needles to adjust themselves to the plane of the blank to be seized thereby.

As shown, the frame structure 446 comprises an arm 448 that is pivoted at its inner extremity upon a horizontal stud 450 extending transversely across the picker arm 434. At its outer end the pivoted arm 448 is bored longitudinally to receive a stud 452 which projects at right angles from the central portion of a cross-bar 454. The stud 452 is retained in the recess in the arm 448 by a pin 456 which extends transversely through the stud 452 with its opposite ends projecting into transverse slots 458 (Fig. 24) in the arm 448 at opposite sides of the longitudinal bore therein. The pin 456 and the slots 458 are constructed and arranged to permit only a restricted amount of tilting movement of the cross-bar 454 with respect to the pivoted arm. To retain the arm 448 and the cross-bar 454 within the housing 440, a supporting strip 460 extends longitudinally across the central portion of the open underside of the housing, the opposite ends of which are provided with upwardly extending ears 462 (Fig. 25) secured by means of screws 464 to the opposite end walls of the housing. Normally the cross-bar 454 rests upon an adjustable stop screw 455 in the supporting strip 460, so that the pivoted arm 448 is supported in the position shown by dotted lines in Fig. 24. At the opposite ends of the cross-bar 454 two blocks 466 are severally pivotally connected therewith by means of a pivot rod 468 which extends transversely through the central portion of said blocks and through a recess bored longitudinally through the cross-bar 454. Carried at the opposite ends of the pivoted blocks 466 are the needle holders 444, each needle holder being pivoted upon a stud 470 having a shank threaded into the respective block 466. The studs 470 upon which each of the opposed pairs of picker needles are pivoted extend horizontally in axial alinement with each other and in directions parallel to the length of the picker arm 434. Each needle holder 444 is retained upon its pivot stud 470 between the respective block 466 and a head 472 on the pivot stud.

Oscillation of the needle holder carrying blocks 466 upon their common pivot rod 468 is limited by means of two stop-members 474 in the form of flat plates, the opposite ends of which are adapted to engage the opposed side faces of the needle holders for each pair of oppositely directed needles. The length of the stop members 474 is made sufficiently less than the distance between the opposed faces of said needle holders to permit the desired amount of oscillation of the blocks 466 about the rod 568. The stop-members 474 extend transversely across the under side of the supporting strip 460 and are secured thereto by means of screws 476 which extend through longitudinal slots 478 in the stop-members 474 and are threaded into the supporting strip 460. By loosening the screws 476, the stop-members 474 may be adjusted longitudinally to vary the normal relative vertical positions of the oppositely disposed pairs of picker needles.

It will be seen that by means of the above described construction of the jointed frame structure 446, the two pairs of picker needles at the opposite ends of the housing 440 are free to tilt a limited amount in two vertical planes normal to each other, thereby permitting the needles to automatically adjust themselves to the plane of the blank as the picker arm 434 descends above the supply magazine. Consequently all of the needles will penetrate the blank simultaneously and the endwise thrust of each pair will offset that of the other pair so that there will be no tendency to displace the blank as it is seized for transferral to the die 48.

The needles 442 are of dovetail cross-sectional shape above their pointed ends, and are fitted into correspondingly shaped grooves 480 (Fig. 23) in the enlarged lower extremities of the needle holders 444. The needle holders are split inwardly from the grooves 480 in the direction of the length of the latter, as indicated at 482 in Fig. 24. Each picker needle is securely held in its holder 444 by a screw 484 which extends transversely through the split portion of the holder and binds the opposite sides thereof against the needle. By loosening the screws, the picker needles are permitted to be readily removed from the holders and others replaced therein.

The picker needles 442 are normally maintained in their inoperative positions by means comprising a pair of tension springs 488 which severally connect the lower extremities of the needle holders 444 of the oppositely directed pairs of needles. The needle holders 444 are provided with inwardly off-set extensions 490 having rounded free ends. The rounded ends of the extensions 490 of the needle holders adjacent opposite ends of the housing 440 are held, by the springs 488, in engagement with cam faces 492 (Figs. 23 and 25), the latter being formed at opposite ends of a pair of cam blocks 494 secured by screws 495 to the under side of the housing 440. The picker arm descends a short distance after the needles have contacted with the blank, this being permitted by the pivotal mounting upon the picker arm of the needle holder supporting frame structure 446, and this causes the cam blocks 494 to be forced downwardly between the needle holders 444 respectively engaged thereby. The needle holders carrying the oppositely directed picker needles are consequently swung outwardly about the pivot studs 470 by the cam faces 492. Thus said needles are spread apart so that their pointed ends are caused to penetrate into holding engagement with the material of the blanks.

In order that the picker needles shall be positively maintained in holding engagement with the blanks during the travel of the picker devices from the supply magazines to positions above the turret 50, means is provided for locking the pivoted arm 448 of the frame structure 446 in its upwardly-tilted position. With the frame 446 thus locked, the extensions 490 of the needle holders 444 are held in contact with the upper portions of the cam faces 492 so that the picker needles cannot be withdrawn from the blanks. The means for locking the arm 448 in its upwardly-tilted position comprises a latch 498 (Fig. 24) in the form of a plate which is pivoted at one end upon a horizontal stud 500 carried by an arm 502 rising from the pivoted end of the frame structure arm 448. At its opposite end the latch plate 498 is provided with a transverse depending rib 504 which normally rests upon the upper face of a transverse horizontal plate 506 carried by the picker arm 434. The latch rib 504 provides a shoulder 508 adapted to be moved into engagement with the inwardly directed edge of the plate 506 upon the descent of the picker arm, after the picker needles have engaged the topmost blank in the magazine. The plate 506 is located within the side walls of the picker arm 434 and is secured at its opposite ends to a pair of lugs 510 projecting inwardly from said side walls. The means for securing the plate 506 to the picker arm 434 comprises a pair of screws 512 (Fig. 23) which extend through transverse slots 513 in the plate and are threaded into the lugs 510. This manner of securing the plate 506 to the picker arm permits horizontal adjustment of the plate relatively to the stud 450, upon which the frame structure 446 is pivotally mounted. The plate 506 may thus be adjusted to insure that the pivoted arm 448 will be latched at the instant it reaches the limit of its upward tilting movement. The picker needles at this time have reached the limit of their stock-penetrating movements and are prevented, by the operation of the latch 498, from withdrawing from the stock, thus insuring that the stock will be securely held during its transfer. To assist in maintaining the latch 498, both in its operative and inoperative positions, a coiled spring 514 is secured at one end to the interior of the picker arm 434 and at the opposite end to a pin 515 depending from the latch plate 498. The spring 514 also tends to hold the frame structure 446 in the position which it assumes when the picker needles are disengaged from the blanks.

After a blank has been seized by one of the picker devices, and the respective picker arm 434 has been swung to transfer the blank to a position between the adjacent upper and lower sewing-rib forming dies, the picker device is then lowered to deposit the blank upon the lower die. As the picker device descends, the latch 498 is tripped, permitting the frame structure 446 to swing downwardly with respect to the picker arm, thereby moving the needle holders 444 downwardly across the cam faces 492 and permitting the springs 488 to retract the picker needles from the blank.

The means for tripping the latches 498 of the picker devices comprise two abutments 516 (Fig. 1) rising from frame members which are secured to the upper portion of the base 64. The abutments 516 are positioned to be engaged by heads 517 on the pins 515 carried by the latches 498 as the picker descends. When the latches 498 of the picker devices are tripped, the respective springs 514 cause prompt release of the blanks by effecting quick downward movements of the frame structures 446 of the two picker devices so that the picker needles will be quickly retracted from the blanks.

To insure that the picker devices will be positively and accurately located relatively to the magazines when seizing a blank therein, and relatively to the lower sewing-rib forming dies when delivering blanks thereto, means is provided for limiting, in each direction, the oscillatory movements of the picker arms. Means is also provided for locking the picker arm 434 against oscillatory movement in a return direction after it has been brought to rest in a predetermined angular position above a magazine or above a die. This means comprises a cross-bar or stop member 518 (Figs. 1 and 6) rigidly secured to the stud 438 upon which the picker arm is mounted to oscillate. The cross-bar 518 is located directly above the picker arm sleeve 436 and is angularly positioned thereon so that one end of the cross-bar will overlie the picker arm when the picker devices are positioned to seize a blank in the magazine while its opposite end will overlie the picker arm when the picker devices are positioned to deposit a blank upon one of the turret dies. The opposite ends of the cross-bar 518 are notched as indicated at 520 in Fig. 6. The front side walls of the notches 520 are extended so that they project beyond the rear side walls thereof to provide stop-lugs 522 adapted to be engaged alternately by the vertical portions of a positioning finger or contact member 524 (Figs. 6 and 24) rising from the upper side of the picker arm 432. The positioning finger 524 is so constructed and arranged that it will not engage the portions of the cross-bar 518 at the rear sides of the notches 520. Thus the picker arm is permitted to oscillate freely at the rear of the cross-bar. In order to positively prevent any oscillatory movement of the picker arm when the latter is depressed, either for the purpose of causing the picker devices to seize a blank in the magazine or to deposit a blank upon the die, the positioning finger 524 upon the picker arm is provided at its upper end with a horizontally off-set portion 526 (Fig. 24). When the picker arm is supported at its normal elevation, the horizontal portion 526 of the positioning finger 524 is maintained above the horizontal plane of the cross-bar 518. When the picker arm is depressed, however, the portion 526 of the positioning finger 524 is lowered into one or the other of the notches 520 according to whether the picker arm is positioned above the magazine or above the die. Thus, while the picker arm is positioned to receive or to deposit a blank, it is positively prevented from having angular or oscillatory movement.

The means for oscillating the picker arms 60, 61, which are associated with the magazines 56 and 57 for the canvas blanks, comprises segments 530 (Figs. 1, 6 and 26) carried at the outer ends of the longer arms of two bell-crank levers 532 (best shown in Fig. 26) which are severally fulcrumed upon vertical pivot studs 534 carried by brackets 536 rising from frame members rigidly secured to the base 64. Each segment 530 engages a pinion 538 formed at the lower end of the sleeve 436 of the adjacent picker arm 434. The shorter arms of the bell-crank levers 532 are severally connected by means of links 540 with a single cam lever 542 (Figs. 1, 7 and 8) which is fulcrumed upon a vertical stud 544 carried by a bracket 546 secured to a portion of the base 64. As shown in Fig. 8, the cam lever 542 lies adjacent the lower side of a horizontal cam disk 548, which is secured to a vertical shaft 550 and is journaled in suitable bearings supported by the base 64. The cam lever 542 carries a cam roll 552 which rides in a cam groove 554 formed in the lower side of the cam disk 548.

The vertical shaft 550 is connected by means of a universal joint 556 (Fig. 1) with the upper end of an upright shaft 558 which is suitably journaled adjacent its lower extremity in a bearing 560 (Fig. 37) on the lower portion of the base 64. The upright shaft 558 is driven from the horizontal shaft 190 through intermeshing beveled pinions 562, one of which is secured to the outer end of the shaft 190 and the other to the lower end of the shaft 558. The shaft 190 is caused to make a single complete revolution at each cycle of operations of the machine and the intermeshing beveled pinions 562 being of the same diameter, the cam disk 548 likewise rotates once at each cycle of the machine. The cam groove 554 is designed to cause the picker devices 60 to oscillate 180 degrees in opposite directions at each rotation of the cam disk 548.

As shown in Fig. 1, the upright shaft 558 is made in two sections joined by a coupling device 566, and a hand-wheel 568 is secured to the upper section of the shaft. By disconnecting the members of the coupling device 566, the upper section of the shaft 558 may be turned at will by the operator by means of the hand-wheel 568 so that the supporting arms 434 for the picker devices 60 and 61 may be manually oscillated, if desired. The coupling members 566 may be so designed that the two sections of the upright shaft 558 can be re-connected only at predetermined rotational positions thereof, thus insuring that when the cam disk 548 is again connected with its driving mechanism, the picker arms will be actuated in proper timed relation with the other operating instrumentalities of the machine.

Referring to Figs. 6 and 26, the means for imparting the vertical movements to the picker device 60 associated with the magazine 56 comprise a bell-crank lever 572 fulcrumed upon a horizontal pivot stud 574 carried at the upper end of one of the brackets 536. The longer arm of the bell-crank lever 572 is forked at its outer end, as indicated at 576 in Fig. 26, and carries a pair of pins 578 which project inwardly, in axial alinement, from the forked ends of said arm and are received in an annular groove 580 formed on the sleeve 436 of the respective picker arm 434. The shorter arm of the bell-crank lever 572 is connected by a link 582 with a cam lever 584 (Figs. 7 and 8) actuated by a cam groove 586 at the upper side of the cam disk 548.

The means for imparting vertical movements to the picker arm associated with the magazine 57 comprises an arm 588 (Fig. 6) secured at one end to a rock-shaft 590 adapted to turn in a bearing 592 supported by the base 64. The opposite end of the arm 588 is forked, and its forked ends are provided with pins, similar to those already described in connection with the forked end of the bell-crank lever 572, and which enter an annular groove similar to the groove 580 which is formed in the sleeve 436 of the respective picker arm 434. Secured to the rock-shaft 590, at the end opposite that carrying the arm 588, is an upright arm 594. The arm 594 is connected by means of a link 596 with the above mentioned cam lever 584. The cam lever 584 is fulcrumed upon a vertical stud 598 carried by the bracket 546, and has a roll 600 operating in the cam groove 586. As the cam disk 548 rotates, the bell-crank lever 572 and the arm 588 are oscillated to move the respective picker arms vertically twice during each rotation. These vertical movements of the picker arms are so timed that the picker arms 434 carrying the picker devices 60 and 61 will be lowered and raised once when they are at one extreme of their oscillatory movements and again when at the other extreme thereof.

The upward movements of the picker arms are assisted by means of coiled springs 604 (Fig. 26) which counter-balance the weight of the picker arms and parts carried thereby. Each spring 604 is received at its lower end in a socket 606 carried by a portion of the frame and at its upper end the spring is coiled around a tail-rod 608 depending from the picker arm sleeve 436 and bears against said arm.

While the picker devices 60 are transferring canvas blanks from the magazines 56 and 57 to positions above two of the dies 48 on the turret 50, the picker devices 62 and 63 are transferring composite blanks which have been discharged from the magazines 58 and 59 to positions above the other two turret dies 48.

As already described, the magazines 58 and 59 for the composite leather and fibre blanks are similar in construction to the magazines 56 and 57 for the canvas blanks. The magazines 58 and 59 are supported at one end by brackets 612 (Fig. 2) which are bolted to the sides of the adjacent radial brackets 128 and 144 of the upper frame member 66. The outer extremities of the brackets 612 are forked, as indicated at 614, and the ends of the forked arms are secured to the two vertical tie-rods 258 at one end of each of the magazines. As shown in Fig. 2, the magazines 58 and 59 are each braced at the end opposite the bracket 612 by a rod 615 extending from one of the vertical tie-rods 258 to the bracket 128 or 144 that is opposite the side of the magazine.

The mode of operation of the separator devices 274 of the magazines 58 and 59 is similar to that of the separator devices 272 of the magazines 56 and 57, except that in the magazines 58 and 59, these devices are adapted to deliver the blanks one-by-one from the bottoms of the stacks instead of from the tops of the stacks, as in the magazines 56 and 57. To this end, the separator devices 274 (Figs. 9 and 10) are located upon the bottom frame members 256 of the magazines 58 and 59. The stacks in the magazines 58 and 59 are supported by the fingers of the separator devices 274 and feed downwardly by gravity as the blanks are successively released at the lower ends of the magazines.

The separator devices for the magazines 58 and 59 are the same in construction and operation as those hereinbefore described in connection with the magazines 56 and 57, but the relative positions of the upper and lower separator fingers are reversed so that they may operate to separate blanks from the bottoms of the stacks. With the exception of certain details of construction hereinafter described, the actuating mechanism for the separator devices for the magazines 58 and 59 is also similar to that of the separator devices already described.

In order that the composite blanks may be secured in face-to-face relation to the canvas blanks previously deposited upon the turret dies 48, a coating of cement is applied to the lower faces of the composite blanks before they are seized by the picker devices 62 and 63. The apparatus for effecting this coating, as it will now be described, is presented in a divisional application Serial No. 249,477, filed January 25, 1928. The composite blanks, when separated from the stacks in the magazines 58 and 59, are received upon feed tables 616 (Figs. 6, 15 and 35) movable both vertically and horizontally and which advance the blanks endwise into the grip of cooperating upper and lower feed rolls 618 and 620, the lower rolls 620 being adapted to apply cement to the under face of each blank. The blanks are fed by the rolls 618 and 620 across the tops of horizontally slidable receiving tables 622 (Figs. 1, 15 and 35) which advance the blanks into position to be seized by the picker devices 62. The feed tables 616 and 622, the rolls 618 and 620 associated with the magazines 58, and the actuating mechanism for these members, are the same in construction and mode of operation as corresponding parts associated with the magazine 59 and consequently a description of one set of said members and their actuating mechanism will suffice for both.

The table 616 which receives the composite blanks from the magazine 58 is rectangular in form and is supported and adapted to slide horizontally upon six rollers 624, (Figs. 15 and 16) which are arranged in pairs on the outer sides of two vertically disposed parallel side frames 626 projecting from a vertically slidable carriage 528. The three pairs of rollers 624 are severally received in horizontal grooves 628 formed in the inner sides of two parallel flanges 629 depending from the opposite longitudinal edges of the table 616.

The carriage 528 is adapted to be raised to elevate the feed table 616 to a position immediately below the bottom of the stack in the magazine, so that when the lowermost blank is released, it will not be permitted to fall through any substantial distance but will be received directly upon the feed table, thus avoiding possible edgewise displacement thereof. To permit the carriage 528 to be raised and lowered, it is provided with two vertical ribs 630 which project at the outer sides of the frame members 626, and each rib 630 is adapted to ride upon the peripheries of rollers 632 which are severally carried by upper and lower brackets 634 and 636 and are arranged to engage the opposite faces of the ribs. The outwardly directed edge face of each rib 630 is adapted to ride upon the peripheries of a pair of rollers 638, also carried by the upper and lower brackets 634 and 636. The brackets 634 and 636 are both secured to a single support 640 which is, in turn, bolted to the side of one of the radial brackets 152 on the base 64. The weight of the carriage 528 and the various parts mounted thereon is counterbalanced by springs 642 secured at their lower ends to the carriage and at their upper ends to the bracket 634.

In order that the carriage 528 may be reciprocated vertically to bring the feed table 616 to the proper elevation to receive a blank from the magazine and then to lower the table to the level of the top of the cement roll 620, a rack-bar 646 (Figs. 15 and 17) is secured to the inwardly directed side of the carriage and is engaged by a segment 648 carried by a rock-shaft 650 journaled in a bearing secured to the support 640. An arm 652 is fastened upon the rock-shaft 650 at the opposite end from the segment 648 and this arm is connected by means of a link 654 (see also Fig. 26) with one end of a cam lever 656 fulcrumed at 658 upon one of the brackets 384. The cam lever 656 carries a roll 660 which is received in a cam groove 661 in the outer side of a cam disk 662 fixed to a horizontal shaft 664 journaled in bearings in the bracket 384. The cam disk 662 is rotated through intermeshing beveled gears 666, one of which is secured to the inner end of the shaft 664 while the other is fast upon the lower end of a vertical shaft 668 journaled in the bracket 384. Secured to the upper end of the shaft 668 is a spur gear 670, the teeth of which mesh with the annular gear 84 on the turret 50. The ratio of the above described gearing is such that at each cycle of operations of the machine, the partial rotation of the turret 50 will cause the cam disk 662 to make one complete revolution. The cam groove engaged by the cam roll 660 is designed to cause a single reciprocation of the carriage 528 at each cycle of operations.

The feed table 616 is so constructed that it does not extend beneath the extreme toe end portion of the stack of blanks. Thus, when a blank is received upon the table 616 its toe end will project somewhat beyond the forward end of the table, as indicated at 672 in Fig. 15. After the table 616 has been lowered into the position in which it appears in Fig. 15, so that the blank is supported at the proper level to be introduced between the feed rolls 618 and 620, said table is caused to slide horizontally upon the rollers 624 to present the toe end of the blank to the grip of said rolls.

The means for horizontally reciprocating the feed table 616 comprises a segment 674 (Figs. 15 and 16) which engages a rack-bar 676 secured to the under side of the table. The lower portion of the segment 674 is pinned to a rock-shaft 678 journaled in the frame members 626. To actuate the rock-shaft 678, an arm 680, which is secured to one end of the rock-shaft, is connected by means of a link 682 (see also Fig. 26) to one end of the upwardly extending arm of a bell-crank lever 684 fulcrumed at 686 upon the bracket 384. The other arm of the bell-crank lever 684 carries a cam roll 688 which rides in a cam groove 690 in the cam disk 662 at the opposite side from the cam groove 661 engaged by the cam roll 660. The cam groove 690 is designed to reciprocate the feed table 616 horizontally, once for each rotation of the cam disk 662. The link 682 is connected with the arm 680 by means of a pivot stud which extends through a longitudinal slot 691 (Fig. 15) in the arm and is adjustably secured therein. The slot 691 normally extends at such an angle with respect to the pivotal connection between the opposite end of the link 682 and the cam lever 684 that by shifting the position of the pivot stud in the slot 691, the table may be adjusted toward or from the rolls 618 and 620 in accordance with the length of the sole blanks being operated upon.

The vertical reciprocating movements of the carriages 528 associated with the magazines 58 and 59, which are derived from the cam disk 662, are utilized to actuate the blank-separating mechanisms associated with the magazines 58 and 59. To this end, the rack bars 366 (Figs. 9 and 10) of said separating mechanisms have severally pivoted to their lower ends a pair of rods 694 (Figs. 15 and 16) which depend vertically from the rack bars. The lower extremity of each rod 694 telescopes within a longitudinal bore in the upper portion of a vertical arm 696 which is pivoted at its lower extremity upon one end of the rock-shaft 678. The upper ends of each of the arms 696 are split, as indicated at 698 in Fig. 16, and rigidly but adjustably secured to the respective rods 694 by means of binding screws 700.

When the separator devices of the magazines 58 and 59 severally operate to release a blank from the bottom of the stack in each magazine, the feed tables 616 occupy their uppermost positions and are retracted with respect to the respective cement rolls 620. After a blank has been deposited upon each of the tables 616, the tables immediately descend and are advanced to present the projecting toe portion of each of the blanks to the grip of the respective pair of rolls 618 and 620.

The rolls 618 and 620 associated with the magazine 58 are the same in construction and mode of operation as the rolls associated with the magazine 59 and accordingly only one pair of said rolls will be described in detail herein. As shown in Figs. 15 and 17, the rolls 618 and 620 associated with the magazine 58 are mounted to rotate on bearings supported by a pair of arms 704 and 706 rising vertically from the bracket 634. These rolls are continuously actuated throughout the operation of the machine in directions to feed the blanks presented thereto from the table 616, between the rolls and across the receiving table 622.

The lower or cement-applying roll 620 comprises a cylindrical shell closed at its opposite ends and provided with a series of annular ribs 708 (Fig. 17) arranged parallel to each other and equally spaced apart across the external cylindrical surface of the roll. Intersecting the annular ribs 708 are a series of transverse ribs 710 which are equally spaced apart in parallel relation to each other. The ribs 708 and 710 provide a series of square shallow pockets 712 adapted to contain cement which is to be applied to the blanks as they pass over the top of the roll. One end of the roll 620 is supported upon the inwardly projecting extremity of a short horizontal driving shaft 714 which is journaled in spaced apart bearings 716 in the arm 704. To connect the roll 620 to rotate with the driving shaft 714, a collar 718 is pinned to the driving shaft and is provided with tongues 720 which extend transversely across the inner end face of the collar at opposite sides of the shaft and enter corresponding grooves formed in a hub 722 on the roll 620. At its opposite end the roll 620 is journaled upon the inwardly projecting end of a horizontal stud 724 which is supported in the arm 706 and is axially alined with the driving shaft 714. To permit removal of the roll 620 for cleaning or replacement, the stud 724 is mounted to slide in the arm 706 so that it may be withdrawn from the roll, and the supporting arm 706 is hinged upon a vertical pintle 726 (Fig. 15) carried by the bracket 634 to adapt it to be swung outwardly away from the arm 704. The stud 724 is provided with a knurled head by means of which it may be moved in or out in its bearing in the arm 706. When the stud 724 has been withdrawn from the roll 620 and the arm 706 has been swung outwardly, the roll 620 may be readily removed from the driving shaft 714. A bayonet joint connection 728 (Fig. 17) between the stud 724 and the arm 706 is provided for limiting the outward sliding movement of the stud in its bearing and for permitting the stud to be locked in the inner or roll-supporting position.

The upper roll 618 which is of the same diameter as the lower roll 620, also comprises a cylindrical shell which is closed at its opposite ends. The external cylindrical surface of the roll 618 is provided with a series of annular ribs 732 arranged in parallel relation with each other and opposed to the corresponding annular ribs 708 of the lower roll 620. The upper roll 618 is supported at one extremity upon the inwardly projecting end of a short horizontal shaft 734 which is journaled in spaced-apart bearing sleeves 736 normally resting upon the lower end walls of a pair of vertical slots 738 formed in the upper portions of the arm 704. The shaft 734 is driven from the shaft 714 through intermeshing spur gears 740, one of which is secured to each of said shafts between the bearings therefor. The roll 618 is connected to turn with the shaft 734 by means of a collar 742 that is pinned to the shaft and provided with lateral tongues 744 which project into corresponding grooves in a hub 746 on the roll. At the opposite end of the roll 618 a hub 748 is journaled upon the inwardly projecting end of a horizontal stud 750 which is adapted to slide longitudinally within a sleeve 752. The sleeve 752 is located within a vertical slot 754 in the upper extremity of the arm 706 and normally rests upon the lower end wall of said slot. Annular flanges 756 at opposite ends of the sleeve 752, prevent its longitudinal displacement by engagement with adjacent faces of the arm 706. With this arrangement, the upper roll 618 is spaced above the lower roll 620 a distance somewhat less than the thickness of the blanks to be operated upon, while the slots 738 and 754 in the supporting arms 704 and 706 permit the roll 618 to yield upwardly as the blanks are introduced thereunder.

In order that the upper roll 618 may be yieldingly pressed against the sole blank during the feeding of the latter across the cement applying roll 620, the sleeves 736 and 752 are acted upon by springs 758 and 760, respectively. The spring 758 is seated within a recess 762 formed at the upper end of the arm 704, its lower end bearing against a transverse member 764 which connects the two sleeves 736 and partially encloses the upper gear 740. The upper end of the spring 760 is seated within a recess formed at the upper end of the arm 706, its lower end against the bearing sleeve 752.

To adapt the stud 750 to be withdrawn from the roll 618, the stud is provided with a knurled head. A bayonet joint connection 768 between the stud 750 and the sleeve 752 limits the outward sliding movement of the stud and permits the latter to be locked in its inner or roll supporting position. To insure alinement of the shaft 734 and the stud 750, a vertical rod 770 rises from the transverse member 764 and extends through the coils of the spring 758 and through an aperture at the extremity of the recess 762. A nut 772 threaded upon the upper end of the rod 770 bears against the top of the arm 704 and may be turned to vary the normal elevation of the bearing sleeves 736 and consequently of the shaft 734.

The rolls 618 and 620 are actuated from the shaft 190 (Fig. 37) through the following connections. Secured to the outer end of the driving shaft 714 is a beveled pinion 774 (Figs. 15 and 17) which engages a beveled pinion 776 secured to the upper end of an inclined shaft 778, the latter being journaled in a bracket 780 which rises from the support 640 and is bolted to the side of the arm 704. The shaft 778 is connected by a universal joint 782 with the upper end of another inclined shaft 784 which, in turn, is connected at its lower extremity by a universal joint (not shown) with a vertical shaft 786 (Fig. 37). The shaft 786 is connected by intermeshing beveled pinions 788 with the outer end of a short horizontal shaft 790 that is journaled in a bearing in the lower portion of the base 64. The shaft 790 is driven from the shaft 190 through a pinion 792 which is secured to the inner end of the shaft 790 and engages a gear 794 that is secured to the shaft 190. Thus the cement rolls are driven continuously while the machine is in use.

Cement is supplied to the pockets 712 in the ribbed faces of the lower rolls 620 associated with the magazines 58 and 59 from distributing devices, both of which are supplied from a single cement reservoir 795. Inasmuch as both distributing devices are identical in construction and mode of operation, it will be necessary to describe but one of them herein. One of the cement distributing devices is illustrated in Figs. 21, 22 and 35. The device shown therein comprises an elongated head or nozzle 796 arranged at one side of one of the cement applying rolls 620 and rigidly secured at one end to a bracket 797 (Fig. 21) depending from the member 704. The distributing head or nozzle 796 is provided with a longitudinal bore 798, having a series of outlet ports 799, terminating in a concave face 800 at one side of the head 796. The curvature of the concave face 800 corresponds to that of the roll 620. This face extends horizontally throughout the length of the roll 620 and is arranged closely adjacent the outer edge faces of the ribs thereon. The distributing head 796 is connected by means of a conduit 802 (Fig. 1) with the cement reservoir 795 (Figs. 2 and 18), the construction of which will presently be described.

To prevent waste of the cement, it is supplied to the roll 620 only during such time as a sole blank is being fed thereover. To this end, the outlet ports 799 in the distributing head 796 are opened and closed by a valve which is operated in time with the movements of the feed table 616.

The valve for controlling the flow of cement through the outlet ports 799 comprises a tube 803 (Figs. 1, 18 and 22) which fits closely within the bore 798 in the head 796 and through which the cement is caused to flow. The valve tube 803 is provided with a series of outlet ports 804 adapted to register with the ports 799 in the head. The tube 803 is adapted to be oscillated to bring the ports 804 alternately into and out of registry with the ports 799 in the head, thereby causing an intermittent flow of cement from the head to the roll.

The oscillatory movement of the valve tube 803 is derived from the cam 662 which actuates the feed table 616. To this end, the valve tube 803 is connected in the following manner with the cam lever 684 actuated by the cam disk 662. As shown in Fig. 35, an arm 805 is rigidly secured to one end of the valve tube 803 and is connected by a link 806 with one end of an arm 807, that is in turn rigidly secured to the outer end of a rock-shaft 808. The rock-shaft 808 is journaled in a bearing 809 rigidly supported by a portion of the frame and carries at its inner end a depending arm 810. The lower extremity of the arm 810 is forked as shown at 811 to straddle an extension of the pin which pivotally connects the cam lever 684 with the link 682. With this construction, as the cam lever 684 is swung toward the right, viewing Fig. 35, to slide the feed table 616 toward the cement applying rolls for the purpose of introducing a sole blank therebetween, the valve 803 will be opened to permit a flow of cement to the lower roll 620. When the cam lever 684 is swung in the opposite direction to move the feed table away from the rolls, the valve 803 is closed to shut off the supply of cement.

To permit adjustment of the amount of cement supplied to the cement roll 620 when the valve 803 is opened, the arm 805 is provided at its outer end with a longitudinal slot 812 adapted to receive one end of a stud 813 upon the opposite end of which the link 806 is pivoted. A suitable adjusting means, such as a screw 814, shown in Fig. 35, may be employed for shifting the position of the stud 813 in the slot. With this construction, relative angular positions of the link 806 and the arm 805 may be so adjusted that the ports 799 and 804 will not be brought completely into registry with each other when the valve 803 is opened. In this way, the amount of cement supplied to the roll 620 as each blank is fed across it, may be varied at will. The outer end of the valve tube 803 is extended beyond the arm 805 to enter a notch in an arm 815 which is pivotally mounted upon the arm 706. The notch in the arm 815 provides an outboard bearing for the valve 803 so that the distributing head 796 is more firmly held against movement. The arm 815 may be swung upwardly to disengage the notch therein from the extremity of the valve tube 803 to permit the removal of the rolls 618 and 620 or the removal of the valve 803.

As shown in Figs. 18, 19 and 20, the cement reservoir 795 comprises a cylindrical container 817 for cement. To maintain the cement in the container 817 at the requisite temperature to insure that it will flow freely, the container is enclosed within a hot water tank 818 supported by brackets secured to the upper frame member 66. The tank comprises a cylindrical casing of a greater diameter than the cement container 817. This container is supported by a pair of bosses 819 projecting from it and being seated within sockets formed in a pair of bosses 820, rising from the bottom of the tank. The space between the bottom walls and the cylindrical side walls of the cement container and the tank is filled with water and a suitable gauge 821 may be provided at the side of the tank 818 to indicate the water level. A cup 822 is provided through which the tank may be conveniently filled. The water tank is provided at its upper end with a circular opening of a diameter sufficiently large to permit the removal of the cement container 817. This opening is normally closed by a cover 823 which slightly overlaps an annular rim furnished by a flange 824 projecting inwardly from the upper end of the cylindrical side wall of the tank. Depending from the marginal portion of the cover 823 at the under side thereof is a pair of lugs 825 which enter a pair of notches 826 in the flange 824 when the cover 823 is being placed upon the tank. To permit the cover 823 to be locked in position, the outer edges of the lugs 825 are provided with grooves 827 adapted to receive the flange 824. After the cover 823 has been placed upon the tank, with the lugs 825 projecting through the notches 826, the cover is turned, thus moving the lugs 825 out of registry with the notches 826 and bringing the grooves 827 into engagement with the flange 824. The cement container 817 is filled through a circular opening in the top thereof which is normally closed by means of a removable cover 828. The cover 828 is kept closed and the container 817 is prevented from rising under the influence of its buoyancy in the water tank 818 by a screw 830 threaded vertically through the central portion of the cover 823, the lower end of the screw being seated in a central recess in the cover 828. The screw 830 is provided with a handwheel 831, by means of which it may be readily turned to securely hold the cement container against the bottom of the water tank and the cover 828 against the top of the reservoir. The screw 830 serves also to lock the lugs 825 against the under side of the flange 824, thus securely holding the cover 823 in closed position.

To facilitate the free flow of the cement through the conduits 802, means is provided for applying pressure to the cement within the reservoir. To this end, a manually operable air pump 832 is mounted upon the handwheel 831 in axial alinement with the screw 830. The interior of the pump 832 is connected with the interior of the cement reservoir by means of an air passage 833 extending axially through the screw 830. At the lower end of the screw 830, the air passage 833 therein communicates with a central opening 834 in the cover 828. To prevent leakage of air when the pump 832 is being operated, a gasket 835 is interposed between the lower end of the screw 830 and the base of the recess in the cover 828 which is entered by said screw. A valve 836 prevents outward leakage of air from the cement container.

The cement flows from the container 817 into a central opening 838 in the base of the reservoir, the flow being controlled by a normally open valve 839. Leading from the opening 838 are two radiating passages 840 which are inclined slightly downward. These passages 840 severally terminate at the lower faces of the bosses 819 on the bottom of the container and communicate with vertical passages 841 in a pair of valve casings 842 depending from the base of the water tank 818, each vertical passage 841 terminating at its upper end in the base of the respective boss 820 rising from the bottom of the tank. To prevent leakage of cement at the junctions of the passages 840 and the passages 841, a gasket 843 is interposed between the base of the recess in each boss 820 and the end face of the respective boss 819 on the cement container. The passages 841 are severally connected at their lower ends by means of a coupling device 844 with the upper ends of the conduits 802 which lead to the cement supply valves 803. The valve casings 842 are provided with manually operable valves 845 for shutting off the flow of cement from the reservoir 795.

The water in the tank 818 may be maintained at a high temperature by means of a series of electrical heating units 846 (Figs. 18 and 20) which are secured at their lower ends to the bottom of the water tank and project upwardly into the space between the cylindrical walls of the cement reservoir and the tank. To insure that the cement will be maintained at the required consistency when applied to the rolls 620, the cement conduits 802 are severally arranged between two similar conduits 848 (Figs. 1 and 18) through which a circulation of hot water is maintained. The ends of the conduits 848, remote from the water tank, are severally connected to the opposite ends of a passage 849 (Fig. 21) in the distributing head 796, this passage extending horizontally back and forth through the distributing head at one side of the valve or tube 803.

The upper end of one of the hot water conduits 848 leading from the distributing heads 796 associated with the cement rolls at each of the magazines 58 and 59, is connected through one of the coupling devices 844 with the lower extremity of a passage 850 which extends upwardly through one of the valve casings 842 and communicates with the bottom of the hot water tank 818. The upper extremity of the other conduit 848 leading from each distributing head 796 is connected by the coupling device 844 carried by the valve casing 842, just referred to, with a passage 851 in said valve casing and communicates at its upper extremity with the lower end of a standpipe 852. The standpipe 852 rises within the space between the cement container and the hot water tank to a point somewhat below the normal water level and is open at its upper end. Manually operable valves 853 are provided in the passages 850 and 851 in each of the valve casings 842 and by them the circulation of the heating water may be shut off.

The distributing head 796 is adapted to be heated by means of an electrical heating unit which may be inserted within a longitudinal recess 854 (Figs. 21 and 22) which extends throughout the length of the head immediately below the valve tube 803. The conduits 848 will be filled with hot water from the hot water tank 818. When reaching the passages 849 in the distributing head, the temperature of the water will be raised by the heat derived from the heating unit in the recess 854, thus causing a circulation through the conduits 848 in the direction indicated by the arrows in Fig. 18. It will be seen that the proper temperature of the cement, as it is applied by the distributing heads to the cement rolls 620, will be maintained by means of the heat derived directly from the heating unit within the recess 854, as well as from the hot water circulating through the passages 849. The source of heat at 854 is utilized at such times as when first starting the machine in operation. Its continued use might clog the delivery device by a too great drying effect upon the cement.

It is desirable that means be provided whereby, when the cement container 817 is being inserted within the hot water tank 818, said container may be radially positioned so that the bosses 819 carried thereby will enter the recesses in the bosses 820 at the bottom of the tank. Accordingly, positioning devices are provided comprising a plurality of vertical guide-rods 856 which are secured to the inner face of the side wall of the water tank, as shown in Figs. 18 and 19, and a plurality of cooperating guide-blocks 857 which project outwardly from the side walls of the cement container adjacent its upper and lower ends, as shown in Fig. 18. The guide rods 856 are adapted to be engaged by V-shaped positioning notches 858 (Fig. 19) formed in the outer faces of the guide-blocks 857. By turning the cement container until the notches 858 are in engagement with the guide-rods 856, the bosses 819 will be brought into alinement with the recesses in the bosses 820. The guide-rods 856 thus provide lateral support for the cement container.

When removing the cement container from the water tank for the purpose of refilling the former, it is desirable to shut off communication between the interior of the cement container and the central passage 838 in the bottom thereof by closing the valve 839 to prevent the water within the tank 818 from rising into the interior of the cement container. As shown, the valve 839 comprises a sleeve 859 which is screw-threaded into a boss 860 rising centrally from the bottom of the cement container. The lower end of the sleeve 859 is open to communicate with the opening 838. A short distance above the lower end of the sleeve 859, four radial passages 861 connect the interior of the sleeve with the interior of the container. The screw-threaded portion of the sleeve extends just above the radiating passages 861 and an annular flange 862 is formed on the sleeve just above said threaded portion. By turning the sleeve 859 by means of a handle at its upper extremity, the passages 861 may be brought below the upper end of the boss 860 and the shoulder formed by the lower side of the flange 862 tightly pressed against the upper end of said boss. In this way communication between the interior of the cement container and the central passage 838 is completely cut off.

It is also desirable to provide means for preventing the cement container from being lifted by the buoyancy of the water in the tank 818 when the cover 823 is removed from said tank. To this end, a screw 863 (Fig. 18) extends upwardly through the bottom of the hot water tank and is threaded into a boss 864 depending from the bottom of the cement container. Loosening the screw permits the removal of the cement container. Washers may be provided for preventing leakage of water around the screw.

The receiving tables 622 (Figs. 1, 6 and 35) across which the composite blanks are fed by the rolls 618 and 620, comprise horizontal rectangular plates, each of which is mounted to slide longitudinally upon a pair of parallel guide-ribs 865 (Fig. 1) rising from a bracket 866 secured to the adjacent tie bolt 118. Each table 622 is provided with flanges 867 (Fig. 35) depending from its lateral edge portions which engage the outer edges of the guide-ribs 865 and the flanges 867 have inwardly turned ribs 868 which project beneath the outwardly turned portions of the guide-ribs 865 to prevent upward displacement of the table. Both tables 622 are normally located with their rear extremities closely adjacent the associated cement rolls, as shown in Fig. 15, and are adapted to be moved away from the rolls to withdraw the heel ends of the sole blanks sufficiently from the positions in which they are left when they cease to be operated upon by the rolls 618 and 620, to permit the blanks to be freely lifted by the picker devices 62 without bending downwardly at the heel ends. As shown in Fig. 6, the inner side of each receiving table 622 is connected by a link 869 with an oscillatory arm 870 by means of which the table is reciprocated. The arms 870 project from portions of the mechanisms which actuate the picker devices 62 and which will now be described.

Both picker devices 62 and 63 which transfer the composite blanks from the tables 622 to the turret dies 48 located opposite said tables, are actuated from a horizontal cam disk 871 (Fig. 6) which corresponds to the cam disk 548 that is located at the opposite side of the machine and actuates the picker devices 60 and 61. The cam disk 871 is secured to the upper end of a vertical shaft 872 journaled in a bearing on the base 64. The shaft 872 is driven from the shaft 190 (Fig. 37) in the base of the machine through connections comprising an intermediate upright shaft 873 connected at its upper end with the shaft 872 by means of a universal joint (not shown) and at its lower end with the shaft 190 through intermeshing beveled pinions 874, one on the shaft 873 and the other on the shaft 190 at the opposite end thereof from the corresponding beveled pinions 562.

The mechanism actuated by the cam 871 which oscillates the picker arms carrying the picker devices 62 and 63, and which raise and lower said arms, will not be described in detail, since its construction and mode of operation is similar in principle, to that of corresponding mechanism shown at the opposite side of the machine for actuating the picker arms which carry the picker devices 60 and 61. On account of certain requisite structural features of the machine, however, the cam levers actuated by the cam 871 have been so arranged that both are oscillated in directions opposite to the directions of oscillation of the corresponding links 540 and 596 that are connected with the cam 548. With such an arrangement, it is apparent that the levers actuated by the cam 871 will exert a pull upon the links connected therewith when the corresponding links at the opposite side of the machine are pushed by the cam levers 542 and 584, and vice versa. Consequently, in order to obtain concurrent oscillation in the same direction of all four picker arms, as well as concurrent up and down movements thereof, it has been necessary to make slight changes in the arrangement of certain of the levers and connecting parts actuated by the cam 871. These changes, as will be apparent from an examination of Fig. 6, are only such as would be made by a skilled mechanic for the purpose of effecting unidirectional movements from oppositely movable parts.

The arms 870 which actuate the links 869 to reciprocate the receiving tables 622, project from the hubs of the segments which oscillate the picker arms carrying the picker devices 62 and 63. These arms 870 are consequently oscillated back and forth at each cycle of operations of the machine to slide the receiving tables 622 toward the cement rolls 620 to receive the composite blanks and then to slide these tables away from said rolls to advance the blanks into positions to be removed by the picker devices. When the receiving tables 622 have reached the limit of their movements away from the associated cement rolls, the picker devices 62 and 63 are actuated concurrently with the picker devices 60 and 61 to transfer the composite blanks to positions above the turret dies 48 which are at that time positioned opposite the tables 622. The mode of operation of the picker devices 62 and 63 is the same as that of the picker devices 60 and 61 already described, the former seizing the blanks to be transferred, lifting them somewhat from their support, transferring them by revolution in clockwise directions to positions above the adjacent dies 48, lowering the blanks until they are substantially in contact with the faces of the dies and then releasing the blanks. The release of the blanks is effected by tripping the latches 498 carried by the respective picker arms 434, by contact with two abutments 875 (Fig. 1), as the picker arms descend above the dies. The abutments 875 correspond to the abutments 516 at the opposite side of the machine and are engaged by the heads of the pins 515 on the latches 498 associated with the picker devices 62 and 63.

To insure that the blanks delivered by the cementing rolls 618 and 620 will stop upon the tables 622 in the position in which they are to be engaged by the picker devices 62, I associate with each table a locating arm or stop-abutment 1001 (Figs. 1, 6 and 35). Each abutment is pivoted at 1002 at the outer side of its table, and is normally held out of the path of the corresponding picker mechanism by a spring 1004 connecting the outer extremity of the arm beyond the pivotal joint with a pin 1006 projecting from the side of the table. Mounted upon a bracket 1008 rising from a portion of the frame is a horizontal rod 1010, situated in alinement with the portion of the arm 1001 to which the spring is attached. When the table is in its inner or receiving position, adjacent to the rolls 618 and 620, the end of the rod 1010 contacts with the arm, swinging it about its pivot against the tension of the spring to hold it in its active position across the table. At this time, a curved portion 1012 of the arm lies in the path of the sole-piece as it is advanced by the rolls across the table, this portion 1012 being formed to engage the toe of such piece. The rod 1010 is preferably arranged to move longitudinally through the supporting opening in the bracket 1008, being held in place therein by a set-screw 1014. Upon loosening this set-screw, the rod may be adjusted and again fixed in position by the screw to vary the angle which the arm makes with the line of advance of the sole, and therefore the distance of the curved stop-surface from the bite of the rolls 618 and 620. This distance is so adjusted that it is equal to the length of the piece delivered by the rolls. That is, just as the heel-end of the piece has passed the bite of the rolls, the toe-end will contact with the stop-portion 1012, preventing the piece from being fed past the position in which it should rest for such seizure by the picker mechanism as will insure correct presentation to the die 48. Then, as the table moves away from the rolls in preparation for the engagement of the sole-piece by the picker mechanism, the extremity of the arm 1001 leaves the end of the rod 1010, permitting the former to be drawn to one side by its spring 1004, out of the path of the picker mechanism.

A pair of right and left canvas blanks have now been deposited upon the two turret dies 48 which are positioned opposite the magazines 56 and 57, and a pair of right and left composite blanks have had a coating of cement applied to their fibre faces and have been deposited, cemented face down, upon the pair of canvas blanks which were operated upon at the preceding cycle of the machine and are now supported by the turret dies 48 which are positioned opposite the receiving tables 622. As soon as the four picker arms 434 have been oscillated sufficiently in directions to remove the picker devices from beneath the upper dies 52 and 54, these dies are depressed simultaneously. The two upper sewing-rib forming dies 52 cooperate with the complemental dies 48 carried by the turret to form sewing-ribs in two unribbed canvas blanks and the two upper sole-pressing dies 54 cooperate with the dies beneath them to press the two composite blanks and the two previously-ribbed canvas blanks together, thus completing a pair of right and left insoles. As the upper dies descend, the positioning stud 240 carried by one of them enters the notch 242 in one of the members 244 carried by two of the lower dies, thus insuring that all these will be in exact vertical alinement with the upper dies before they act upon the material. The four upper dies are then raised simultaneously and the turret 50 is rotated 180 degrees to bring the two canvas blanks, upon which the sewing-ribs have just been formed, into position to have composite blanks superposed upon them, and to return the dies which support the completed insoles into positions opposite the magazines 56 and 57, ready to receive canvas blanks at the next cycle of operations.

During each partial rotation of the turret 50, the two completed insoles are ejected from the dies 48 which support them. The ejection of both of the completed insoles takes place when the turret has rotated substantially 45 degrees, at which time the dies carrying the completed insoles are passing through ejecting stations 876 and 877 (Fig. 6).

The inner edges of the completed insoles are first lifted somewhat to free them from the top faces of the dies by compressed air which is forced through the passages 220 in the dies at the ejecting stations 876 and 877, and thereafter two mechanical ejector devices operate simultaneously at these stations to completely remove the insoles from the dies by upward and outward movements, so that the insoles will fall clear of the turret 50 into receptacles.

The compressed air is led by the passages 220 to the grooves 210 of the lower dies into which the canvas is crimped to form the sewing-ribs. To this end, as shown in Figs. 28, 29 and 30, the air passages 220 of each of the lower dies 48 lead from two supply openings 878 located midway between the opposite edges of the dies, at the forepart and heel sections. The air passages 220 of each die terminate at the groove 210, below the upper portion thereof which is occupied by the sewing-rib. The supply openings 878 of each die extend through the backing plate 218 and communicate with two converging supply passages 879 (Fig. 6) extending horizontally in the respective die-carrier plate 224. These passages 879 meet at the inner edge of the carrier plate to form an inlet port 880 adapted to receive air from one of a pair of air nozzles 881 (Figs. 3, 6 and 33) at the ejecting stations 876 and 877. The air nozzles 881 are mounted above the horizontal plane of rotation of the turret 50, and each nozzle is secured to the lower portion of a frame 882 depending from a bracket 883 that is secured to the upper frame member 66. The nozzles 881 are supplied with air by means of tubes 884 which are connected with an air compressor.

The air blast is automatically turned on by the movement of the lower dies in approaching the ejecting stations 876 and 877 and is automatically turned off by the movements of the dies in leaving these stations. As shown in Figs. 3 and 6, the supply of air to the nozzles 881 is controlled by means of four-way rotatable valves 885, one of which is provided in each nozzle.

Each air valve 885 comprises a plug of slightly conical shape which fits closely within a correspondingly-shaped recess extending vertically through the nozzle 881 and intersecting the air passage therethrough. The valve 885 is provided with diametrically arranged air passages 886 which intersect at right angles and are disposed in the horizontal plane of air passages 887 in the nozzles 881. Normally the position of each valve 885 in its nozzle is such that the intersecting passages 886 are out of alinement with the passage 887 in the nozzle, as shown in Fig. 3. The valve is rotated intermittently to cause the passage through the nozzle to be alternately opened and closed as the passages 886 in the valve are successively moved into and out of alinement with the nozzle passage.

Each air valve 885 is rotated intermittently by mechanism which comprises a slotted disk or star-wheel 888 rigidly secured to the upper end of a stem 889 rising from the corresponding air valve. Each disk 888 is provided with four radial slots 890 equally spaced apart and extending inwardly from the periphery of the disk. The disk 888 is secured upon the valve stem 889 in such a position that the diametrically opposite slots 890 are alined with the intersecting passages 886 of the valve 885. The slots 890 in the disk at the station 876 receive vertical studs 891 (Figs. 6, 32 and 33) depending from the laterally off-set upper portions of a vertical post 892 (Fig. 33) which is carried by the die-carriers 224 for the two turret dies 48 which complete the formation of right insole blanks. The slots 890 in the disk 888 at the station 877 receive vertical studs 891, similarly mounted upon the die-carriers 224 for the other two turret dies 48 which similarly operate upon left insole blanks.

The actuating studs 891 for the disks or star-wheels 888 are so positioned relatively to the dies 48, that as the rotation of the turret 50 brings the completed insoles to the adjacent ejecting stations, the stud 891 associated with each of said dies upon which the insoles are supported will enter one of the slots in the star-wheel at the respective ejecting station, causing the valve 885 at that station to be rotated 90 degrees. During each partial rotation of the valves 885, one of the passages 886 of each valve is momentarily brought into alinement with the passage 887 in the respective nozzle 881 so that a blast of air is delivered through the nozzle at the instant when the inlet port 880 in the respective die-carrier 224 is in registry with the outlet opening of the nozzle. As the valve 885 continues to turn, the nozzle passage will be closed and the air blast shut off.

Provision is made for preventing the air valves 885 from being actuated a second time at each partial rotation of the turret, by the actuating studs on the die-carriers immediately following those which have already actuated the valves. To this end, the star wheels carried by the two valves 885 are located in different horizontal planes and the actuating studs 891 associated with the dies 48 which operate upon right insole blanks are arranged in the horizontal plane of the star-wheel at the ejecting station 876, while the actuating studs 891 associated with the other turret dies 48 which operate upon left insole blanks are arranged in the horizontal plane of the star-wheel at the ejecting station 877. With this arrangement it will be seen that all the right insoles will be ejected at the station 876 while all the left insoles will be ejected at the station 877. Thus the right and left insoles may be collected in separate receptacles so that no subsequent sorting of the insoles is necessary.

To normally hold each valve 885 closed and to maintain the respective star-wheel 888 with its slots 890 in such positions that one of them may be entered by the stud 891 on the corresponding die-carrier at the next partial rotation of the turret, leaf springs 893 (Fig. 3) are provided which are severally adapted to yieldingly hold the star-wheels against rotation. The springs 893 are severally secured to the nozzle carrying frames 882 and each spring is provided with a curved free extremity adapted to ride across the periphery of the respective star-wheel as the latter rotates, and to spring into the open outer ends of the slots 890 therein, as shown in Fig. 3, when the star-wheel comes to rest, thus preventing the star-wheel from being accidentally turned. The shape of the free extremities of the springs 893 is such that they will readily ride out of the slots 890 to permit the star-wheels to be turned by their respective actuating studs.

Means is provided for adjusting the air valves 885 to the bearings within the recesses in the nozzles 881 to insure against leakage of air, and at the same time to permit freedom of rotation of the valves. The means associated with each air-valve for effecting the above described adjustment comprises an adjusting screw 894 (Figs. 3 and 33) which is threaded into the upper end of the valve stem 889. The head of the screw bears against the under side of an overhanging portion projecting from the nozzle carrying-frame 882. By turning the screw, the conical valve 885 may be properly seated in the bearing in the nozzle 881. The valve 885 may be secured in its adjusted position by means of a lock-nut 895 upon the screw 894 which may be tightened against the upper face of the star-wheel.

As shown in Figs. 32 and 33, the star-wheel actuating studs 891 are adapted to be moved into inoperative positions to permit the turret 50 to rotate without automatically opening the air valves 885. To this end, the posts 892 from which the studs 891 project are carried by means of flat plates 896 which are dovetailed in the upper faces of the respective die-carriers 224. Normally each plate 896 is rigidly secured to the respective die-carrier, with the stud 891 in position to enter the slots in the star-wheel, by a thumb-screw 897, the shank of which extends through an aperture in the plate and is threaded into the die-carrier. The thumb-screw 897 may be removed and the plate slid outwardly in the dovetail ways in the die-carrier to withdraw the stud 891 to an inoperative position in which it will not engage the star-wheel when the turret is rotated. A second aperture may be arranged in the plate so as to be brought into registry with the thumb-screw hole in the die-carrier when the stud 891 is moved into inoperative position, and the thumb-screw 897 may be inserted in this second aperture and again screwed into the hole in the die-carrier to rigidly hold the plate 896 in such a position that the stud 891 will be inoperative.

When the inner edges of the completed insoles are lifted above the dies, two mechanical ejector devices, operate simultaneously to remove the insoles completely from the dies. Both the ejector devices are the same in construction and mode of operation and only one of them will be described in detail. As shown in Figs. 32 and 33, each ejector device comprises a pair of curved ejector fingers 898 projecting forwardly from the lower ends of a pair of supporting arms 899 rigidly secured to the opposite ends of a rock-shaft 900, the latter being journaled in bearings in the bracket 883. The upper ends of the ejector fingers 898 are received in grooves formed at the lower extremities of the arms 899. These extremities of the arms 899 are split longitudinally above the grooves in which the ejector fingers are received and the split portions of said arms are clamped against the opposite edges of the ejector fingers by binding screws 901. The ejector fingers are thus rigidly secured to the arms 899 by means permitting longitudinal adjustment of the fingers relatively to the arms.

The rock-shaft 900 is rotated for the purpose of actuating the ejector fingers to remove the insole from the die by a pair of springs 902 which act upon forward extensions 903 (Fig. 33) of the arms 899. To this end, the springs 902 are connected at their upper ends to an upstanding portion of the bracket 883 and at their lower ends to a rod 904 which connects the two extensions 903 of the arms 899.

Normally the ejector fingers 898 are held in their retracted or inoperative positions against the action of the springs 902 by a toggle comprising a link 905, pivoted at its lower end upon the central portion of the rod 904, and a link 906, pivoted at its upper end to a portion of the bracket 883, the two toggle links being connected by a pivot pin 907. The toggle links are normally held in a substantially straightened condition to maintain the ejector arm extensions 903 depressed, by a pair of leaf springs 908 which press upwardly upon the lower edges of a pair of lugs 909 projecting from a hub formed at the lower end of the toggle link 905.

In order that the ejector device may be operated automatically when the die has reached the ejecting station and an air blast has been turned on to lift the inner edge of the sole, means is provided for breaking the toggle 905—906 outwardly. This means comprises a lever 910 fulcrumed upon the rock-shaft 900 and having its upper end arranged to engage the edge of the lower toggle link 905. The lever 910 is actuated by a vertical plunger 911 mounted to slide longitudinally in a guideway in the bracket 883 and arranged with its upper end beneath the inner end of the lever. The lower end of the plunger 911 is located immediately above a cam finger 912 pivotally mounted upon the nozzle-carrying frame 882. The free end of the cam finger 912 normally rests upon the upper face of the adjacent star-wheel 888 and is swung upwardly by the laterally offset upper portion of the post 892, while the stud 891 carried thereby is rotating the star-wheel. The upward movement of the cam finger 912 raises the plunger 911 and swings the lever 910 in a direction to break the toggle 905—906. As soon as the knuckle pivot 907 of the toggle passes the dead center, the springs 902 operate to suddenly rotate the rock-shaft 900, thus swinging the arms 899 sharply in a direction to cause the pointed ends of the ejector fingers 898 to be introduced between the die 48 and the partially stripped insole. The oscillation of the arms 899 under the influence of the springs 902 is cushioned by spring-pressed plungers 913 carried by the extensions 903 (Fig. 33), the upper ends of which are adapted to engage inclined faces 914 on the bracket 883.

The ends of the ejector fingers 898 engage the ribbed face of the insole at points approximately in the longitudinal medial line thereof and as the fingers continue in their arcuate paths of movement, the insole will be ejected substantially in the direction of the arrow in Fig. 33. It will be seen that the ends of the ejector fingers travel upwardly as well as outwardly after engaging the insole, thus insuring the stripping of the sewing-rib from the groove in the die throughout the outer edge of the sole. To prevent the possibility of the ends of the ejector fingers engaging the sewing-rib as they swing beneath the edge of the insole, the upper edges of the fingers are curved, as indicated in Fig. 33, to provide insole engaging cam faces 915. As the ejector fingers swing outwardly, if the insole has not been raised above the cam faces 915, the latter will engage the adjacent edge of it and raise the insole above the ends of the fingers.

After the completed insoles have been ejected from the dies 48 and the turret 50 has come to rest, the ejecting devices are reset to prepare them for the next ejecting operation. A re-setting plunger 916 is carried by the laterally offset portion of a bracket 917 secured to one end of each of the upper dies 54. Each plunger 916 is located directly above a roller 918 carried at one end of the corresponding rod 904. As the upper dies are depressed to cooperate with the turret dies, the re-setting plungers 916 engage the rollers 918, forcing the rods 904 downwardly until the toggle-links 905 and 906 have been straightened and the ejector arms retracted to their normal inoperative positions. When this occurs, the leaf springs 908 maintain the straightened condition of the toggles.

To automatically stop the rotation of the turret 50 with the dies 48 in a definite relation to the upper dies 52 and 54, the clutch through which the turret is actuated, is so constructed that the driven clutch member 162 may be disconnected from the common driving clutch member 160 and automatically brought to rest with absolute accuracy at the termination of a predetermined amount of rotation of the latter member. Similarly, the clutch member 164 may be controlled to effect the reciprocation of the upper dies in the correct time relation to the turret movement. As illustrated in detail in Figs. 39 to 43, inclusive, the driving clutch member 160 comprises a disk secured to the shaft 156 and rotated continuously in the direction of the arrow in Fig. 41. The driving clutch disk 160 is formed with a thickened periphery from the upper side of which project a pair of driving lugs 921 arranged at diametrically opposite points. A similar pair of driving lugs 922 project from the lower side of the driving clutch member 160. The driving lugs 922 are arranged at diametrically opposite points on the clutch member and are disposed in the same angular position circumferentially of the disk 160 as are the driving lugs 921. Each driving lug is rigidly secured in a dovetail groove in the clutch disk 160, the lugs having oppositely inclined sides 923 (Fig. 41) which fit the corresponding inclined side walls of the dovetail grooves.

The provision of two similar driving lugs for engagement with each of the driven clutch members is rendered necessary on account of the ratio of the gearing connecting the shaft 88 with the turret 50 and the ratio of the gearing connecting the lower clutch member 164 with the crank shafts 122 and 138 which reciprocate the upper dies. The ratios of these sets of gearing are seven to one, and three to one, respectively. It will be seen, therefore, that the shaft 88 makes three and one-half revolutions for each half revolution of the turret 50, and that the clutch member 164 makes one and one-half revolutions for each half turn of the crank-shafts. It is accordingly necessary that the driven clutch member 162 shall be disconnected from the driving clutch member 160 and brought to rest at the completion of three and one-half revolutions, while the clutch member 164 shall be disconnected from the driving clutch member 160 after one and one-half revolutions.

The driven clutch members 162 and 164 comprise a pair of disks, one of which is secured to the shaft 88 while the other is mounted to turn freely on the shaft 156. Each of the clutch disks 162 and 164 is formed with two laterally offset portions 924 and 925 (Fig. 39), the latter being of greater diameter than the former. The driven clutch members 162 and 164 are normally prevented from rotating by a pair of holding pawls 926 and 927, respectively, (Figs. 40 and 41). These holding pawls are pivoted, one above the other, upon a vertical stud 928 supported by the upper portion of a bracket 930 (see also Figs. 39 and 43) which is bolted to one side of the bearing 158. The holding pawl 926 normally engages one or the other of two stop-shoulders 931 (Fig. 40) arranged at diametrically opposite points upon the exterior of the clutch member 162. The holding pawl 927 normally engages one or the other of two stop-shoulders 932 which are similar to the stop-shoulders 931 and are arranged at diametrically opposite points on the exterior of the clutch disk 164.

The driven clutch member 162 is provided with two slidable blocks 933 (Figs. 40 and 41) which are adapted to be moved into and out of the path of rotation of the driving lugs 921 so that said blocks may be engaged by the driving lugs or disengaged therefrom. The driven clutch member 164 is provided with a pair of slidable blocks 934 (Fig. 41), which are similar to the blocks 933, and which are adapted to be moved into and out of the path of the driving lugs 922 to effect engagement or disengagement of the clutch members 164 and 160. The blocks 933 and 934 are mounted to slide longitudinally in transverse peripheral grooves 935 in the laterally offset portions 925 of the driven clutch members 162 and 164 and the blocks are retained in the grooves by means of plates 936 secured to the offset portions. One of the corners at the lower end of each of the blocks 933 and one of the corners at the upper end of each of the blocks 934 are beveled as indicated at 937 in Figs. 41 and 42. The beveled portions 937 are adapted to be engaged by the inclined faces 923 at the advancing sides of the respective pairs of driving lugs 921 and 922. The clutch blocks 933 and 934 are normally positioned with their beveled faces 937 withdrawn from the paths of the respective driving lugs. The clutch blocks are made somewhat longer than the grooves 935 in which they are mounted, so that when the beveled faces 937 of the blocks are withdrawn from the paths of the driving lugs, the opposite ends of the blocks will project beyond the adjacent ends of the grooves 935. Thus, as shown in Fig. 41, when the blocks 933 of the clutch member 162 are positioned with their beveled faces 937 retracted, the upper ends of these blocks will project above the upper ends of the grooves 935. In this figure, the blocks 934 of the lower clutch member 164 are positioned with their beveled faces 937 projecting into the paths of the driving lugs 922, but it will be seen that when these faces 937 are retracted, the lower ends of the blocks 934 will then project below the lower end of the respective grooves 935.

For the purpose of maintaining driving connections between the clutch members 160 and 164, the blocks 934 of the clutch member 164 are held in the path of the driving lugs 922 by a pair of concentrically mounted rings 939 and 941 (Figs. 41 and 42). These rings are arranged with their upper faces lying in the horizontal plane of the lower face of the clutch member 164. The ring 939 is provided with a pair of diametrically disposed notches 940 extending transversely across its upper side, and the second ring 941 has a pair of transverse notches 942 diametrically arranged in its upper side which are adapted to be arranged in registry with the notches 940 to permit the clutch blocks 934 to be retracted from the path of the respective driving lugs. As shown in Fig. 39, the ring 939 is fitted upon an annular bearing face formed on the exterior of the offset portion 924 of the clutch member 164, and is confined between the upper face of the pinion 166 and an annular shoulder formed on the clutch member between the two offset portions thereof. The ring 941 is fitted upon an external bearing face 943 (Fig. 42) of reduced diameter upon the ring 939. Upward displacement of the ring 941 is prevented by means of the annular shoulder above referred to, on the clutch member 164, which engages one side of said ring and an opposed annular shoulder 944 (Fig. 42) on the ring 939 which engages the opposite sides of the ring 941.

For the purpose of maintaining driving connections between the clutch members 160 and 162, the blocks 933 of the clutch member 162 are held in the path of the driving lugs 921 by a pair of concentrically mounted rings 945 and 946. These rings are the same in construction, relative arrangement and mode of operation as the rings 939 and 941, already described and they are mounted upon the clutch member 162 in the same manner that the rings 939 and 941 are mounted upon the clutch member 164, except that an annular member 947 is secured to the upper face of the clutch member 162 and arranged to overlap the ring 945 to prevent upward displacement thereof. The rings 945 and 946 are provided with two sets of notches corresponding to the notches 940 and 943 of the rings 939 and 941, the first mentioned rings being normally positioned with the notches of one ring in registry with the notches of the other ring to receive the upper projecting ends of the clutch blocks 933, as shown in Figs. 40 and 41.

Each of the rings 939 and 945 is prevented from turning with the clutch member upon which it is mounted by means of a rib 948 (Fig. 40) on the bracket 950, the opposite sides of which are engaged by means of stop-screws 949 carried by a pair of lugs projecting from an arm 950 which extends outwardly from the ring.

When the driven clutch members are at rest, the notches in the respective pairs of rings associated therewith are positioned in registry with each other to provide recesses to receive the ends of the blocks 933 and 934. When either of the clutch members 162 or 164 is being driven, the rings associated therewith are relatively positioned with the notches of one ring entirely out of registry with the notches of the other ring so that an uninterrupted horizontal bearing surface is provided which continuously engages the adjacent end faces of the driving blocks and holds them in active positions with their beveled faces 937 projected beyond the grooves and into the path of the driving lugs on the driving clutch member.

In order that the blocks 933 and 934 may be moved longitudinally in the grooves 935 to bring their beveled faces 937 into the paths of rotation of the respective driving lugs on the clutch member 160, each of the notches in the rings 941 and 946 is provided with an inclined end wall 951 (Figs. 41 and 42) adapted to engage the adjacent corner of the slide block which projects into the notch, and said rings are adapted to be rotated relatively to the rings 939 and 945 in a clockwise direction, viewing Fig. 40. When the rings are rotated, the cam action of the inclined walls 951 causes the clutch blocks 933 or 934 to slide toward the driving clutch member 160.

Thus, when the ring 941 is rotated to move the notches 942 out of registry with the notches 940, in the ring 939, as shown in Fig. 42, the clutch block 934 will be raised and held in its raised position (as shown in Figs. 41 and 42) until the ring 941 is rotated in the opposite direction, irrespective of the number of rotations which may be made in the meantime by the driven clutch member 164. In a like manner, when the ring 946 is rotated to move the notches therein out of registry with the notches in the ring 945, the clutch blocks 933 are slid downwardly and held depressed to maintain driving connection with the clutch member 160. When either of the rings 941 or 946 has been thus rotated, the respective holding pawl 927 or 926 is automatically disengaged from the adjacent stop-shoulder 931, thus leaving the respective driven clutch member free to rotate with the driving clutch member.

When the ring 941 has been rotated in the reverse direction so that the notches 942 have been returned into registry with the notches 940, the clutch blocks 934 when next positioned above the registered notches, will be forced downwardly into said notches by the cam action of the advancing inclined faces 923 of the driving lugs against the adjacent corners at the upper ends of the blocks 934. Concurrently with this reverse rotation of the ring 941, the holding pawl 927 is caused to be automatically returned into position to engage one of the stop-shoulders 931 to arrest further rotation of the clutch member 164. In a like manner, when the ring 946 has been rotated in the reverse direction to return the notches therein into registry with the notches in the ring 945, the blocks 933 when again brought into position beneath the registered notches will be forced therein by the cam action of the inclined faces 923 at the advancing sides of the driving lugs 921 of the clutch member 160. Concurrently with the reverse rotation of the ring 946, the holding-pawl 926 is automatically returned into position to engage the adjacent stop-shoulder 931 on the clutch member 162 to arrest further rotation of said clutch member.

The means for rotating the ring 941, carried by the lower clutch member 164, comprises a cam lever 952 (Figs. 39 and 43) fulcrumed upon a stud 953 at one side of the bearing 158 and having its upper end pivotally connected with the ring. The lower end of the cam lever 952 carries a cam roll 954 which rides in a groove in the inner side of a cam disk 955, which rotates in the direction of the arrow in Fig. 39, and is secured to the shaft 190. The groove in the cam disk 955, which receives the cam roll 954, is so designed that upon engagement of a depression $a$ (Fig. 39) in the groove with the cam roll, the ring 941 will rotate to retract the holding pawl 927 from operative position through connections hereinafter described and to effect the engagement of the clutch members 160 and 164. This occurs immediately after the sole blanks have been deposited upon the turret dies. While the depression $a$ remains in engagement with the cam roll, the driving clutch member 164 and the pinion 166 are rotated through the necessary one and one-half revolutions to cause a half rotation of the crank-shafts 122 and 138 for the purpose of depressing the upper dies 52 and 54. When the depression $a$ leaves the roll 954, the ring 941 is rotated in the reverse direction to effect the disengagement of the clutch members 160 and 164 and the return of the holding pawl 927 to operative position to arrest the rotation of the clutch member 164 and the movement of the upper dies when the latter reach their lowermost positions. A high portion $b$ of the groove then comes into engagement with the cam roll, this portion being concentric with the axis of rotation of the cam disk for approximately 180 degrees. During the period of this engagement, the dies are held depressed and the sole blanks maintained under pressure to insure the setting of the cement which was applied to the composite blanks. A second depression $c$ in the groove then comes into engagement with the cam roll, causing the clutch members 160 and 164 to be again engaged to effect the return of the upper dies to their uppermost positions, after which the clutch members are disengaged and the dies maintained in their raised positions until the start of the next cycle of operations of the machine.

The means for rotating the ring 924 on the upper clutch member 162 comprises a cam lever 956 (Figs. 39 and 43) which is fulcrumed upon a horizontal stud 957 supported at one side of the bearing 158 and having its upper end pivotally connected to the ring. The lower end of the cam lever 956 carries a cam roll 958 which rides in a groove in the outer side of the cam disk 955. This groove is provided with a high portion $d$ (Fig. 39) which engages the cam roll 958 during the downward movement of the upper dies and during the time said dies are maintained in their lowermost or operative positions. The cam groove is further provided with a low portion $e$ which, when it engages the cam roll 958, causes the ring 946 to be rotated in the direction to cause the clutch members 160 and 162 to be operatively connected so that the turret will start to rotate. This occurs just after the upper dies have been raised sufficiently to leave the turret free to rotate. During this time the clutch members 160 and 162 make the necessary three and one-half revolutions to cause the turret to rotate through 180 degrees. Thereafter, the high portion $d$ of the cam groove comes into engagement with the cam roll 958, causing reverse rotation of the ring 946. This restores the notches in the rings 945 and 946 into registry so that the clutch blocks are forced upwardly into engagement therewith, thus effecting the disengagement of the clutch members 160 and 162. The turret then remains stationary throughout the rest of the cycle. The clutch blocks 933 fit so closely within the grooves in the clutch member 162 that when they are raised to cause their upper ends to project into the notches in the rings 945 and 946, the blocks are maintained by friction in their raised positions until the ring 946 is again rotated.

The means for automatically actuating the holding pawl 926 is the same in construction and mode of operation as the means for actuating the holding pawl 927 and consequently a description of the former will suffice for both. As shown in Fig. 40, the means for actuating the holding pawl 926 comprises a toggle consisting of a link 959 which is pivoted to an extension 960 of the holding pawl and a link 961 which is pivoted to a portion of the bracket 930. The toggle links 959 and 961 are connected by a knuckle pivot 962, which is, in turn, connected by means of a link 963 with the ring 946. When the ring 946 is positioned with the notches therein in registry with the corresponding notches in the ring 945, the toggle 959—961 will be straightened, and the pawl 926 held in position to engage one of the stop-shoulders 931, as shown in Fig. 40. When the ring 946 has been rotated to move the notch therein out of registry with the notch in the ring 945, the toggle 959—961 will be broken and the holding pawl 926 will be disengaged from the stop-shoulder 931.

As shown in Fig. 1, power is supplied to the motor 182 from the line wires 964, one of which is connected directly with the motor, while the other is adapted to be connected with the motor through the switch 184. The switch 184 comprises a hollow cylindrical casing 965 (Fig. 5) which is rigidly secured to a fuse box 966 (Fig. 1) of any usual or well-known construction, which box is, in turn, secured to the side of the base 64. The terminals of the switch 184 are indicated at 967 in Figs. 4 and 5. To close the switch and start the motor, the terminals 967 are arranged to be bridged by a contact arm 968 centrally pivoted upon a stud 969 threaded into the base of the casing 965. The contact arm 968 is rotated in the direction of the arrow in Fig. 4 to close and open the switch by two pins 970 which project inwardly in an axial direction from the outer end of a cylindrical cover 971, the latter fitting closely over the cylindrical casing 965 and turning freely thereon. The pins 970 project from diametrically opposite points on the cover 971 and are equally spaced from the center thereof. The inner ends of the pins 970 engage opposite sides of the contact arm 968 at points adjacent the opposite ends of the arm. A retaining ring 972 (Fig. 5) prevents the cover 971 from being displaced axially upon the casing 965.

The cover 971 is adapted to be rotated upon the casing 965 through successive quarter revolutions, thereby similarly rotating the contact arm 968 so that the switch will be alternately closed and opened. To this end, the cover is provided with a pair of ratchet teeth 973 which project from its exterior at diametrically opposite points adjacent the outer end thereof. The cover 971 is further provided with a second pair of ratchet teeth 974 which project from the exterior at diametrically opposite points and are severally spaced 45 degrees from the adjacent ratchet teeth 973. The ratchet teeth 973 and the ratchet teeth 974 are arranged in different planes, both of which are normal to the axis of the cylindrical casing 965 and the cover 971. The ratchet teeth 973 are engaged by a feed pawl 976 pivotally mounted upon a pawl-carrying arm 975 which projects outwardly from an annular strap 977 encircling the cover. The ratchet teeth 974 are engaged by a feed pawl 978 similarly mounted upon an arm 979 and strap 980. The feed pawls 976 and 978 are yieldingly held in positions to operatively engage the respective ratchet teeth on the cover 971 by means of leaf springs 981 (Fig. 4) severally secured at one end to the straps 977 and 980 and at their opposite ends bear against the outer edges of the feed pawls.

The pawl-carrying arms 975 and 979 are adapted to be rotated concurrently in opposite directions, each rotation moving the arm through an arc of 90 degrees. During the concurrent upward movement of the pawl-carrying arms 975 and 979, the pawl 978 is caused to move idly across the cylindrical portion of the cover, while the feed pawl 976, through its engagement with one of the ratchet teeth 973, rotates the cover 90 degrees in the direction of the arrow in Fig. 4 and consequently, through the agency of the pins 970, rotates the contact arm 968 in the same direction. At the completion of this movement of the cover and contact arm, the latter bridges the terminals 967, thus closing the switch to start the motor, while one of the ratchet teeth 974 is brought into position ahead of the feed pawl 978, ready to be subsequently advanced by the latter during the concurrent downward movements of the pawl-carrying arms 975 and 979. The feed pawl 976 then moves idly while the feed pawl 978 operates, through its engagement with one of the ratchet teeth 974, to rotate the cover and the contact arm through an additional 90 degrees in the direction of the arrow in Fig. 4. This moves the contact arm 968 into the position in which it is shown by dotted lines in Fig. 4, thus opening the switch.

The pawl-carrying arms 975 and 979 are rotated by a pair of links 982 connected by universal joints with the said arms. The links 982, as shown in Fig. 1, are connected at their upper ends by universal joints 983 to the outer end of an arm 984 (see also Fig. 2), the inner end of which is rigidly secured to a horizontal rock-shaft 985. The rock-shaft 985 is journaled at its opposite ends in brackets 986 secured to the frame brackets 128 and 144. The rock-shaft 985 may be turned in opposite directions to actuate the pawl-carrying arms 975 and 979 by a handle 987.

In order that an attendant may operate the switch 184 while standing at the front or rear or at either side of the machine, the rock-shaft 985 is connected at one end through a pair of intermeshing beveled pinions 988 with a rock-shaft 989, (Fig. 2) which extends at right angles to the rock-shaft 985, while at its opposite end the rock-shaft 985 is connected through a similar pair of intermeshing beveled pinions with a third rock-shaft 990 which also extends at right angles to the rock-shaft 985. The rock shafts 989 and 990, at their ends which are remote from the rock-shaft 985, are, in turn, connected through intermeshing beveled pinions with a fourth rock-shaft 991 that extends parallel to the rock-shaft 985. The rock-shafts 989, 990 and 991 are journaled in brackets secured to the brackets 128 and 144 and are provided with operating handles 987 corresponding to the handle on the rock-shaft 985. By swinging any one of the four operating handles 987 inwardly, the switch 184 will be closed to start the motor 182. By swinging any one of said handles outwardly, the switch 184 may be opened to stop the motor.

When the switch 184 is closed to start the motor, it is desirable that the brake shoes 188 shall be automatically released from the brake drum 186 and when the switch is opened to stop the motor, it is desirable that the brake shoes shall be caused to grip the drum for the purpose of immediately arresting the operation of the machine. In order that the brake shoes 188 may be actuated automatically when one of the handles 987 is moved by the attendant, the bell-crank lever 198 (Fig. 38) which carries the foot treadle 202, is adapted to be also operated by compressed air, the action of which is automatically controlled from the rock shaft 985. To this end, the arm of the bell-crank lever 198 which carries the foot treadle 202, has pivotally connected thereto a piston rod carrying a piston 992 at its upper end. The piston 992 reciprocates within a cylinder 993 which is supported at one side of the base 64. The cylinder 993 is supplied with compressed air by means of a conduit 994 leading from an air compressor. The conduit 994 is connected with the cylinder through a rotatable valve 995 in the cylinder casing. The valve 995 may be of any construction, whereby the cylinder may be connected with the compressed air conduit 994 or with a suitable exhaust port in the valve casing.

The valve 995 is rotated from the rock-shaft 985 through connections comprising an arm 996 secured to one end of the rotatable member of the valve and a link 997 pivotally connected with the arm 996 and with an arm 998 secured to the rock-shaft 985. A stop pin 999 projecting from the side of an arm secured to the rock shaft 985 engages a portion of the adjacent bracket 986 to limit the outward swinging movement of the operating handles 987. The inward movement of said handles is limited by a stop pin 1000 which projects from the side of an arm secured to the rock-shaft 989 and is arranged to engage a portion of the adjacent bracket 986.

When the machine is idle, with the switch 184 open, the rotatable member of the valve 995 is positioned as shown in Fig. 38, establishing communication between the compressed air conduit and the cylinder 993 so that the piston 992 is held depressed by the pressure of the air and the bell-crank lever 198 and toggle 194 occupy the positions shown in Fig. 38, the brake shoes 188 at this time gripping the brake drum 186.

The construction and arrangement of the valve 995 is such, as clearly shown in Fig. 38, that when the rock-shaft 985 is rocked, by an inward movement of any one of the operating handles 987 for the purpose of closing the switch 184 to start the motor, the rotatable member of the valve 995 will be turned 90 degrees to shut off the supply of compressed air to the cylinder 993 and to connect the cylinder with the exhaust port in the valve casing. The spring 196 is thus permitted to straighten the toggle 194 and release the brake shoes 188 from the brake drum 186.

While a specific construction and arrangement of parts is herein shown and described, it will be understood that this is not essential except so far as specified in the claims, and may be changed without departing from the spirit of the invention.

What is claimed as new is:

1. In a machine for making soles, means for forming a sole-portion, a container for portions to be formed, means for delivering a portion from the container to the forming means, and means for further operating upon the formed sole-portion while in place upon the forming means.

2. In a machine for making soles, means for forming a sole-portion, a container for portions to be formed, means for delivering a portion from the container to the forming means, and means for associating the formed portion and another sole-portion.

3. In a machine for making soles, means for forming a sole-portion, a container for portions to be formed, means for delivering a portion from the container to the forming means, a container for other sole-portions, and means for associating a portion from the last-mentioned container with the formed portion.

4. In a machine for making soles, means for forming a sole-portion, a container for portions to be formed, means for delivering a portion from the container to the forming means, means for associating the formed portion and another sole-portion, and means for applying pressure to the associated portions.

5. In a machine for making soles, molding means constructed and arranged to form a projection, a container for sole-portions, and means for delivering a portion from the container to the molding means.

6. In a machine for making soles, means for forming a projection, a container for sole-portions, means for delivering a portion from the container to the projection-forming means, a container for other sole-portions, means for transferring such other portions from their container into association with the portions upon which the projections have been formed, and means for applying pressure to the associated portions.

7. A machine for making insoles having, in combination, means for forming a sewing rib in a sole blank, a magazine for holding a supply of blanks, means for transferring a blank from the magazine to a position to be operated upon by the rib forming means, and means for positioning the ribbed blank and an unribbed blank in face to face relation and for pressing the assembled blanks together.

8. A machine for making insoles having, in combination, cooperating dies for molding a sewing rib in a sole blank, a magazine for holding a supply of blanks, means for removing a blank from the magazine and for transferring the blank to a position between the dies, and means for positioning an unribbed blank in face to face relation with the ribbed blank and for pressing the blanks together.

9. A machine for making insoles having, in combination, means for forming a sewing rib in a sole blank, a magazine for holding a stack of blanks, means for separating the endmost blank from the stack, a picker, means for actuating the picker to transfer the separated blank to a position to be operated upon by the rib forming means, and means for positioning the ribbed blank and an unribbed blank in face to face relation and for pressing the assembled blanks together.

10. A machine for making insoles having, in combination, a support for an insole blank provided with a sewing rib, a magazine for holding a stack of unribbed blanks, means for removing a blank from the magazine, and means for positioning the blank in face to face relation with a ribbed blank on said support and for pressing the blanks together.

11. A machine for making insoles having, in combination, means for forming a sewing rib in a sole blank, a magazine for holding a supply of blanks, means for transferring a blank from the magazine to a position to be operated upon by the rib forming means, a second magazine for holding a supply of unribbed blanks, means for removing an unribbed blank from the magazine, and means for positioning said unribbed blank in face to face relation with a ribbed blank and for pressing the blanks together.

12. A machine for making insoles having, in combination, a die provided with a groove to receive the sewing rib of an insole, a male die cooperating with said grooved die to form a sewing rib, a pair of magazines for holding sole blanks, means for transferring a blank from one of the magazines to a position to be operated upon by said dies, means for closing and opening the dies, means for removing an unribbed blank from the second magazine, and means for positioning said unribbed blank in face to face relation with the ribbed blank on the grooved die and for pressing the blanks together.

13. In a machine for making soles, a support movable to a plurality of operating positions, a container for sole-portions, means for delivering a portion from the container to the support, means for forming the supported portion at an operating position, and means for further operating upon a sole-portion at another position.

14. In a machine for making soles, a support, a container for sole-portions, means for delivering a portion from the container to the support, means for forming the supported portion, a container for other sole-portions, and means for delivering a sole-portion from the last-mentioned container to the support.

15. In a machine for making soles, a support movable to a plurality of operating positions, a container for sole-portions, means for delivering a portion from the container to the support, means for forming the supported portion at an operating position, a container for other sole-portions, and means for delivering to a formed portion upon the support at another operating position a sole-portion from the last-mentioned container.

16. In a machine for making soles, a support movable to a plurality of operating positions, a container for sole-portions, means for delivering a portion from the container to the support, means for forming the supported portion at an operating position, a container for other sole-portions, means for delivering to a formed portion upon the support a sole-portion from the last-mentioned container, and means for operating upon these assembled portions at another operating position.

17. In a machine for making soles, a support movable to an operating position, a container for sole-portions, means for delivering a portion from the container to the support at the operating position, and means for forming a projection upon the supported portion at said position.

18. In a machine for making soles, a support movable to a plurality of operating positions, a container for sole-portions, means for delivering a portion from the container to the support at an operating position, means for forming a projection upon the supported portion at said position, a container for other sole-portions, means for transferring a portion at another operating position from the last-mentioned container to the supported and formed portion, and means for applying pressure to the thus-assembled portions.

19. In a machine for making soles, plural supports movable to a plurality of operating positions, a container for sole-portions at each of plural positions, means for delivering a sole-portion from each container to a support, and means at an operating position for forming the delivered portions.

20. In a machine for making soles, plural supports movable to a plurality of operating positions, a container for sole-portions at each of plural positions, means for delivering a sole-portion from each container to a support, means for forming the delivered portions at one position, and means for applying pressure to the portions at another position.

21. In a machine for making soles, plural supports movable to a plurality of operating positions, a container for sole-portions at each of plural positions, means for delivering a sole-portion from each container to a support, means performing the same operation upon sole-portions at different operating positions, and means at other operating positions for thereafter performing a different operation than is performed at the previously acting positions.

22. A machine for making insoles having, in combination, a carrier, a series of grooved sewing rib forming dies mounted thereon, a male die, a presser, means for actuating the carrier to present each grooved die alternately to the male die and to the presser, a magazine for holding a stack of blanks, means for removing a blank from the magazine and transferring it to a position to be acted upon by a grooved and male die, means for relatively actuating the dies to form a sewing rib on the blank, a second magazine for holding a supply of unribbed blanks, means for removing an unribbed blank from said magazine and for positioning it in face to face relation with the ribbed blank on the grooved die, and means for relatively actuating the grooved die and presser to press the blanks together to form an insole.

23. In a machine for making soles, a support for a right sole-portion, a support for a left sole-portion, such supports corresponding in form to the respective portions, means for moving each support to a plurality of operating positions, and sole-making means at different positions for operating respectively upon the right and left portions.

24. In a machine for making soles, supports for right and left sole-portions, such supports corresponding in form to the respective portions, means for moving the supports to a plurality of operating positions, means at different positions through which all the supports move for delivering right and left sole-portions to the respective supports, and means for operating upon the supported portions.

25. In a machine for making soles, a support for a right sole-portion, a support for a left sole-portion, means for moving the supports to a plurality of operating positions, means at different positions for delivering right and left sole-portions to the respective supports, means at said positions for operating upon the supported sole-portions, and means at other positions for performing a different operation than is performed at the previously acting positions upon the sole-portions.

26. In a machine for making soles, independent means for operating upon right and left sole-portions, means for delivering right and left sole-portions to the respective operating means, and means for thereafter associating other right and left sole-portions with the corresponding portions previously delivered.

27. In a machine for making soles, a support for a right sole-portion, a support for a left sole-portion, means for moving the supports to successive operating positions, means at different positions for operating respectively upon the right and left portions, and means at other positions for performing upon the right and left sole-portions operations different from those previously effected.

28. In a machine for making soles, a support for a right sole-portion, a support for a left sole-portion, means for moving the supports to a plurality of operating positions, means at different positions for delivering right and left sole-portions to the respective supports, means for operating upon the supported portions, and means at other positions for associating other sole-portions with the portions thus operated upon.

29. In a machine for making soles, a support for a right sole-portion, a support for a left sole-portion, means for moving the supports to a plurality of operating positions, means at different positions for delivering right and left sole-portions to the respective supports, means for operating upon the supported portions, means at other positions for associating other sole-portions with the portions thus operated upon, and means for operating upon the assembled sole-portions.

30. In a machine for making soles, a support for a right sole-portion, a support for a left sole-portion, means for moving the supports to a plurality of operating positions, means at different positions for delivering right and left sole-portions to the respective supports, means for forming a projection upon each of the right and left portions, means at other positions for associating other sole-portions with the portions thus operated upon, and means for operating upon the associated right and left portions.

31. A machine for making insoles having, in combination, a carrier, a series of right and left grooved sewing rib forming dies mounted thereon, right and left male dies, pressers, means for actuating the carrier to present each right grooved die alternately to a right male die and to a presser and to present each left grooved die alternately to a left male die and to a presser, means for relatively actuating the male dies and grooved dies to form sewing ribs on blanks placed between the dies, and means for relatively actuating the pressers and grooved dies to press unribbed blanks upon the ribbed blanks on the grooved dies.

32. In a machine for making soles, a holder for sole-portions, means for forming said sole-portions, a conveying device arranged to penetrate the sole-portions in the holder, means for moving the conveying device between the holder and forming means, and means held against movement at the forming means and contacting with the conveying device for causing its withdrawal from the sole-portions.

33. A machine for making insoles having, in combination, a magazine for holding a stack of insole blanks, means for separating the endmost blank from the stack, means for conveying the separated blank away from the stack and including a picker arm movable in planes parallel to the face of the blank and normal thereto, a needle carrying frame movably mounted in the arm, needle holders movably mounted on the frame, means actuated by the relative movement of the frame and arm after the needles have engaged the blank for projecting the needles into the blank, a latch to prevent relative movement of the arm and frame after the needles have been projected, means for releasing the latch at the end of the conveying movement of the arm to permit retraction of the needles from the blank, and means for positioning the blank in face to face relation with another blank and for pressing the assembled blanks together.

34. A machine for making insoles having, in combination, a magazine for holding a stack of insole blanks, means for separating the endmost blank from the stack, means for conveying the separated blank away from the stack and including a picker arm movable in planes parallel to the face of the blank and normal thereto, a needle carrying frame movably mounted in the arm, needle holders movably mounted on the frame, means actuated by the relative movement of the frame and arm after the needles have engaged the blank for projecting the needles into the blank, means permitting the needles to adjust themselves to the plane of the blank so as to penetrate the blank simultaneously, means for retracting the needles from the blank at the end of the conveying movement of the arm, and means for positioning the blank in face to face relation with another blank and for pressing the assembled blanks together.

35. In a machine for making soles, a holder for sole-portions, and conveying means co-operating with the holder and having a plurality of projections constructed and arranged to adjust themselves for simultaneous retaining engagement with a sole-portion.

36. In a machine for making soles, a holder for sole-portions, operating means, conveying means having a plurality of sole-portion-engaging projections, and a carrier arranged to move the conveying means between the holder and operating means, the conveying means being mounted for universal movement of the projections upon the carrier.

37. In a machine for making soles, a holder for sole-portions, operating means, conveying means having a plurality of sole-portion-engaging projections, and a carrier arranged to move the conveying means between the holder and operating means, the conveying means being arranged to yield upon the carrier and being also movable thereon about a plurality of axes.

38. In a machine for making soles, a holder for sole-portions, operating means, a movable arm, a lever fulcrumed upon the arm, sole-portion-engaging projections pivoted upon the lever, and means for moving the arm to carry the projections between the holder and operating means.

39. In a machine for making soles, a holder for sole-portions, operating means, a movable arm, a lever fulcrumed upon the arm, a latch for the lever, sole-portion-engaging projections pivoted upon the lever, and means for moving the arm to carry the projections between the holder and operating means.

40. In a machine for making soles, a holder for sole-portions, operating means, a movable arm, a lever fulcrumed upon the arm, a bar pivoted upon the lever, sole-portion engaging projections pivoted upon the bar, and means for moving the arm to carry the projections between the holder and operating means.

41. A machine for making insoles having, in combination, a magazine for holding a stack of insole blanks, means for separating the endmost blank from the stack, means for conveying the separated blank away from the stack and including a picker arm, a plurality of picker needles mounted in the arm, means for actuating the picker arm to bring the needles into engagement with the blank and for conveying the blank, means for projecting the needles into the blank, means permitting the needles to adjust themselves to the plane of the blank so as to penetrate the blank simultaneously, means for retracting the needles from the blank at the end of the conveying movement of the arm, and means for positioning the blank in face to face relation with another blank and for pressing the assembled blanks together.

42. A machine for making insoles having, in combination, a magazine for holding a stack of insole blanks, means for separating the endmost blank from the stack, means for conveying the separated blank away from the stack including a picker arm, a needle carrying frame mounted in the arm and comprising pivotally mounted and connected parts permitting the needles to adjust themselves to the plane of the blank so as to penetrate the blank simultaneously, needle holders mounted on the frame, means for actuating the picker arm to bring the needles into engagement with the blank and for conveying the blank, means for projecting the needles into the blank, means for retracting the needles from the blank at the end of the conveying movement of the arm, and means for positioning the blank in face to face relation with another blank and for pressing the assembled blanks together.

43. In a machine for making soles, holding means for sole-portions, operating means, a conveying device movable between said means and into alinement with one of them, and means into co-operation with which the conveying device moves for temporarily maintaining such alinement.

44. In a machine for making soles, holding means for sole-portions, operating means, a conveying device movable between and into alinement with said means, means for effecting such movements, and means associated with both the holding and operating means for temporarily maintaining the conveying device in alinement therewith.

45. In a machine for making soles, holding means for sole-portions, operating means, a conveying device movable in one plane between said means and in another plane to engage and disengage sole-portions, means for effecting such movements, and movement-limiting means with which the conveying device co-operates in both planes.

46. In a machine for making soles, holding means for sole-portions, operating means, a device having a conveying movement between said means and an engaging and disengaging movement into and out of contact with the sole-portions, means for effecting such movements, and means effective during the engaging and disengaging movement to prevent the conveying movement of the device.

47. In a machine for making soles, holding means for sole-portions, operating means, a device having a conveying movement between said means and an engaging and disengaging movement into and out of contact with the sole-portions, means for effecting such movements, and means for limiting the extent of the conveying movement of the device and for preventing such movement during the engaging and disengaging movement.

48. In a machine for making soles, holding means for sole-portions, operating means, a conveying device movable between said means, a contact member movable with the conveying device, and a stop member having a surface for engaging one side of said contact member in one position of the conveying device and a surface for engagement with the opposite side of the contact member in another position of the device.

49. In a machine for making soles, holding means for sole-portions, operating means, a conveying device movable between said means, a contact member movable with the conveying device, and a stop member having differently positioned projections for engagement with different portions of the contact member.

50. In a sole-making machine, a support, a container for sole-blanks, means for removing a blank from the container, means for applying an adhesive to the blank, and means for placing the thus-coated blank in registration with another sole-blank upon the support.

51. In a sole-making machine, a support movable to a plurality of operating positions, means in one position for operating upon a sole-portion on the support, and means at another position for applying an adhesive to another sole-portion and associating the portions upon the support.

52. In a sole-making machine, a support movable to a plurality of operating positions, means in one position for operating upon a sole-portion on the support, means at another position for applying an adhesive to another sole-portion and associating the portions upon the support, and means for applying pressure to the associated portions.

53. In a sole-making machine, a support movable to a plurality of operating positions, means at one position for operating upon a sole-portion on the support, means for delivering a sole-portion to the support, means at a second position for applying an adhesive to another sole-portion, and means for associating the thus-coated portion with that upon the support.

54. In a solemaking machine, a support movable to plurality of operating positions, means in one position for forming a projection upon a sole-portion on the support, means at a second position for applying an adhesive to another sole-portion, means for associating the thus-coated portion with the formed portion at the support, and means for pressing the portions together.

55. In a machine for making soles, independent means for operating upon right and left sole-portions, means for separately delivering right and left sole-portions to the respective operating means, said delivering means being independent of each other, and means associated with each delivering means for applying an adhesive to the portions.

56. In a machine for making soles, a support for a right sole-portion, a support for a left sole-portion, means for moving all the supports through the same series of operating positions, means at different positions in the series for operating respectively upon the right and left portions, and means at each position for applying an adhesive to the portions.

57. In a sole-making machine, a container for sole-portions, means for removing a sole-portion from the container, means for applying an adhesive to the removed portion, means for operating upon another sole-portion, and means for associating the coated portion with the portion thus operated upon.

58. In a sole-making machine, a support, a container for sole-portions, means for delivering a sole-portion from the container to the support, a second container, means for removing a sole-portion from the second container, means for applying an adhesive to the removed portion, and means for delivering the thus-coated portion to that upon the support.

59. In a sole-making machine, a support, means for delivering a sole-portion to the support, means for forming a projection upon the supported portion, means for applying an adhesive to another sole-portion, and means for associating the thus-coated portion with the formed portion upon the support.

60. In a sole-making machine, a container for sole-portions, operating means, and means for transferring a sole-portion from the container to the operating means and including adhesive-applying mechanism, said adhesive-applying mechanism acting independently of the associated transferring means to effect a part of the movement of the sole-portion.

61. A machine for making insoles having, in combination, a support for an insole blank provided with a sewing rib, a magazine for holding a stack of unribbed blanks, means for removing a blank from the magazine, and means for applying cement to the blank.

62. A machine for making insoles having, in combination, means for supporting two sole blanks, a pair of cooperating sewing rib forming dies, means for feeding one of the blanks between the dies, means for applying cement to the other blank, and means for actuating the dies to form a sewing rib in the first blank and for then positioning the blanks in face to face relation and for pressing the blanks together.

63. A machine for making insoles having, in combination, a cement applying roll, means cooperating therewith to advance an insole blank across the roll, means for supplying cement to the roll, and means for positioning the cemented blank in face to face relation with another blank and for pressing the assembled blanks together.

64. A machine for making insoles having, in combination, a cement applying roll, means cooperating therewith to advance an insole blank across the roll, means for supplying cement to the roll only during the engagement of a sole blank therewith, and means for positioning the cemented blank in face to face relation with another blank and for pressing the assembled blanks together.

65. A machine for making insoles having, in combination, feed mechanism for advancing a blank, cooperating feed rolls between which said blank is introduced by said feed mechanism, one of said rolls being adapted to receive cement and apply it to the face of the blank, means for supplying cement to the cement roll, and means for positioning the cemented blank in face to face relation with another blank and for pressing the assembled blanks together.

66. In a sole-making machine, a container for sole-portions, operating means, means for transferring a sole-portion from the container to the operating means, means situated between the container and operating means for applying an adhesive to such sole-portion, said applying means being arranged to effect advance of the sole-portion, and means for rendering the adhesive-applying means effective at predetermined times.

67. In a sole-making machine, means for operating upon a sole-portion, a table receiving such sole-portion from the operating means, means for transferring the sole-portion from the table, and means for moving relatively the sole-portion supported upon the table and the operating means to prevent interference with the action of the transferring means.

68. In a sole-making machine, means for operating upon a sole-portion, a table receiving such sole-portion from the operating means, means for transferring the sole-portion from the table, and means for moving the table to carry the supported sole-portion clear of the operating means in preparation for the action of the transferring means.

69. In a sole-making machine, means for applying an adhesive to a sole-portion, a support for the thus-coated portion, a table associated with the applying means, means for transferring a sole-portion from the table to the support, and means for moving the table from the applying means in preparation for the action of the transferring means.

70. In a sole-making machine, a container for sole-portions, a support for a sole-portion, adhesive-applying means interposed between the container and the support, and a table situated at each side of the applying means and respectively receiving sole-portions to be coated from the container and holding the coated portions for delivery to the support.

71. In a sole-making machine, a container for sole-portions, a support for a sole-portion, adhesive-applying means interposed between the container and the support, a table situated at each side of the applying means and respectively receiving sole-portions to be coated from the container and holding the coated portions for delivery to the support, and means for moving each table toward and from the applying means.

72. A machine for making insoles having, in combination, a magazine for holding a stack of insole blanks, means for separating the endmost blank from the stack, a table to receive the blank, a cement applying roll, a feed roll co-operating therewith, means for moving the table to present the blank thereon to said rolls, transferring means for the cemented blank delivered by the rolls, and means supplied by the transferring means for positioning the cemented blank in face to face relation with another blank and for pressing the assembled blanks together.

73. A machine for making insoles having, in combination, a magazine for holding a stack of insole blanks, means for separating the endmost blank from the stack, a table to receive the blank, cement-applying means receiving the blank from the table, a table to which the applying means delivers cemented blanks, transferring means co-operating with the last-mentioned table, and means supplied by the transferring means for positioning the cemented blank in face to face relation with another blank and for pressing the assembled blanks together.

74. A machine for making insoles having, in combination, a cement applying roll, a feed roll cooperating therewith to advance an insole blank across the cement roll, a table to receive the blank from the roll, means for moving the table toward and from the roll, means for removing the cemented blank from the table and positioning it in face to face relation with another blank, and means for pressing the assembled blanks together.

75. In a sole-making machine, an operating support for a sole-portion, means co-operating with the support for forming the sole-portion, and means for raising an edge of a portion from the support while permitting the opposite edge to remain in contact therewith.

76. In a sole-making machine, means for operating upon a sole-portion, and pneumatic means delivering through the operating means for freeing the sole-portion from the operating means.

77. In a sole-making machine, means for operating upon a sole-portion, a contact member, and spring actuated means arranged to move the contact member abruptly against the sole-portion to remove it from the operating means.

78. In a sole-making machine, means for operating upon a sole-portion, means for freeing the sole-portion from the operating means, and means for removing the thus-freed portion from the operating means.

79. In a sole-making machine, means for operating upon a sole-portion, pneumatic means for freeing the sole-portion from the operating means, and means for removing the thus-freed portion from the operating means.

80. In a sole-making machine, means for operating upon a sole-portion, pneumatic means for freeing the sole-portion from the operating means, and a contact member movable against the thus-freed portion to remove it from the operating means.

81. In a sole-making machine, a support arranged to receive a sole-portion for an operation thereon, and means carried by the support and situated beneath the sole-portion thereon for freeing such portion from the support.

82. In a sole-making machine, means for forming a projection upon a sole-portion, and means acting upon said projection for freeing the sole-portion from the forming means.

83. In a sole-making machine, means for forming a projection upon a sole-portion, means acting upon said projection for freeing the sole-portion from the forming means, and means movable between the thus-formed sole-portion and the forming means for removing such portion from said forming means.

84. A machine for making insoles having, in combination, a die provided with a groove to receive the sewing rib of an insole, and means operating in the groove for ejecting an insole from the die.

85. A machine for making insoles having, in combination, a die provided with a groove to receive the sewing rib of an insole, and means for supplying compressed air to said groove beneath the rib of the insole to lift the insole.

86. A machine for making insoles having, in combination, a die provided with a groove to receive the sewing rib of an insole, means for supplying compressed air to said groove beneath the rib of the insole to lift the insole, and an ejector finger to remove the insole from the die.

87. A machine for making insoles having, in combination, a die provided with a groove to receive the sewing rib of an insole, means for lifting the insole at one side from the die, and an ejector finger operating across the die transversely to the length of the insole to remove the insole from the die.

88. A machine for making insoles having, in combination, a die provided with a groove to receive the sewing rib of an insole, a male die cooperating with said grooved die to form a sewing rib on a blank placed between them, means for pressing an unribbed blank upon a ribbed blank on the grooved die to form an insole, and means for ejecting the insole from the grooved die.

89. In a sole-making machine, a support for a sole-portion movable into a plurality of operating positions, means at one position for forming a projection upon the sole-portion on the support, and means made effective in the movement of the support between positions for removing the formed portion therefrom.

90. In a sole-making machine, a support for a sole-portion movable into a plurality of operating positions, means at one position for forming a projection upon the sole-portion on the support, means at a second position for associating with the formed portion another sole-portion, and means made effective after the support passes the last operating position to remove the associated portions therefrom.

91. In a sole-making machine, a support for a right sole-portion, a support for a left sole portion, means for moving both supports to the same operating positions, means for separately operating upon the left and right sole-portions at particular positions, and means acting to selectively remove the right and left sole-portions from their supports at different points in the movement.

92. A machine for making insoles having, in combination, a carrier, a series of grooved sewing rib forming dies mounted thereon, a male die, a presser, means for actuating the carrier to present each grooved die alternately to a male die and to a presser, means for relatively actuating the male die and a grooved die to form a sewing rib on a blank placed between the dies, means for relatively actuating the presser and a grooved die to press an unribbed blank upon the ribbed blank on the grooved die to form an insole, and means controlled by the movement of said carrier for admitting compressed air to the groove of the die beneath the rib of the insole to lift the insole.

93. A machine for making insoles having, in combination, a carrier, a series of grooved sewing rib forming dies mounted thereon, a male die, a presser, means for actuating the carrier to present each grooved die alternately to a male die and to a presser, means for relatively actuating the male die and a grooved die to form a sewing rib on a blank placed between the dies, means for relatively actuating the presser and a grooved die to press an unribbed blank upon the ribbed blank on the grooved die to form an insole, an ejecting finger for removing the insole from the die, and mechanism controlled by the movement of the carrier for actuating the ejecting finger.

94. A machine for making insoles having, in combination, a carrier, a series of grooved sewing rib forming dies mounted thereon, a male die, a presser, means for actuating the carrier to present each grooved die alternately to a male die and to a presser, means for relatively actuating the male die and a grooved die to form a sewing rib on a blank placed between the dies, means for relatively actuating the presser and a grooved die to press an unribbed blank upon the ribbed blank on the grooved die to form an insole, an ejecting finger, and means for actuating the ejecting finger to remove the sole from the die after the die has moved away from the presser.

95. A machine for making insoles having, in combination, a carrier, a series of grooved sewing rib forming dies mounted thereon, a male die, a presser, means for actuating the carrier to present each grooved die alternately to a male die and to a presser, means for relatively actuating the male die and a grooved die to form a sewing rib on a blank placed between the dies, means for relatively actuating the presser and a grooved die to press an unribbed blank upon the ribbed blank on the grooved die to form an insole, an ejecting finger past which the dies are moved by the carrier, and means for actuating the finger to remove the soles from the dies.

96. In a sole-making machine, co-operating sole-forming dies provided with a depression and entering projection, a movable turret upon which one of the dies is mounted, means for moving the turret to carry the dies into and out of alinement, means for moving the dies relatively toward and from one another, and means made effective in the last-mentioned movement to move the turret and insure the alinement of the dies.

97. In a sole-making machine, a support for sole-portions movable successively to a plurality of operating positions, operating means, driving means for the support and means, driving means, and controlling means for operating means, and controlling means for the driving means, said controlling means extending to all the operating positions.

98. In a sole-making machine, means for operating upon a sole-portion, a motor for the operating means, means for controlling the supply of energy to the motor, a brake for the motor, and connections between the controlling means and brake.

99. In a sole-making machine, means for operating upon a sole-portion, actuating means for the operating means, controlling means for the actuating means, a brake for the actuating means, connections between the controlling means and brake, and means arranged to actuate the brake independently of the controlling means.

100. In a sole-making machine, a support for sole-portions movable into a plurality of operating positions, means for operating upon a supported sole-portion, a driven member movable to cause the travel of the support, a driven member for moving the operating means, a driving member common to said driven members, a contact member carried by each driven member, and means for moving the contact members into engagement with the driving member.

101. In a sole-making machine, a support for sole-portions movable into a plurality of operating positions, means for operating upon a supported sole-portion, a driven member movable to cause the travel of the support, a driven member for moving the operating means, a driving member common to said driven members, a contact member carried by each driven member, means for moving the contact members into engagement with the driving member, and power-actuated means for effecting the movement of the contact members.

102. In a sole-making machine, a support, means for delivering a sole-portion to the support, transferring means engaging the sole-portion upon the support, operating mechanism to which the transferring means delivers, and a stop-member against which the sole-portion is delivered to locate it upon the support in position for engagement by the transferring means.

103. In a sole-making machine, a support, means for delivering a sole-portion to the support, transferring means engaging the sole-portion on the support, operating mechanism to which the transferring means delivers, a movable stop-member against which the sole-portion is delivered to locate it upon the support in position for engagement by the transferring means, and means for moving the stop.

104. In a sole-making machine, means for applying an adhesive to a sole-portion, a table to which the sole-portion is advanced by the applying means, and a stop for the sole-portion co-operating with the table.

105. In a sole-making machine, means for applying an adhesive to a sole-portion, a table to which the sole-portion is advanced by the applying means, a movable stop for the sole-portion co-operating with the table, and means for moving the stop.

106. In a sole-making machine, means for applying an adhesive to a sole-portion, a table to which the sole-portion is advanced by the applying means, a movable stop for the sole-portion co-operating with the table, movable means for transferring the sole-portion from the table, and means acting to move the stop from the path of the transferring means.

107. In a sole-making machine, means for applying an adhesive to a sole-portion, a movable table to which the sole-portion is advanced by the applying means, a movable stop for the sole-portion co-operating with the table, and means made effective in the movement of the table for moving the stop.

108. In a sole-making machine, adhesive-applying rolls, a movable table receiving a sole-portion from the applying rolls, a movable stop for the sole-portion co-operating with the table, and a relatively fixed contact member arranged for engagement with the stop in the movement of the table.

109. In a sole-making machine, means for applying an adhesive to a sole-portion, a table to which the sole-portion is advanced by the applying means, a movable stop for the sole-portion co-operating with the table, means for moving the stop, and means arranged to vary the action of the moving means.

110. In a sole-making machine, adhesive-applying rolls, a movable table receiving a sole-portion from the applying rolls, a stop for the sole-portion co-operating with the table, a relatively fixed contact member arranged for engagement with the stop in the movement of the table, and means arranged to permit the position of the contact member to be varied.

111. A machine for making manufactured insoles having, in combination, a pair of dies constructed to mold a sewing-rib in a sheet of insole material, operating means for reciprocating one of said dies toward and from the other die, and mechanism for delivering sheet insole material between said dies prior to each operation thereof.

112. A machine for making manufactured insoles having, in combination, means for molding a sheet of insole material to form a sewing-rib thereon, and means for assembling a second unmolded sheet with the molded sheet and for pressing the sheets together.

113. A machine for making manufactured insoles having, in combination, a pair of co-operating relatively movable dies for molding a sewing-rib in a sheet of insole material, means for operating said dies, and mechanism for automatically supplying said dies with such material in timed relation to the operation thereof.

114. A machine for making manufactured insoles having, in combination, means for molding a sewing-rib in a sheet of insole material, comprising co-operating male and female dies, mechanism for intermittently feeding insole material between said dies, and means for operating said dies during the periods of rest of said feeding mechanism.

115. A machine for making manufactured insoles having, in combination, a pair of dies constructed to mold a sewing-rib in a sheet of insole material, operating means for reciprocating one of said dies toward and from the other die, and mechanism for delivering sheet insole material between said dies prior to each operation thereof.

116. A machine for making manufactured insoles having, in combination, means for molding a sewing-rib in a sheet of insole material, mechanism for automatically supplying said means with such material, and means for pressing a second sheet of insole material to the molded sheet.

117. A machine for making manufactured insoles having, in combination, means for forming a sewing-rib in a sheet of insole material, and means for assembling an unribbed sheet of insole material on the smooth face of the ribbed sheet.

118. A machine having, in combination, a combined molding and pressing die, and co-operating molding and pressing dies therefor, means for first bringing the combined die and the co-operating molding die together, means for subsequently bringing the combined die and the co-operating pressing die together, and means for automatically supplying two separate sheets of material between said dies, the first sheet in position to be molded and the second sheet in position to be pressed on said molded sheet.

119. A machine for making manufactured insoles having, in combination, a combined female molding and pressing die, means for superposing a sheet of insole material thereover, a male molding die superposed over the female die and co-operating therewith to form a sewing-rib in the sheet of insole material, means for changing the relative superposed relation of the male and female dies, means for positioning an unribbed sheet on the ribbed sheet, and a pressing die co-operating with the first-named die to press said unribbed sheet of insole material to the ribbed sheet to secure the two sheets together.

120. A machine for making manufactured insoles having, in combination, three dies, means for placing a sheet of insole material adjacent to one of the dies, means for relatively moving said die and another of the dies towards each other to form a sewing-rib upon the sheet of insole material, means for separating said first-named die and said other die, means for placing another sheet of insole material adjacent to said first-named die, and means for relatively moving the third die and said first-named die towards each other to assemble said sheets of insole material.

121. A machine for making manufactured insoles having, in combination, a die, means for superposing a sheet of insole material over the die, means for grooving the sheet to form a sewing-rib thereon, means for superposing a second sheet of insole material over the first-named sheet, and means for securing the sheets together.

122. In an insole-making apparatus, a pair of sewing-rib-molding dies, means for feeding insole-material between said dies, an assembling die co-operating with one of the molding dies, and means for feeding insole-material to the assembling die and its companion molding die.

123. In an insole-making apparatus, a pair of sewing-rib-molding dies, means for feeding insole-material between said dies, an assembling die co-operating with one of the molding dies, means for feeding insole-material to the assembling die and its companion molding die, and a rotatable adhesive-applying member co-operating with the last-mentioned material.

124. A machine for making soles having, in combination, means for pressing a sole, means for forming a sewing-rib in a sole blank, and means for bringing said ribbed blank and another blank into face-to-face relation to receive the pressure.

125. A machine for making soles having, in combination, means for separately supporting two sole blanks, and means for forming a sewing-rib in one of the blanks and then positioning them in face-to-face relation and pressing them together.

126. A machine for making soles having, in combination, a pair of co-operating dies constructed to mold a sewing-rib in a sole blank, means for feeding a sole blank between the dies, and means for actuating the dies.

127. A machine for making soles having, in combination, a pair of co-operating dies constructed to mold a sewing-rib in a sole blank, a source of blank supply, means for transferring a blank into registry with the dies, and means for closing the dies on the blank.

128. A machine for making soles having, in combination, means for supporting two sole blanks, a pair of co-operating sewing-rib forming dies, means for feeding one of the blanks between the dies, for then operating the dies and for then positioning the two blanks in face-to-face relation and pressing them together.

129. A machine for making soles having, in combination, a male die, a female die for co-operating therewith to form a sewing-rib in a sole blank placed between them, a pressing member for co-operating with the female die to press a second sole blank on the first when placed between them, means for delivering a sole blank between said male and female dies and for actuating the dies, means for moving the female die with the ribbed blank supported thereby into co-operative relation with said pressing member, and means for delivering a second blank on the first and for relatively actuating said female die and pressing member to press the two blanks together.

130. A machine for making soles having, in combination, a sewing-rib forming die, a sewing-rib forming die and a pressing member spaced from each other to co-operate with said first die, means for relatively moving said dies to act on a sole blank placed between them, and means for moving said first die with the ribbed blank supported thereby to bring it into position to be acted on by said pressing member, for then placing a second sole blank on the ribbed blank and for relatively operating said first die and the pressing member to press the two blanks together.

131. A machine for making soles having, in combination, a sewing-rib forming die and a pressing member, a rotatable turret, a second sewing-rib forming die mounted on the turret and adapted to be positioned in co-operative relation with said first die, means for relatively moving said dies to act on a sole blank positioned between them, means for rotating the turret to position said second die with the ribbed blank supported thereby in co-operative relation with the pressing member, and means for delivering a second sole blank upon the ribbed blank and for actuating said second die and the pressing member to press the two blanks together.

132. A machine for making soles having, in combination, a turret, a plurality of sewing-rib forming and pressing dies supported by and equally spaced about the turret, a plurality of sewing-rib forming dies and a plurality of pressing members mounted directly above said sewing-rib forming and pressing dies, means for moving the upper dies toward and from the lower dies, and means for rotating the turret between the movements of the upper dies to advance each of the lower dies and position them alternately beneath the upper sewing-rib forming dies and the pressing members.

133. A machine for making manufactured insoles in multiple having, in combination, a turret having mounted thereon four female sewing-rib forming dies movable in steps by the turret between rest stations, a pair of male sewing-rib forming dies and a pair of insole pressing members mounted above the rest stations of said female dies, mechanism for rotating said turret intermittently to present a female die alternately to a male die and then to a pressing member, means for delivering insole blanks simultaneously to all of the female dies at each position of rest thereof, and means for actuating the male dies and pressing members after such delivery, two laminated insoles being formed at each second step of said turret.

134. In a sole-making apparatus, means for forming a sole-portion, and means for bringing another sole-portion into association with the formed portion on the forming means.

135. In a sole-making apparatus, means for forming a sole-portion, means for bringing another sole-portion into association with the formed portion, and means for applying pressure to the associated portions.

136. In a sole-making apparatus, means for forming a projection upon a sole-portion, and means for feeding another sole-portion to such formed portion on the forming means.

137. In a sole-making apparatus, a support movable to a plurality of operating positions, means for delivering a sole-portion to the support at an operating position, means for forming the sole-portion at one of the positions, and means for further operating upon the sole-portion at another position.

138. In a sole-making apparatus, a support movable to a plurality of operating positions, means for delivering a sole-portion to the support at an operating position, means at such position for forming the delivered sole-portion, and means at another position for further operating upon the formed sole-portion.

139. In a sole-making apparatus, a support movable to a plurality of operating positions, means for delivering a sole-portion to the support at an operating position, means for forming a projection upon the sole-portion at one of the positions, and means for further operating upon the sole-portion at another position.

140. In a sole-making apparatus, a support movable to a plurality of operating positions, means for delivering a sole-portion to the support at an operating position, means for forming the sole-portion at one of the positions, means at another position for applying a second sole-portion to that upon the support, and means for further operating upon the sole-portions at the last-mentioned position.

141. In a sole-making apparatus, a support movable to a plurality of operating positions, means for delivering a sole-portion to the support at an operating position, means for forming the sole-portion at one of the positions, means at another position for applying a second sole-portion to that upon the support, and means for pressing the portions together.

142. In a sole-making apparatus, a support movable to a plurality of operating positions, means for delivering a sole-portion to the support at an operating position, means for forming a projection upon a sole-portion at one of the positions, and means at another position for applying a second sole-portion to that having the projection.

143. In a sole-making apparatus, a support movable to a plurality of operating positions, means for delivering a sole-portion to the support at an operating position, means for forming a projection upon a sole-portion at one of the positions, means at another position for applying a second sole-portion to that having the projection, and means for pressing the portions together.

144. In a sole-making apparatus, plural supports movable to a plurality of operating positions, means for delivering sole-portions to the supports, and means for performing the same operation upon the sole-portions at different operating positions.

145. In a sole-making apparatus, plural supports movable to a plurality of operating positions, means for delivering sole-portions to the supports, means for performing the same operation upon the sole-portions at different operating positions, and means at other operating positions for thereafter simultaneously performing another operation.

In testimony whereof I have signed my name to this specification.

EDNA A. PERRY,
*Executrix of the Will of Frederick H. Perry, deceased.*

CERTIFICATE OF CORRECTION.

Patent No. 1,667,948.  Granted May 1, 1928, to

EDNA A. PERRY, Executrix of FREDERICK H. PERRY, deceased.

It is hereby certified that error appears in the printed specification of the above numbered patent requiring correction as follows: Page 8, line 109, strike out the word "which"; page 10, line 96, for the words "topmost blanks in" read "blank in each of"; page 17, line 88, strike out the word "bearing" and insert the same to follow after the word "end" in line 87; page 21, line 48, for the word "undirectional" read "unidirectional"; and that the said Letters Patent should be read these corrections therein that the same may conform to the record of the case in the Patent Office.

Signed and sealed this 7th day of May, A. D. 1929.

(Seal)

M. J. Moore,
Acting Commissioner of Patents.